United States Patent
Yu

(10) Patent No.: US 9,517,774 B2
(45) Date of Patent: Dec. 13, 2016

(54) STATIC ROAD GRADIENT ESTIMATION

(71) Applicant: FORD GLOBAL TECHNOLOGIES, LLC, Dearborn, MI (US)

(72) Inventor: Hai Yu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 699 days.

(21) Appl. No.: 13/735,308

(22) Filed: Jan. 7, 2013

(65) Prior Publication Data

US 2014/0067240 A1 Mar. 6, 2014

Related U.S. Application Data

(60) Provisional application No. 61/695,886, filed on Aug. 31, 2012.

(51) Int. Cl.
*B60W 40/076* (2012.01)
*G06F 17/00* (2006.01)
*B60W 40/06* (2012.01)
*B60W 40/13* (2012.01)

(52) U.S. Cl.
CPC .......... *B60W 40/076* (2013.01); *B60W 40/06* (2013.01); *B60W 40/13* (2013.01); *G06F 17/00* (2013.01)

(58) Field of Classification Search
CPC ...... B60W 40/076; B60W 40/06; B60W 40/00
USPC ................... 701/80, 102, 110, 112
See application file for complete search history.

(56) References Cited

U.S. PATENT DOCUMENTS

| | | |
|---|---|---|
| 6,438,510 B2 | 8/2002 | Zhu et al. |
| 6,549,840 B1 | 4/2003 | Mikami et al. |
| 6,556,908 B1 | 4/2003 | Lu et al. |
| 6,684,140 B2 | 1/2004 | Lu |
| 6,714,851 B2 | 3/2004 | Hrovat et al. |
| 7,489,995 B2 | 2/2009 | Yasui et al. |
| 7,499,784 B2 | 3/2009 | Kresse |
| 7,877,178 B2 | 1/2011 | Lu et al. |
| 7,899,594 B2 | 3/2011 | Messih et al. |
| 8,010,252 B2 | 8/2011 | Getman et al. |
| 8,352,119 B2 | 1/2013 | Arai et al. |
| 2004/0167705 A1 | 8/2004 | Lingman et al. |
| 2007/0083314 A1 | 4/2007 | Corigliano et al. |
| 2008/0071451 A1 | 3/2008 | Yamaguchi et al. |
| 2008/0086253 A1* | 4/2008 | Nakayama ............. 701/80 |

(Continued)

FOREIGN PATENT DOCUMENTS

| | | | |
|---|---|---|---|
| CN | 102627108 | | 8/2012 |
| JP | 2005194934 A | * | 7/2005 |
| JP | 2009041457 A | * | 2/2009 |

OTHER PUBLICATIONS

Yu et al., Driving Pattern Identification for EV Range Estimation, Mar. 2012.

*Primary Examiner* — Mahmoud Gimie
(74) *Attorney, Agent, or Firm* — David B. Kelley; Brooks Kushman P.C.

(57) ABSTRACT

A vehicle and a vehicle system are provided with a controller that is configured to generate output indicative of a static road gradient estimation based on a filtered longitudinal acceleration. The filtered longitudinal acceleration is dependent upon a derivative of a longitudinal acceleration. An initial value of the static road gradient estimation corresponds to at least one of a kinematic road gradient estimation and a dynamic road gradient estimation.

19 Claims, 24 Drawing Sheets

(56) References Cited

U.S. PATENT DOCUMENTS

| | | |
|---|---|---|
| 2008/0249693 A1 | 10/2008 | Kresse |
| 2008/0319683 A1* | 12/2008 | Ogawa .......................... 702/41 |
| 2009/0043473 A1 | 2/2009 | Nakai et al. |
| 2009/0182476 A1 | 7/2009 | Sidlosky et al. |
| 2009/0187324 A1 | 7/2009 | Lu et al. |
| 2009/0299579 A1 | 12/2009 | Hac |
| 2010/0017070 A1 | 1/2010 | Doering et al. |
| 2010/0100272 A1 | 4/2010 | Chen et al. |
| 2010/0250056 A1 | 9/2010 | Perkins |
| 2010/0324752 A1 | 12/2010 | Suganuma et al. |
| 2011/0087398 A1 | 4/2011 | Lu et al. |
| 2011/0130974 A1 | 6/2011 | Yngve et al. |
| 2011/0136625 A1 | 6/2011 | Yu et al. |
| 2011/0187522 A1 | 8/2011 | Filev et al. |
| 2012/0150384 A1 | 6/2012 | Jung et al. |
| 2013/0113615 A1 | 5/2013 | Jin et al. |
| 2014/0052339 A1 | 2/2014 | Takahashi et al. |

\* cited by examiner

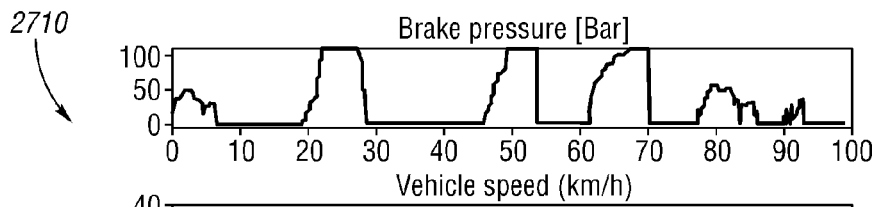
Fig. 27A.
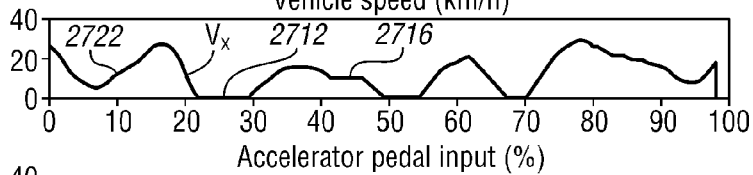
Fig. 27B.
Fig. 27C.
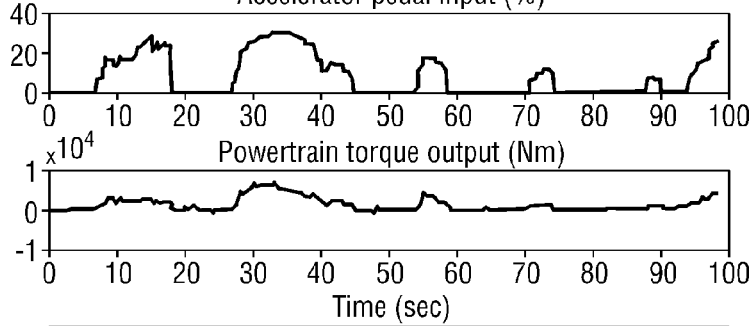
Fig. 27D.
Fig. 27E.
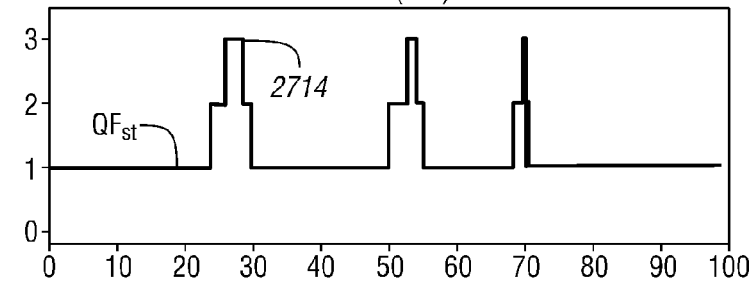
Fig. 27F.
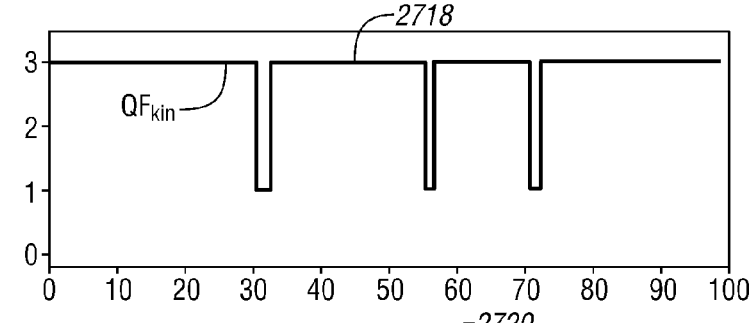
Fig. 27G.
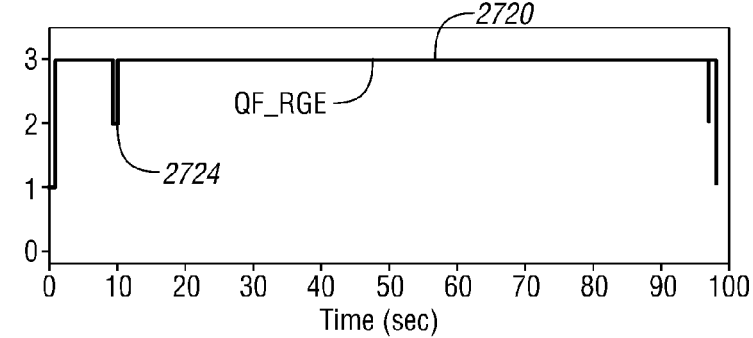

STATIC ROAD GRADIENT ESTIMATION

CROSS-REFERENCE TO RELATED APPLICATIONS

This application claims the benefit of U.S. provisional Application No. 61/695,886 filed Aug. 31, 2012, the disclosure of which is incorporated in its entirety by reference herein.

TECHNICAL FIELD

One or more embodiments relate to a vehicle system and method for estimating road gradient and vehicle mass.

BACKGROUND

Road grade and vehicle mass are two parameters that affect a number of vehicle control functions. Such functions include powertrain control, energy management control, transmission control, brake control and stability control. For example, conventional vehicles include an internal combustion engine which provides torque for propelling the vehicle. The engine provides torque through the transmission to the drive wheels, even when the engine is idling. Such torque is referred to as creep-torque. When a vehicle is stopped on an inclined surface, this creep-torque supplements torque applied by a brake system (brake torque) to maintain the vehicle in a stationary position. If the engine were to shutdown, while the vehicle was stopped on the incline, the engine creep-torque would be eliminated and additional brake torque would be needed to maintain the vehicle position and prevent the vehicle from rolling backwards. The amount of additional brake torque needed is based on road grade and vehicle mass.

A micro-hybrid vehicle may enable a stop/start strategy for starting and stopping the vehicle engine during a driving event. The engine is shutdown if no power is required (e.g. while waiting at a traffic light). As soon as power is requested, the engine is automatically restarted. By avoiding unnecessary engine idling, the vehicle's fuel economy will be improved. A micro-hybrid having start/stop functionality may adjust brake pressure to maintain a vehicle position when the engine is shutdown while the vehicle is stopped on an incline. Such a micro-hybrid estimates road grade and vehicle mass, and adjusts brake pressure based on these estimates.

SUMMARY

In one embodiment, a vehicle is provided with a controller that is configured to generate output indicative of a static road gradient estimation based on a filtered longitudinal acceleration. The filtered longitudinal acceleration is dependent upon a derivative of a longitudinal acceleration. An initial value of the static road gradient estimation corresponds to at least one of a kinematic road gradient estimation and a dynamic road gradient estimation.

In another embodiment, a vehicle system is provided with a controller that is configured to filter a longitudinal acceleration based on a derivative of the longitudinal acceleration corresponding to a longitudinal jerk. The controller is further configured to generate output indicative of a static road gradient estimation based on the filtered longitudinal acceleration, and to generate output indicative of a static quality factor based on the longitudinal jerk.

In yet another embodiment, a method is provided for estimating a static road gradient. A longitudinal acceleration is filtered based on a derivative of the longitudinal acceleration. An output indicative of a static road gradient estimation is generated based on the filtered longitudinal acceleration. An output indicative of a static quality factor is generated based on the derivative of the longitudinal acceleration.

As such the vehicle system provides advantages over existing systems by estimating static road gradient using kinematic equations and dynamic filtering of the longitudinal acceleration. The vehicle system also sets an initial value of the static road gradient estimation equal to a road gradient provided by a kinematic or dynamic road gradient estimation. By dynamically filtering the longitudinal acceleration, and by using another estimation for the initial value, the vehicle system reduces the time delay before a quality static road gradient estimated value may be provided, which in turn allows for the engine to be shutdown earlier in a start/stop application which results in improved fuel economy.

BRIEF DESCRIPTION OF THE DRAWINGS

FIGS. 27A-27G are time plots illustrating vehicle speed, and quality factors as controlled by the method of FIG. 25.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
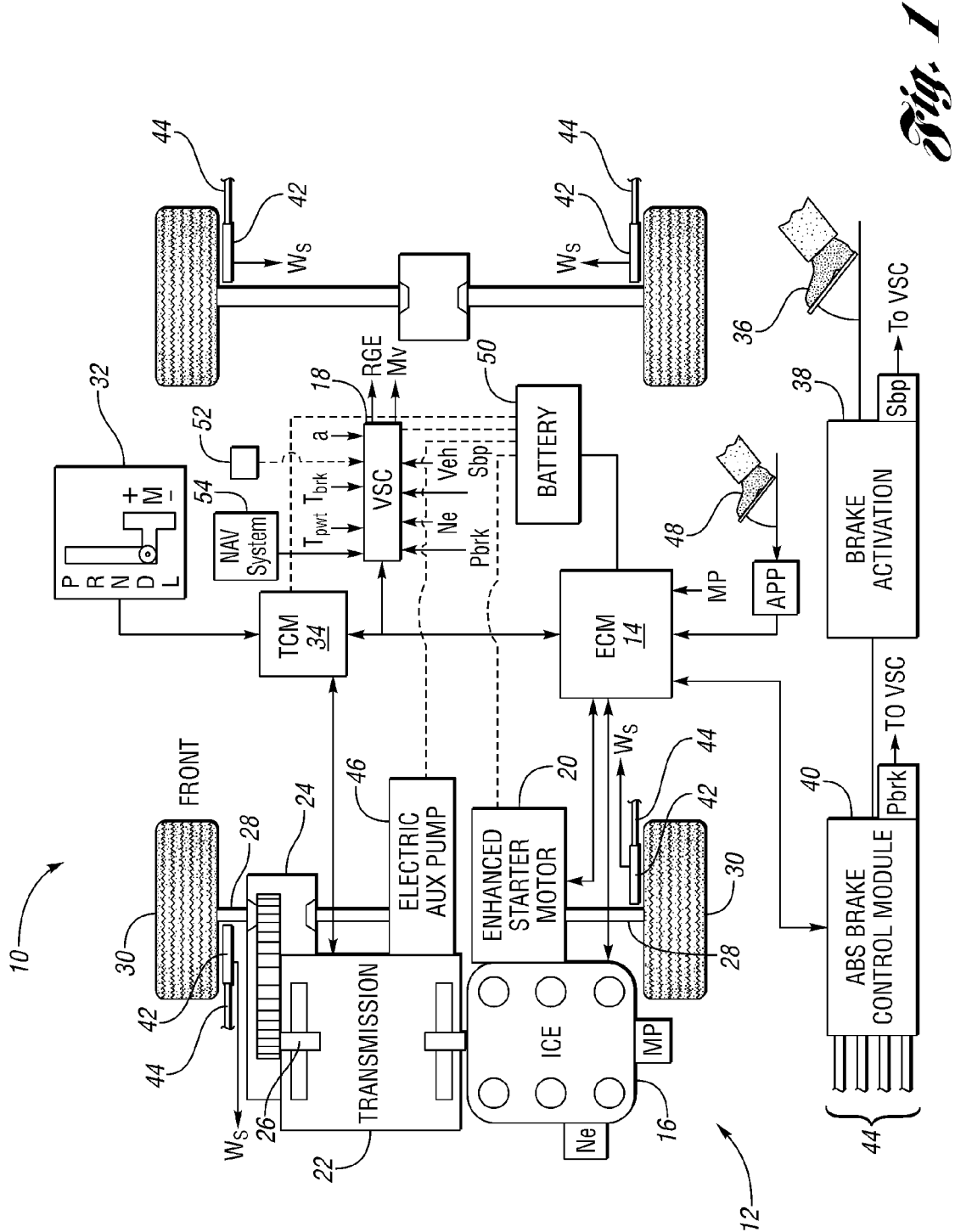
FIG. 1 is a schematic diagram of a vehicle having a vehicle system for estimating road gradient and vehicle mass according to one or more embodiments.

With reference to FIG. 1, a vehicle system for estimating road gradient and vehicle mass is illustrated in accordance with one or more embodiments and is generally referenced by numeral 10. The vehicle system 10 is depicted within a vehicle 12. The vehicle system 10 includes a controller, such as an engine control module (ECM) 14, an internal combustion engine (ICE) 16 and a vehicle system controller (VSC) 18 that are in communication with each other. The VSC 18 receives input that corresponds to vehicle speed (Vx), acceleration (a), yaw rate (r) and torque ($T_{pwt}$, $T_{brk}$), and then provides output that corresponds to a road gradient estimation (RGE) and estimated vehicle mass (Mv) in response to the input.

The illustrated embodiment depicts the vehicle 12 as a micro-hybrid vehicle, which is a vehicle that is propelled by the engine 16, and the engine 16 is repeatedly started and stopped to conserve fuel. An enhanced starter motor 20 is coupled to an engine crankshaft. The starter motor 20 receives electrical power and provides output torque to the crankshaft for starting the engine 16. Although illustrated and described in the context of a micro-hybrid vehicle 12, it is understood that embodiments of the vehicle system 10 may be implemented on other types of vehicles, such as a conventional powertrain vehicle, a battery electric vehicle (BEV), which is powered by an electric motor without assistance of an engine, and a hybrid electric vehicle (HEV), which is powered by an electric motor and an engine.

The vehicle 12 includes a transmission 22 for adjusting the output torque of the engine 16. Torque from the engine 16 is transferred through the transmission 22 to a differential 24 by a transmission output shaft 26. Axle half shafts 28 extend from the differential 24 to a pair of driven wheels 30 to provide drive torque for propelling the vehicle 12.

The vehicle 12 includes a shifter 32 for manually selecting a transmission gear. The shifter 32 includes a sensor (not shown) for providing an output signal that corresponds to a selected transmission gear (e.g., PRNDL). A transmission control module (TCM) 34 communicates with the shifter 32 and the transmission 22 for adjusting the transmission gear ratio based on the shifter selection. Alternatively the shifter 32 may be mechanically connected to the transmission 22 for adjusting the transmission gear ratio.

The vehicle 12 includes a braking system which includes a brake pedal 36, and a booster and a master cylinder which are generally referenced by brake activation block 38 in FIG. 1. The braking system also includes an ABS brake control module 40 that is connected to wheel brake assemblies 42 and the brake activation block 38 by a series of hydraulic lines 44 to effect friction braking. The wheel brake assemblies 42 are oriented at each wheel 30 and may be configured as caliper, or drum brake assemblies. Each wheel brake assembly 42 includes a sensor (not shown) for providing a wheel speed signal ($w_s$). In one or more embodiments, the ABS brake control module 40 provides a calculated vehicle speed signal (Vx) to the VSC 18 based on the wheel speed signals.

The braking system also includes sensors for providing information that corresponds to current brake characteristics. The braking system includes a position switch for providing a brake pedal state ($S_{bp}$) signal that corresponds to a brake pedal position (e.g., applied or released). In other embodiments, the braking system includes a position sensor (not shown) for measuring pedal position. The braking system also includes one or more pressure sensors for providing a brake pressure ($P_{brk}$) signal that corresponds to an actual brake pressure value within the brake system (e.g., brake line pressure, master cylinder pressure, or pressure at the wheel assemblies).

The vehicle 12 includes an accelerator pedal 48 with a position sensor for providing an accelerator pedal position (APP) signal that corresponds to a driver request for propulsion. The ECM 14 controls the throttle of the engine 16 based on the APP signal.

The vehicle 12 includes an energy storage device, such as a battery 50. The battery 50 supplies electrical energy to the vehicle controllers and the starter motor 20, as generally indicated by dashed lines in FIG. 1. The vehicle 12 may include a single battery 50, such as a conventional low voltage battery, or multiple batteries, including a high voltage battery. Additionally, the vehicle 12 may include other types of energy storage devices, such as capacitors or fuel cells.

The vehicle 12 also includes one or more inertial sensors 52 which provide output that corresponds to vehicle acceleration (a). In one embodiment, the inertial sensor 52 provides output corresponding to longitudinal acceleration. In another embodiment, the inertial sensors 52 provide output corresponding to longitudinal acceleration, lateral acceleration and vertical acceleration, all of which are generally referenced by the variable "a" in FIG. 1. In one or more embodiments, the inertial sensors 52 also provide output (r) corresponding to a yaw rate. In other embodiments, the sensor 52 is an inclinometer (not shown) which provides output corresponding to a road gradient combined with a vehicle pitch angle.

The vehicle 12 includes a navigation system 54 for receiving destination information from a driver. The navigation system 54 also communicates with a plurality of systems/networks that are external to the vehicle. For example the navigation system 54 may include transceivers for communicating with satellites (e.g. GPS), and computers (via cellular networks, hardwire connections or radio frequency (RF) waves) (not shown). Such networks are described in detail in U.S. application Ser. No. 12/744,092 to Pleet et al., which is hereby incorporated by reference. The navigation system 54 determines a distance between a present location of the vehicle 12 and the destination selected by the driver, and provides this distance, along with speed, acceleration and elevation information associated with the vehicle 12, its target destinations, or other relevant GPS waypoints to the VSC 18.

The VSC 18 communicates with other vehicle systems, sensors and controllers for coordinating their function. As shown in the illustrated embodiment, the VSC 18 receives a plurality of input signals (e.g., $S_{bp}$, $P_{brk}$, engine speed (Ne), vehicle speed (Vx), powertrain torque ($T_{pt}$), brake torque ($T_{br}$), a, and r) from various vehicle sensors and controllers. Although it is shown as a single controller, the VSC 18 may include multiple controllers that may be used to control multiple vehicle systems according to an overall vehicle control logic, or software. The vehicle controllers, including the VSC 18 generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 18 communicates with other vehicle systems and controllers (e.g., the ECM 14, the TCM 34, etc.) over one or more wired or wireless vehicle connections using common bus protocols (e.g., CAN and LIN).

Figure 2:
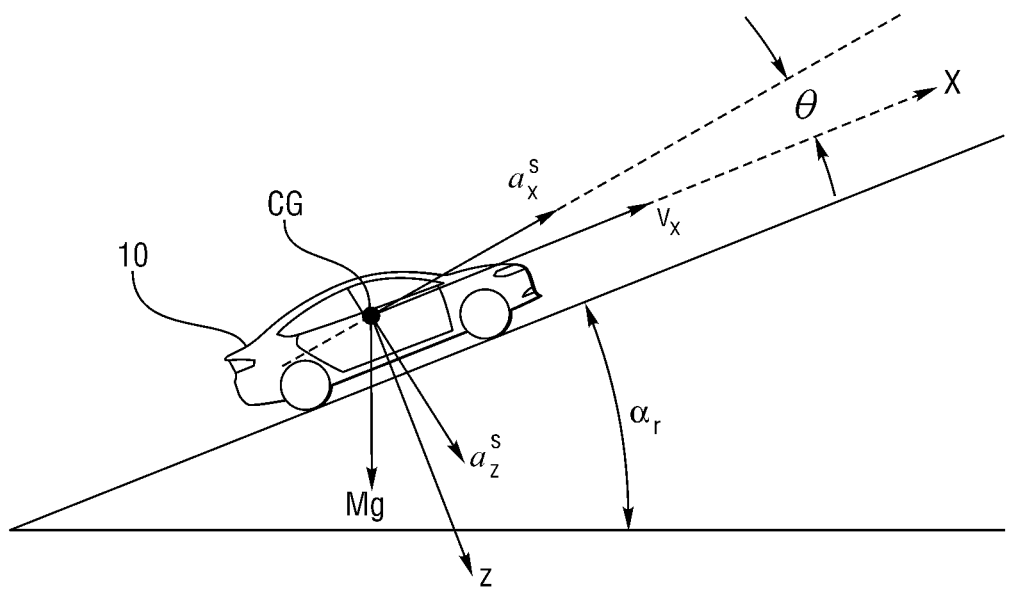
FIG. 2 is a side view of the vehicle of FIG. 1 illustrated on a road inclined at a gradient.
Figure 3:
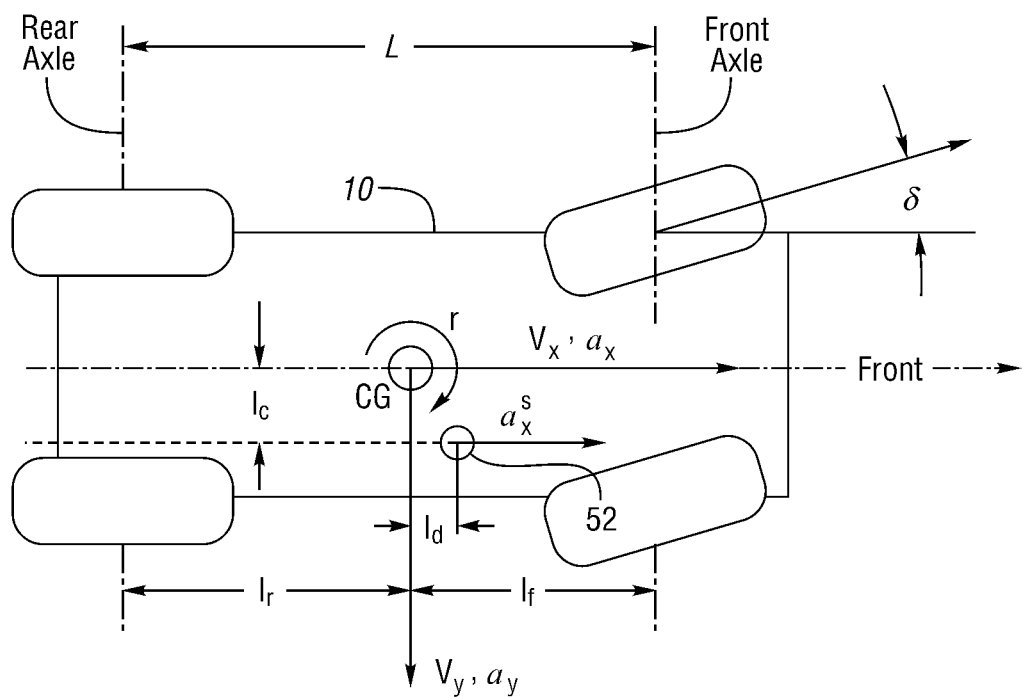
FIG. 3 is a bottom view of the vehicle of FIG. 1.

With reference to FIGS. 2 and 3, the vehicle 12 is illustrated with a number of forces, accelerations and moments acting thereon. The vehicle 12 is shown with reference to a coordinate system centered about a center of gravity of the vehicle (CG). The coordinate system includes a longitudinal axis (x), a lateral axis (y) and a vertical axis (z). Referring to FIG. 2, the vehicle 12 is positioned upon an inclined surface. The surface has a gradient (road gradient) that is represented by the symbol $\alpha_r$. Additionally, the vehicle pitch angle relative to the road gradient is represented by symbol θ. The weight of the vehicle is represented by Mg, which is illustrated acting upon the CG of the vehicle 12, where M is estimated vehicle mass, and g represents the acceleration due to gravity (9.8 m/s$^2$). The longitudinal velocity of the vehicle 12 is represented by symbol $V_x$, and is determined based on the wheel speed signals ($W_s$ shown in FIG. 1), according to one or more embodiments. The longitudinal acceleration and the vertical acceleration of the vehicle 12 are represented by variables $a_x^s$, $a_z^s$ respectively, where the superscript letter(s) indicates that the signal is provided by a sensor, such as the inertial sensors 52 shown in FIG. 1. Referring to FIG. 3 the yaw angular rate acts about the vertical axis (z) and is represented by letter r. The inertial sensor(s) 52 are mounted on the vehicle 12 offset from the CG, and the vehicle system 10 calculates acceleration values at the CG based on the offset. The longitudinal offset between the sensors 52 and the CG is represented by $l_d$, and the lateral offset is represented by $l_c$ in FIG. 3.

Figure 4:
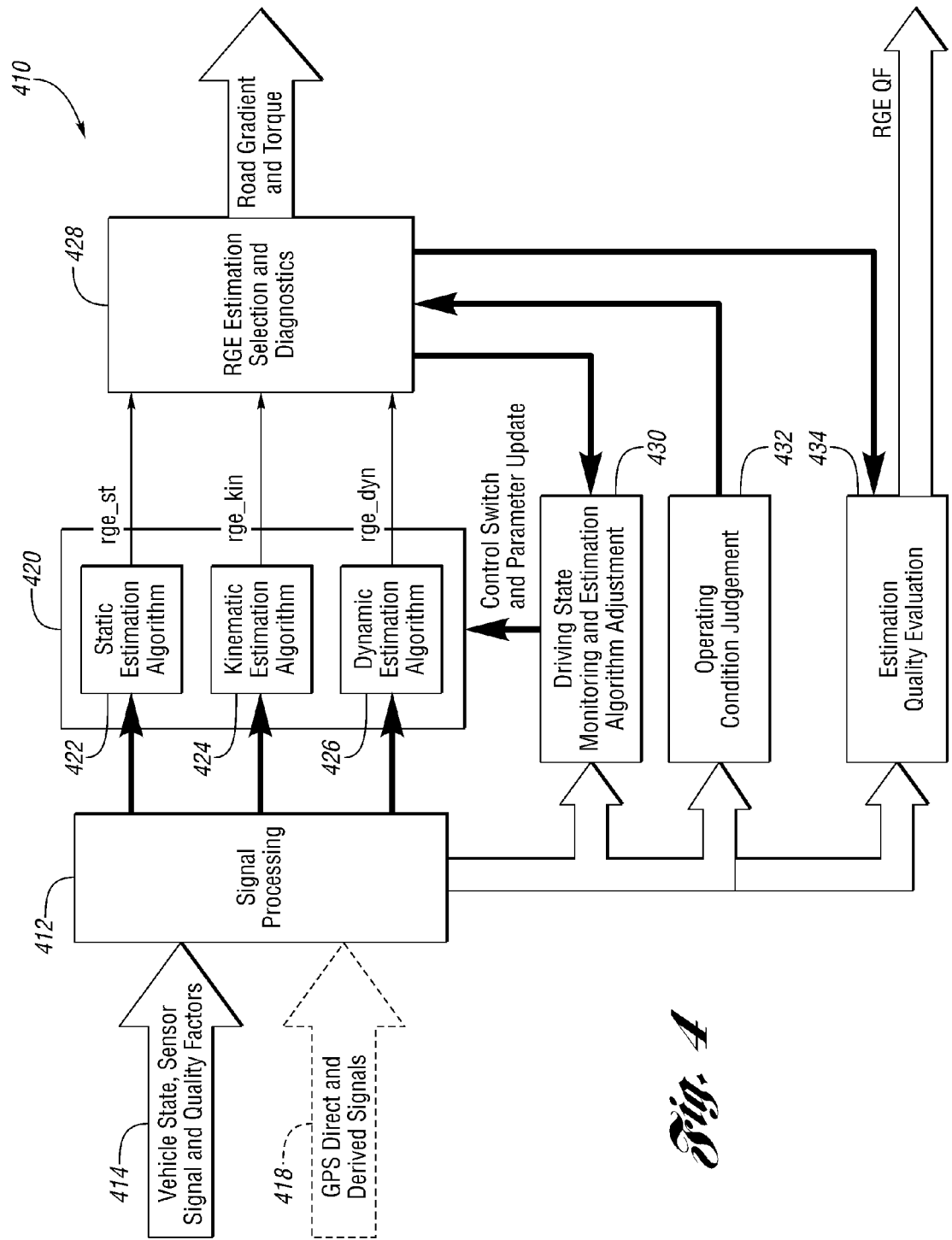
FIG. 4 is a schematic block diagram illustrating a method for arbitrating road gradient estimation, as performed by the vehicle system of FIG. 1, according to one or more embodiments.

FIG. 4 depicts a simplified block diagram of a method 410 for road gradient estimation arbitration in accordance with one or more embodiments. The method is implemented using software code contained within the VSC, according to one or more embodiments. In other embodiments, the method 410 is implemented in other vehicle controllers, or distributed amongst multiple vehicle controllers. The vehicle system includes a number of algorithms for estimating road gradient, where each algorithm is suited for different vehicle conditions. The method 410 selects a road gradient estimation algorithm based on current vehicle conditions.

The VSC receives inputs at signal processing block 412. The inputs include vehicle states and sensor signals, (e.g., $a_x^s$, $a_y^s$, $a_z^s$, r) derived or calculated values (e.g., Vx, $T_{pwt}$, $T_{brk}$, $F_{pwt}$, $F_{brk}$), and quality factors which are all generally represented by input 414. In some embodiments, the vehicle system receives inputs from the navigation system that correspond to vehicle speed and acceleration, which are generally represented by input 418.

At block 420 the VSC estimates road gradient (RGE) using static, kinematic and dynamic estimation algorithms, which are represented by sub-blocks 422, 424 and 426 respectively. The RGE values are provided to an RGE arbitration and diagnostic block 428 which selects which estimation ($RGE_{st}$, $RGE_{kin}$, or $RGE_{dyn}$) to provide as an output ($RGE_{out}$) for other vehicle systems based on a number of vehicle conditions.

The static RGE algorithm 422 estimates road gradient based on the longitudinal acceleration input ($a_x^s$). Static RGE is suited for vehicle standstill conditions, such as engine start/stop functionality when a micro-hybrid is stopped on an incline. When the vehicle is stopped on an incline (as shown in FIG. 2) the longitudinal acceleration value ($a_x^s$) is biased due to deflection within the vehicle suspension system, which is represented by the vehicle pitch angle (θ). The static RGE algorithm compensates for the vehicle pitch angle, as described in detail with respect to FIGS. 7-10C. Generally, the static RGE is the most accurate algorithm among the three RGE estimations since its estimation involves the minimal estimation input and it is the most directly derived estimation results. However, the static RGE is only available at vehicle standstill conditions.

The kinematic RGE algorithm 424 estimates RGE based on input corresponding to the vehicle's kinematic properties including the relationship between vehicle speed, accelerations and yaw rate. The algorithm processes the input using a Kalman Filter as described in detail with respect to FIGS. 11-13D. The kinematic RGE algorithm 424 is suited for normal vehicle motion conditions (e.g., Vx>5 kph) because some of the underlying calculations have low accuracy at low vehicle speeds. Additionally, a Kalman filter is a dynamic filter, a good estimation is usually not available until the estimation state has converged. The transient time depends on the difference between the initial state and the true road grade state as well as the estimation conditions like: signal frequency component richness and signal to noise ratio, etc.

The dynamic RGE algorithm 426 estimates RGE based on input corresponding to vehicle speed, wheel torques (brake torque and powertrain output torque), and other drag forces acting on the vehicle (e.g., aerodynamic drag, rolling resistance and the road gradient load). The vehicle system includes an algorithm for estimating vehicle mass, which is included in block 426, and described in detail with respect to FIGS. 18-24. Generally the dynamic RGE has lower quality conditions as compared to static and kinematic RGE because it involves more signals in its estimation, and the noise and error in each signal will be propagated in the final RGE output. However, the dynamic RGE does not rely on the longitudinal acceleration signal ($a_x^s$), and therefore it has different signal coverage from that of the static and the kinematic estimations. For example, in the case of sensor error conditions the longitudinal acceleration signal ($a_x^s$) may not be available, and then the dynamic RGE is the only available estimate.

At block 430 the vehicle system performs driving state monitoring and estimation algorithm adjustment. The estimation algorithm adjustment includes feedforward input compensation for the $RGE_{kin}$ algorithm of block 424, which is described in detail with respect to FIGS. 14-17.

At block 432 the vehicle system evaluates vehicle operation conditions, such as vehicle stability, oscillation and speed, and provides a corresponding judgment to block 428. At block 434 the vehicle system determines a quality factor for each RGE algorithm ($QF_{st}$, $QF_{kin}$, $QF_{dyn}$), along with an overall RGE quality factor ($QF_{RGE}$). In one or more embodiments the $QF_{RGE}$ is provided with the $RGE_{out}$ to other vehicle systems. Such quality evaluations are described in detail with respect to FIGS. 25-27G. Generally, a quality factor evaluates both the availability and the accuracy of the estimated information. The quality factor is selected from a range of 0-3, where a quality value of three (3) indicates full quality, two (2) indicates some degradation, (1) indicates poor quality, and a value of zero indicates that estimation is not currently available.

Figure 5:
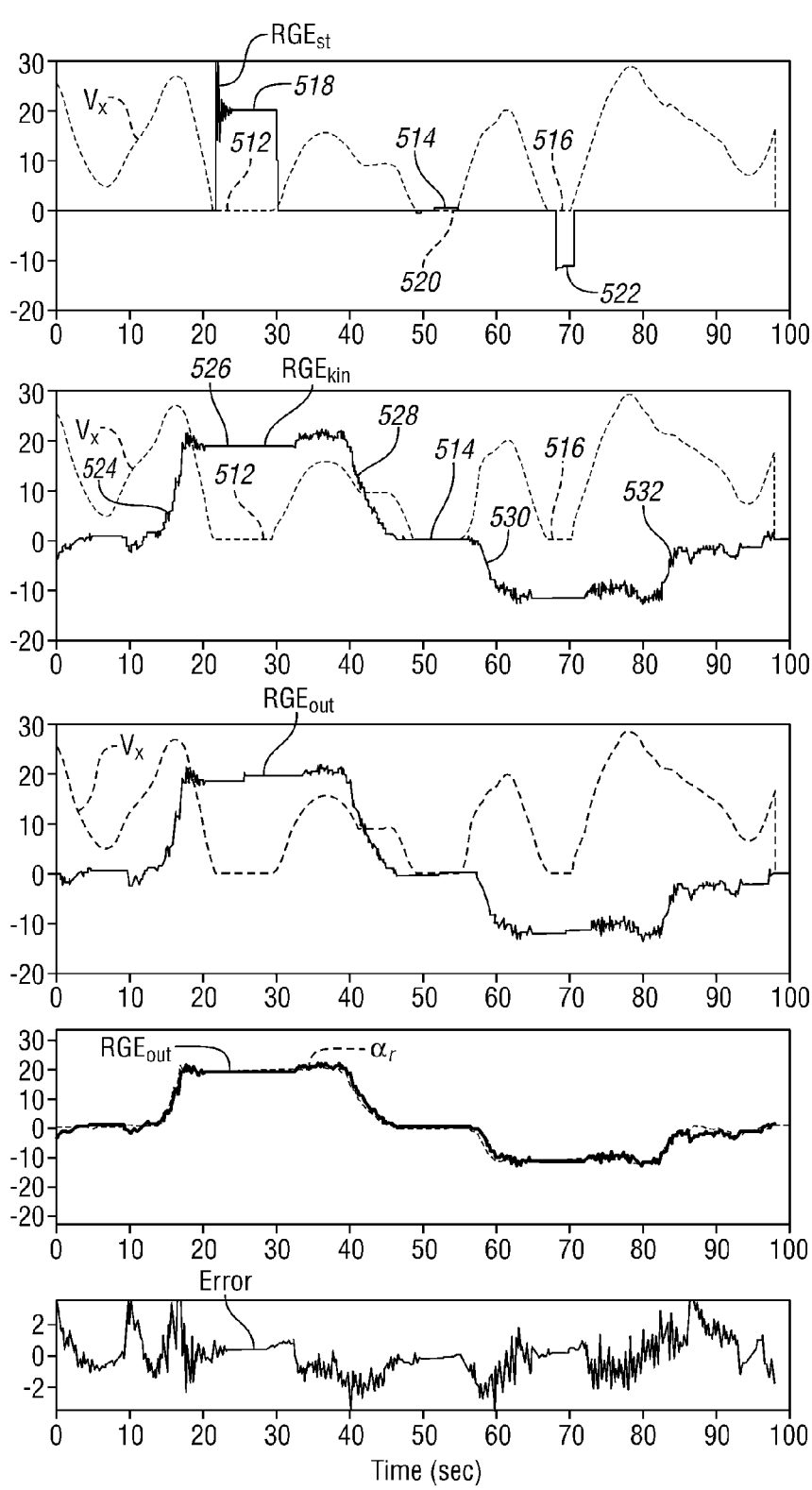
FIGS. 5A-5E are time plots illustrating road gradient estimations controlled by the method of FIG. 4.

FIGS. 5A-5E illustrate the impact of the method 410 for arbitrating road gradient estimations of FIG. 4. FIGS. 5A-5E include 5 graphs of measurement data taken over a common period of time on a road having a known actual road gradient. FIG. 5A illustrates vehicle speed (Vx) and the static road gradient estimation ($RGE_{st}$). FIG. 5B illustrates vehicle speed (Vx) and the kinematic road gradient estimation ($RGE_{kin}$). FIG. 5C illustrates vehicle speed (Vx) and the road gradient estimation output ($RGE_{out}$). FIG. 5D illustrates the road gradient estimation output ($RGE_{out}$) and the actual road gradient ($\alpha_r$). FIG. 5E illustrates the percent error between $RGE_{out}$ and $\alpha_r$.

FIG. 5A-5C illustrate how the method 410 arbitrates between the static and kinematic road gradient estimations during a drive cycle where the vehicle makes a number of stops. Vehicle speed (Vx) is illustrated on each of FIGS. 5A-5C. The vehicle makes three stops in the illustrated embodiment, which are referenced by numerals 512, 514 and 516.

As depicted in FIG. 5A, the static road gradient estimate ($RGE_{st}$) is available when the vehicle stops, or is at standstill. At the first stop 512, the $RGE_{st}$ indicates that the road gradient is approximately 20%, as represented by numeral 518. The $RGE_{st}$ indicates that the road gradient is approximately 0% at the second stop, and −12% at the third stop, as indicated by numerals 520 and 522 respectively. When the vehicle is moving, static road gradient estimation is not available, and the $RGE_{st}$ waveform is equal to zero, according to one or more embodiments.

As depicted in FIG. 5B, the kinematic road gradient estimate ($RGE_{kin}$) is available when the vehicle is moving or during normal vehicle motion. Prior to the first stop 512, the $RGE_{kin}$ indicates that the road gradient increases from approximately 0% to 20%, as represented by numeral 524. At the first stop 512, $RGE_{kin}$ is not available, and $RGE_{kin}$ latches/locks to the last $RGE_{kin}$ value as represented by numeral 526. Between the first stop 512 and the second stop 514, the $RGE_{kin}$ decreases from approximately 20% to 0% as represented by numeral 528. Between the second stop 514 and the third stop 516, the $RGE_{kin}$ decreases from approximately 0% to −12% as represented by numeral 530. After the third stop 516, the $RGE_{kin}$ increases from −12% to 0%, as represented by numeral 532.

As depicted in FIG. 5C, the output road gradient estimate ($RGE_{out}$) as described with reference to FIG. 4, generally selects $RGE_{st}$ at standstill conditions and $RGE_{kin}$ when the vehicle is moving. FIG. 5D illustrates $RGE_{out}$ along with the actual road gradient ($a_r$). FIG. 5E depicts the percent error (Error) between $RGE_{out}$ and $\alpha_r$. For this example, the error is approximately +/−4%.

Table A depicts a comparison of the inputs and vehicle conditions associated with the algorithms for estimating road gradient, and is shown below:

| | Estimation Input | | | Estimation Availability | | | |
|---|---|---|---|---|---|---|---|
| RGE Algorithms | Vehicle Speed | Acceleration | Wheel Torque & Force | Standstill | Very Low Speeds | Normal Motion | Convergence Phase |
| Static | | X | | X | | | Yes* |
| Kinematic | X | X | | | | X | Yes |
| Dynamic | X | | X | X | | X | Yes |

Column 1 of Table A illustrates the three road gradient estimation algorithms: static, kinematic and dynamic. Columns 2-4 depict the primary inputs that each algorithm uses for its estimate. For example, the vehicle system estimates a static road gradient based on vehicle acceleration. The vehicle system estimates a kinematic road gradient based on vehicle speed and acceleration, and the vehicle system estimates a dynamic road gradient based on vehicle speed and wheel torque/force. These inputs may be measured values, or derived values as described with reference to FIG. 1. Additionally, in some embodiments, the vehicle system uses inputs in addition to those depicted in FIG. 5, for the corresponding road gradient estimates.

Columns 5-8 depict the vehicle conditions at which each road grade estimate is available. For example, the static road gradient estimation is available when the vehicle is at standstill. The kinematic road gradient estimation is available when the vehicle is in normal motion, (e.g., vehicle speed is greater than 5 mph). The dynamic road gradient estimation is available when the vehicle is at standstill, or during normal vehicle motion. Although column 6 of the table indicates that none of the estimates are available at very low vehicle speeds, (e.g., less than 5 mph), the vehicle system still provides an accurate road gradient estimate during such conditions, as described below with reference to FIGS. 25-26C.

Column 7 depicts the convergence phase of each estimate. The convergence phase relates to the amount of time it takes the vehicle system to estimate a road gradient using each algorithm during a transition between vehicle conditions (e.g., from standstill to very low speed, to normal motion).

Figure 6:
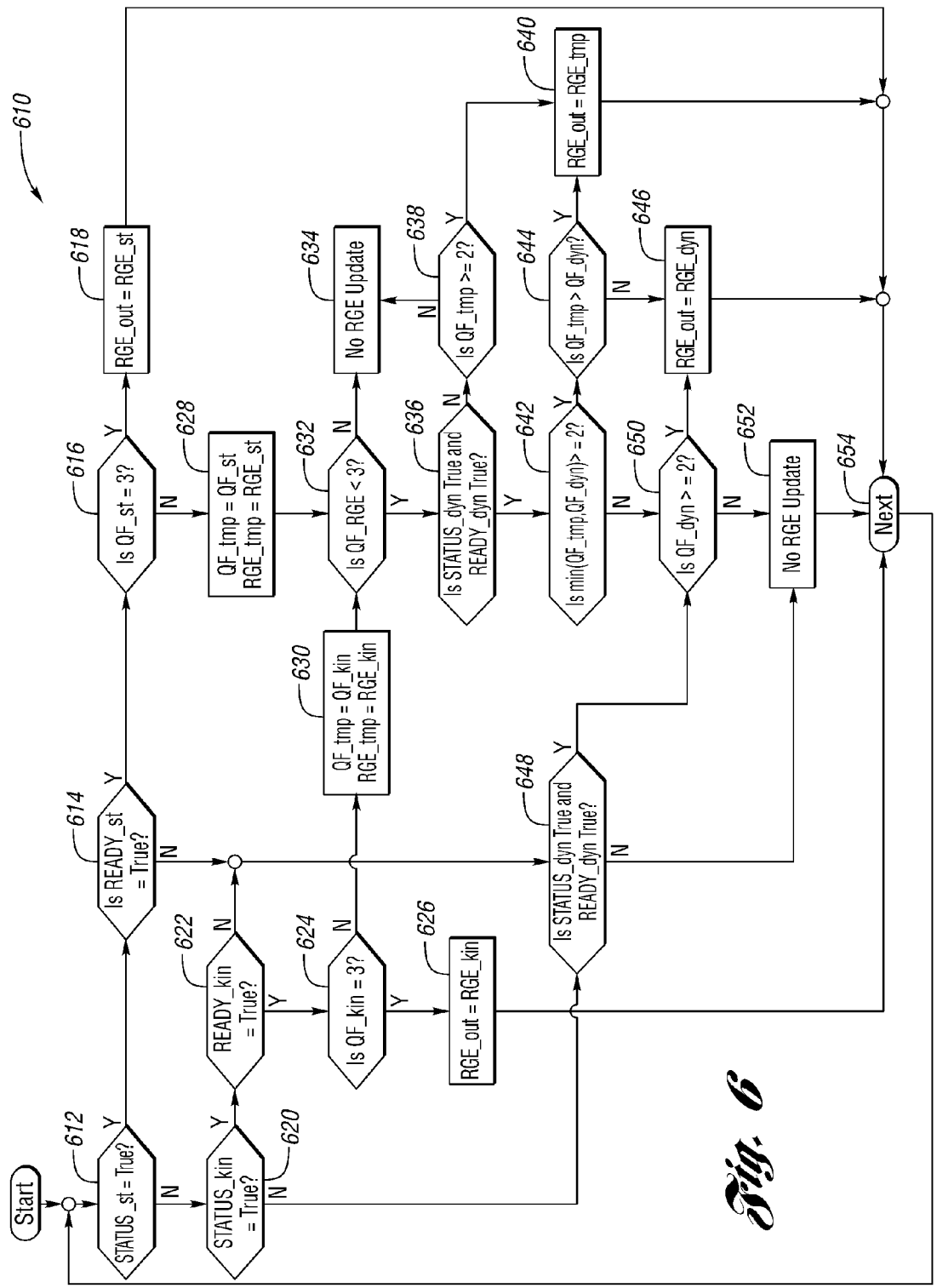
FIG. 6 is a flow chart illustrating a method for arbitrating road gradient estimations according to one or more embodiments.

With reference to FIG. 6, a method for arbitrating road gradient estimations is illustrated in accordance with one or more embodiments and is generally referenced by numeral 610. The method is implemented using software code contained within the VSC, according to one or more embodiments. In other embodiments, the method 610 is implemented in other vehicle controllers, or distributed amongst multiple vehicle controllers. In one or more embodiments, the operations of the method 610 correspond to the operations of method 410 described with reference to FIG. 4. The vehicle system includes a number of algorithms for estimating road gradient, where each algorithm is suited for different vehicle conditions. The method 610 selects a road gradient estimation algorithm based on estimation status, estimation readiness and estimation quality factors.

The estimation status factor for each RGE algorithm (static, kinematic, and dynamic) is defined as a Boolean variable (TRUE/FALSE) and represented by variables ($STATUS_{st}$, $STATUS_{kin}$, and $STATUS_{dyn}$). The estimation status factor indicates whether the estimation condition is satisfied and if the estimation function is updating its state at a corresponding RGE channel ($RGE_{st}$, $RGE_{kin}$, and $RGE_{dyn}$). A status value of TRUE indicates that the estimation method is actively monitoring the vehicle dynamic states (e.g., Vx, $a_x^s$, $a_y^s$, $a_z^s$, and r) and the road gradient information and its estimation channel are updating.

The estimation readiness factor for each RGE algorithm (static, kinematic, and dynamic) is also defined as a Boolean variable (TRUE/FALSE) and represented by variables ($READY_{st}$, $READY_{kin}$, and $READY_{dyn}$). The estimation readiness generally indicates the present usefulness of the RGE function. More specifically, the static estimation readiness ($READY_{st}$) indicates whether $RGE_{st}$ has already provided a road grade estimate for the present vehicle location. The kinematic and dynamic estimation readiness values ($READY_{kin}$, and $READY_{dyn}$) indicate that their estimation state is validated with quality factor greater than 2 (degraded, or full quality) for more than a threshold period of time. In the presence of an unqualified estimation condition, the accumulated time under such condition has not exceeded another time threshold such that the estimation state has not deviated out of the degraded boundary.

The estimation quality factor for the RGE output as well as that for each RGE algorithm (static, kinematic, and dynamic) corresponds to a value between 0-3, and is represented by variables ($QF_{RGE}$, $QF_{st}$, $QF_{kin}$, and $QF_{dyn}$). The estimation quality factor evaluates both the availability and the accuracy of the estimated road gradient information. $QF_{RGE}$ is the general RGE output signal quality evaluation, which is based on the quality factor of the selected RGE algorithm, and further processed according to the vehicle's dynamic situation after the update event. Such quality evaluation is described in detail with respect to FIGS. 25-26C. For the evaluated quality factor from individual channels, $QF_{st}$, $QF_{kin}$, and $QF_{dyn}$, a value of 3 indicates full quality and a value of 2 indicates that estimation is still available but it is possible that the current value is outside of the specified precision range.

At operation 612, the vehicle system evaluates the current estimation status of the static RGE function to determine if $STATUS_{st}$ is equal to TRUE. If the determination at operation 612 is positive, the vehicle system proceeds to operation 614. At operation 614, the vehicle system evaluates the current estimation readiness of the static RGE function to determine if $READY_{st}$ is equal to TRUE. If the determination at operation 614 is positive, the vehicle system proceeds to operation 616. At operation 616, the vehicle system evaluates the current estimation quality of the static RGE function to determine if $QF_{st}$ is equal to three (full quality). If the determination at operation 616 is positive, the vehicle system proceeds to operation 618, and selects the static road gradient estimation by setting the RGE output equal to $RGE_{st}$. If the determination at operation 612 is negative, the vehicle system proceeds to operation 620.

At operation 620, the vehicle system evaluates the current estimation status of the kinematic RGE function to determine if $STATUS_{kin}$ is equal to TRUE. If the determination at operation 620 is positive, the vehicle system proceeds to operation 622. At operation 622, the vehicle system evaluates the current estimation readiness of the kinematic RGE function to determine if $READY_{kin}$ is equal to TRUE. If the determination at operation 622 is positive, the vehicle system proceeds to operation 624. At operation 624, the vehicle system evaluates the current estimation quality of the kinetic RGE function to determine if $QF_{kin}$ is equal to three (full quality). If the determination at operation 616 is positive, the vehicle system proceeds to operation 626 and selects the kinematic road gradient estimation by setting the RGE output equal to $RGE_{kin}$.

The static and kinematic road gradient estimations are preferred over $RGE_{dyn}$ because $RGE_{dyn}$ has lower quality conditions due to the additional signals in its estimation, and the noise in each signal will be propagated in the final RGE output. Therefore even if the static and kinematic quality factors are less than three, the vehicle system may still select $RGE_{st}$ or $RGE_{kin}$ over $RGE_{dyn}$.

If the determination at operation 616 is negative, then $QF_{st}$ is less than 3, and the vehicle system proceeds to operation 628. At operation 628 the vehicle system sets a temporary quality factor value ($QF_{tmp}$) equal to $QF_{st}$, and a temporary road gradient estimate ($RGE_{tmp}$) equal to $RGE_{st}$. Similarly, if the determination at operation 624 is negative, then $QF_{kin}$ is less than 3, and the vehicle system proceeds to operation 630. At operation 630 the vehicle system sets a temporary quality factor value ($QF_{tmp}$) equal to $QF_{kin}$, and a temporary road gradient estimate ($RGE_{tmp}$) equal to $RGE_{kin}$. After both operations 628 and 630, the vehicle system proceeds to operation 632 to evaluate the overall RGE quality factor ($QF_{RGE}$).

At operation 632 the vehicle system determines if $QF_{RGE}$ is less than 3. If the determination is negative, the vehicle system proceeds to operation 634 and does not update RGE. If the overall RGE has full quality, the vehicle system is not going to select a different RGE of lesser quality. If the determination at operation 632 is negative, then the vehicle system proceeds to operation 636.

At operation 636, the vehicle system evaluates the current estimation status and the current estimation readiness of the dynamic RGE function to determine if both $STATUS_{dyn}$ and $READY_{dyn}$ are equal to TRUE. If the determination at operation 636 is negative, the vehicle system proceeds to operation 638. At operation 638 the vehicle system evaluates the temporary quality factor $QF_{tmp}$ to determine if it is greater than or equal to 2. If the determination at operation 638 is negative, the vehicle system proceeds to operation 634 and does not update RGE. If the determination at operation 638 is positive, the vehicle system proceeds to operation 640 and selects the temporary road gradient (static or kinematic) by setting RGE equal to $RGE_{tmp}$. If the determination at operation 636 is positive, the vehicle system proceeds to operation 642.

At operation 642, the vehicle system evaluates the temporary quality factor ($QF_{tmp}$) and the dynamic quality factor ($QF_{dyn}$), to determine if the minimum value of $QF_{tmp}$ and $QF_{dyn}$ is greater than or equal to 2. If the determination at operation 642 is positive, the vehicle system proceeds to operation 644. At operation 644 the vehicle system determines if $QF_{tmp}$ is greater than $QF_{dyn}$. If the determination at operation 644 is positive, the vehicle system proceeds to operation 640 and selects the temporary road gradient (static or kinematic) by setting RGE equal to $RGE_{tmp}$. If the determination at operation 644 is negative ($QF_{tmp}$ is not greater than $QF_{dyn}$), then the vehicle system proceeds to operation 646 and selects the dynamic road gradient by setting RGE equal to $RGE_{dyn}$.

If the determination at operations 614, 620 or 622 is negative, the vehicle system proceeds to operation 648. At operation 648, the vehicle system evaluates the current estimation status and the current estimation readiness of the dynamic RGE function to determine if both $STATUS_{dyn}$ and $READY_{dyn}$ are equal to TRUE.

If the determination at operation 648 is positive, the vehicle system proceeds to operation 650. At operation 650, the vehicle system evaluates the current estimation quality of the dynamic RGE function to determine if $QF_{dyn}$ is greater than or equal to two. If the determination at operation 650 is positive, the vehicle system proceeds to operation 646 and selects the dynamic road gradient estimation by setting the RGE output equal to $RGE_{dyn}$. If the determination at operations 648 or 650 are negative, the vehicle system proceeds to operation 652 and does not update the RGE output, by latching the RGE output value to the previous RGE output value. After operations 618, 626, 640, 646, and 652 the vehicle system proceeds to operation 654. At operation 654 the vehicle system provides the RGE output and QF, and then returns to operation 612 for another iteration of the method 610.

As such the vehicle system provides advantages over existing systems by arbitrating or selecting a road gradient estimation from a number of different estimations (static, kinematic, and dynamic). Each road gradient estimation is suited for different vehicle conditions. By arbitrating between these different estimations, the vehicle system provides a road gradient estimation over a wide range of vehicle conditions.

Referring back to FIG. 2, the static and kinematic road grade estimates are based on vehicle kinematic equations. Kinematics generally refers to description of how a body moves in space and time. The vehicle kinematic equations are based on the vehicle acceleration values ($a_x^s$, $a_y^s$, $a_z^s$) that are provided by the inertial sensors (52). The coordinate system (x, y, z) is oriented relative to the road and about the center of gravity (CG) of the vehicle. However, the inertial sensors 52 are mounted offset from the coordinate system (x, y, z), where $l_c$ is a lateral offset and $l_d$ is a longitudinal offset. Additionally, the inertial sensors 52 provide output signals that are offset from the coordinate system due to the vehicle suspension. The vehicle pitch angle ($\theta$) represents an angular offset from the longitudinal (x) axis. The vehicle roll angle ($\phi$) (not shown) represents an angular offset from the lateral (y) axis, and the vehicle yaw rate (r) represents an angular offset from the vertical (z) axis. The vehicle system estimates the road gradient ($\alpha_r$), and therefore separates the vehicle offsets (e.g., vehicle pitch angle ($\theta$)) from the road gradient ($\alpha_r$).

The governing kinematic vehicle frame equations are represented below:

$$a_x^s + l_c \dot{r} = (\dot{V}_x - r^*V_y)\cos\theta + g\sin(\alpha_r + \theta) \quad (1)$$

$$a_y^s + l_d \dot{r} = (\dot{V}_y + r^*V_x)\cos\theta - g\sin\phi\cos(\alpha_r + \theta) \quad (2)$$

$$a_z^s = \dot{V}_x \sin\theta + g\cos(\alpha_r + \theta) + n_{az} \quad (3)$$

where $a_x^s$, $a_y^s$, $a_z^s$ are the vehicle longitudinal, lateral and vertical accelerations. $l_c$ is the sensor lateral offset displacement form the vehicle rotational center (CG) in a turning maneuver, and $l_d$ is the sensor longitudinal offset displacement. $V_x$ and $V_y$ are longitudinal speed and lateral speed; and $\dot{V}_x$, $\dot{V}_y$, and $\dot{V}_z$, are the calculated longitudinal, lateral and vertical accelerations; $\theta$ is the vehicle pitch angle and r is the yaw rate. $\phi$ is the total vehicle roll angle, which corresponds to the sum of the vehicle body roll angle $\phi_v$ and the road bank angle $\phi_b$. Additionally, $n_{az}$ represents all of the vertical acceleration disturbances caused by vehicle suspension oscillation and road surface fluctuation.

The vehicle system estimates a static road gradient based on the vehicle longitudinal acceleration and equation 1. Since the vehicle is static, or at standstill, the longitudinal velocity ($V_y$), the longitudinal acceleration ($\dot{V}_x$), yaw rate, and the derivative of the yaw rate are set to zero, and the kinematic equations are simplified. Equation 4 illustrates an equation for calculating longitudinal acceleration at static conditions, and is shown below:

$$a_x^s = g(\alpha_r + \theta) \approx g\sin\alpha_r + g\theta \quad (4)$$

The vehicle pitch angle ($\theta$) due to suspension deflection is proportional to the road gradient angle as $\theta \approx K_p(g\sin\alpha_r)$ where $K_p$ represents the stiffness of the vehicle body at steady state. $K_p$ is a predetermined value based on the magnitude of $a_x^s$. In one or more embodiments, the VSC includes stored data corresponding to a lookup table of pre-calibrated data with the value of $K_p$ interpolated with respect to the vector of $a_x^s$ values across its positive and negative operating range. Equation 5 illustrates an intermediate derivation step, and equation 6 provides an equation for calculating the road gradient ($\alpha_r$) at static conditions, as shown below:

$$a_x^s \approx g(1 + K_p \cdot g)\sin\alpha_r \quad (5)$$

$$\alpha_r = a\sin\left(\frac{a_x^s}{g(1 + K_p g)}\right) \quad (6)$$

Generally, the static RGE is the most accurate algorithm among the three RGE estimations since it involves the minimal estimation input and it is the most directly derived estimation results. However, the static RGE is only available at vehicle standstill conditions.

Figure 7:
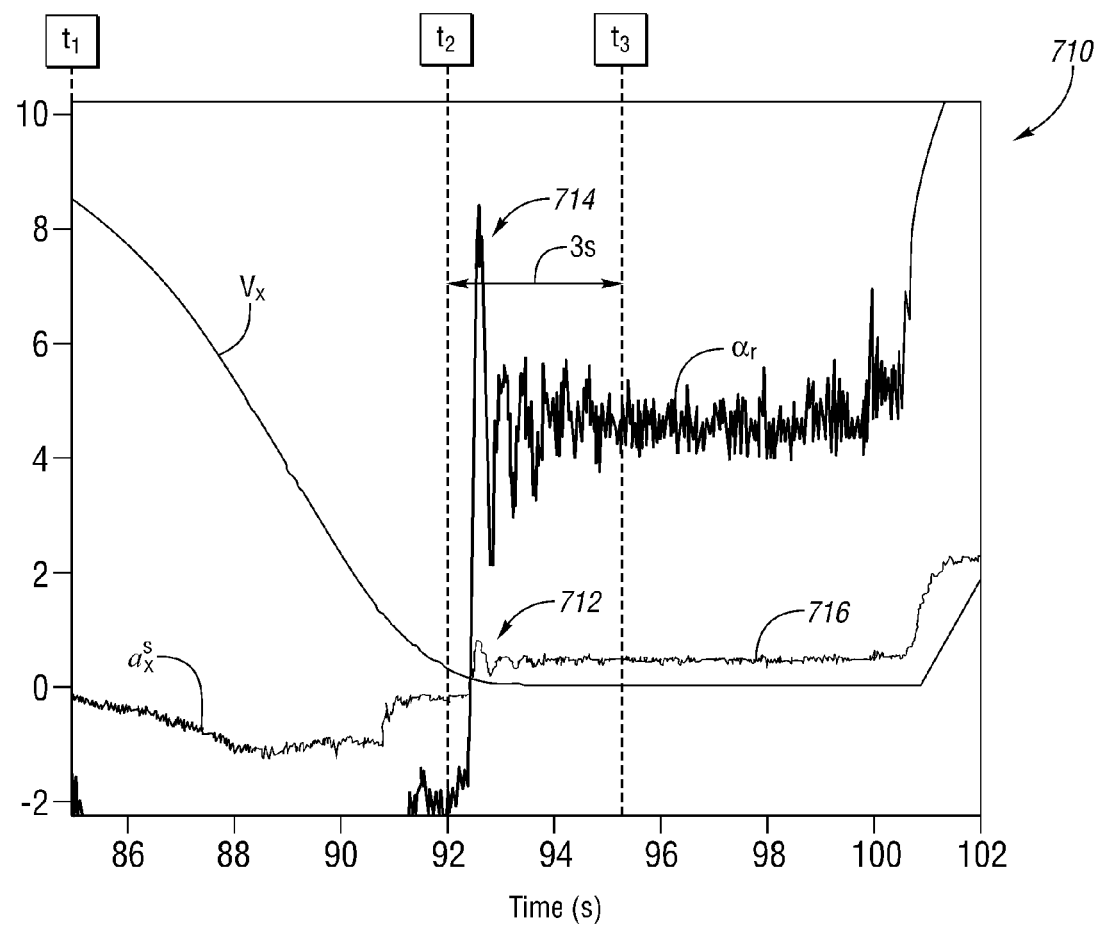
FIG. 7 is a time plot illustrating vehicle speed and acceleration.

FIG. 7 illustrates measurement data taken as the vehicle stops on a grade, according to one or more embodiments. FIG. 7 illustrates input signals vehicle speed (Vx), and longitudinal acceleration ($a_x^s$), along with road grade ($\alpha_r$) data calculated according to equation 6. At time $t_1$, the vehicle is decelerating as indicated by the decreasing slope of Vx. At time $t_2$, the vehicle stops. After the vehicle stops, there is noise present on the longitudinal acceleration signal ($a_x^s$) due to vehicle body oscillations, as referenced by numeral 712. This noise is amplified by the road gradient calculation, as illustrated by the road gradient $\alpha_r$ waveform, and referenced by numeral 714. At time $t_3$, the longitudinal acceleration signal ($a_x^s$) has converged enough to provide quality information for road grade estimation, as referenced by numeral 716. The time difference between $t_2$ and $t_3$ is approximately 3 s in the illustrated embodiment. Therefore a vehicle system relying on the road gradient ($\alpha_r$) calculation for RGE, may wait approximately 3 s before using the value.

This time delay results in decreased fuel efficiency for a micro-hybrid utilizing engine start/stop functionality.

Figure 8:
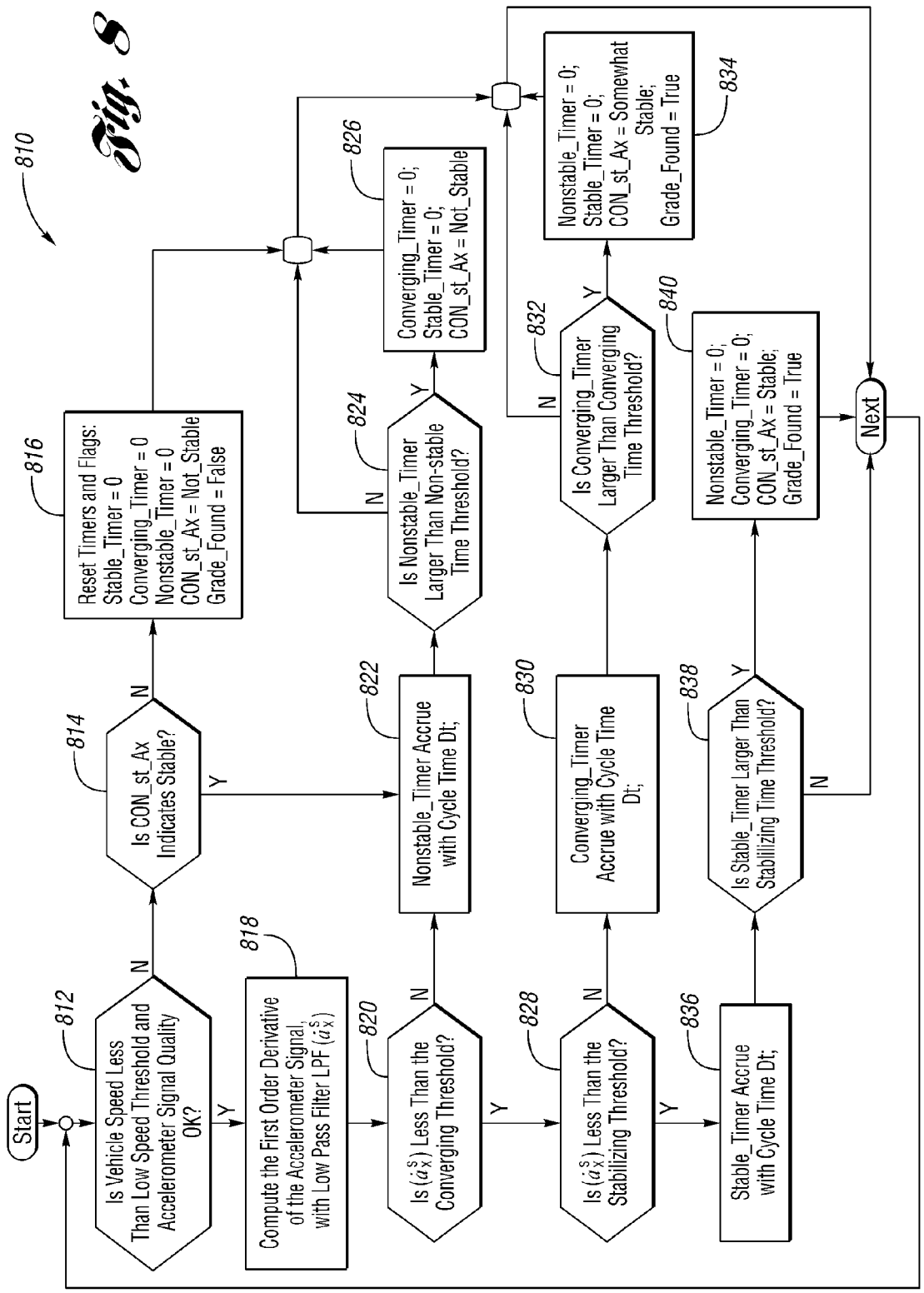
FIG. 8 is a flow chart illustrating a method for evaluating accelerometer convergence status according to one or more embodiments.

With reference to FIG. 8, a method for evaluating accelerometer convergence status is illustrated in accordance with one or more embodiments and is generally referenced by numeral 810. The method is implemented using software code contained within the VSC, according to one or more embodiments. While the vehicle system is estimating the static road gradient, its estimation state and quality may be continuously monitored. High quality estimation occurs when the accelerometer output ($a_x^s$) is converged and ($a_x^s$) is kept in such a steady state for a minimal amount of time. The accelerometer output ($a_x^s$) is assigned a convergence status factor ($CON_{st}$) that indicates whether the raw signal is in steady state or not in three level of label code. Where $CON_{st}$ that is equal to 0, indicates that the convergence is not stable; a $CON_{st}$ equal to 1 indicates that the convergence is somewhat stable; and a $CON_{st}$ equal to 2 indicates that the convergences is very stable.

Additionally, the convergence status signal ($CON_{st}$) is also used to evaluate the static RGE output quality. For example, in one or more embodiments, a $CON_{st}$ of 2 (very stable), corresponds to a highest or full quality estimation ($QF_{st}=3$). A $CON_{st}$ of 1 (somewhat stable) corresponds to a degraded quality estimation ($QF_{st}=2$). A $CON_{st}$ of 0 (not stable) corresponds to a non-qualified estimation ($QF_{st}=1$), or no data ($QF_{st}=0$). The convergence status signal ($CON_{st}$) is based on the derivative of longitudinal acceleration.

At operation 812 the vehicle system evaluates the vehicle speed (Vx) and the convergence status factor ($CON_{st}$) to determine if both Vx is less than a low speed threshold; and if the accelerometer signal quality is ok (e.g., if $CON_{st}=2$). If the determination at operation 812 is negative, the vehicle system proceeds to operation 814. At operation 814 the vehicle system evaluates the convergence status factor ($CON_{st}$) to determine if CONst indicates that the signal is stable (e.g., if $CON_{st}=2$). If the determination at operation 814 is negative, the vehicle system proceeds to operation 816 and resets the timers and flags by setting a stable timer, a converging timer, a nonstable timer, and the convergence status factor ($CON_{st}$) all to zero ($CON_{st}$=Not Stable). The vehicle system also sets a Grade$_{found}$ flag equal to FALSE, when there is an RGE value available. Grade$_{found}$ indicates whether a valid estimation (RGEst) has already been provided for a present vehicle stop event. A Grade$_{found}$ that is equal to TRUE indicates that a valid $RGE_{st}$ has already been provided, and Grade$_{found}$ that is equal to FALSE indicates that a valid $RGE_{st}$ has not already been provided or is no longer valid. If the determination at operation 812 is positive, the vehicle system proceeds to operation 818.

At operation 818 the vehicle system computes a longitudinal jerk ($\dot{a}_x^s$), or a first order derivative of the longitudinal acceleration using a low pass filter. At operation 820, the vehicle system compares the jerk ($\dot{a}_x^s$) to a converging threshold to determine if $\dot{a}_x^s$ is less than the converging threshold. If the determination at operation 820 is negative, then the vehicle system proceeds to operation 822 and the nonstable timer accrues with cycle time Dt. The vehicle system also proceeds to operation 822 if the determination at operation 814 is positive. At operation 824 the vehicle system evaluates the non-stable timer, to determine if the non-stable timer is greater than a non-stable timer threshold. If the determination at operation 824 is positive, the vehicle system proceeds to operation 826 and sets the converging timer, the stable timer and the converging status factor ($CON_{st}$) all to zero ($CON_{st}$=Not Stable). If the determination at operation 820 is positive, the vehicle system proceeds to operation 828.

At operation 828 the vehicle system evaluates the longitudinal jerk ($\dot{a}_x^s$), to determine if $\dot{a}_x^s$ is less than a stabilizing threshold. If the determination at operation 828 is negative, the vehicle system proceeds to operation 830 and the converging timer accrues with cycle time Dt. At operation 832 the vehicle system evaluates the converging timer to determine if the converging timer is greater than the converging time threshold. If the determination at operation 832 is positive, the vehicle system proceeds to operation 834 and resets the nonstable and stable timers by setting them equal to zero; sets the converging status factor to somewhat stable ($CON_{st}=1$); and sets the Grade$_{found}$ to TRUE. If the determination at operation 828 is positive, the vehicle system proceeds to operation 836.

At operation 836 the stable timer accrues with cycle time Dt. At operation 838 the vehicle system evaluates the stable timer to determine if the stable timer is greater than a stabilizing time threshold. If the determination at operation 838 is positive, the vehicle system proceeds to operation 840 and resets the nonstable and converging timers by setting them equal to zero; sets the converging status factor to very stable ($CON_{st}=2$); and sets the Grade$_{found}$ to TRUE.

Figure 9:
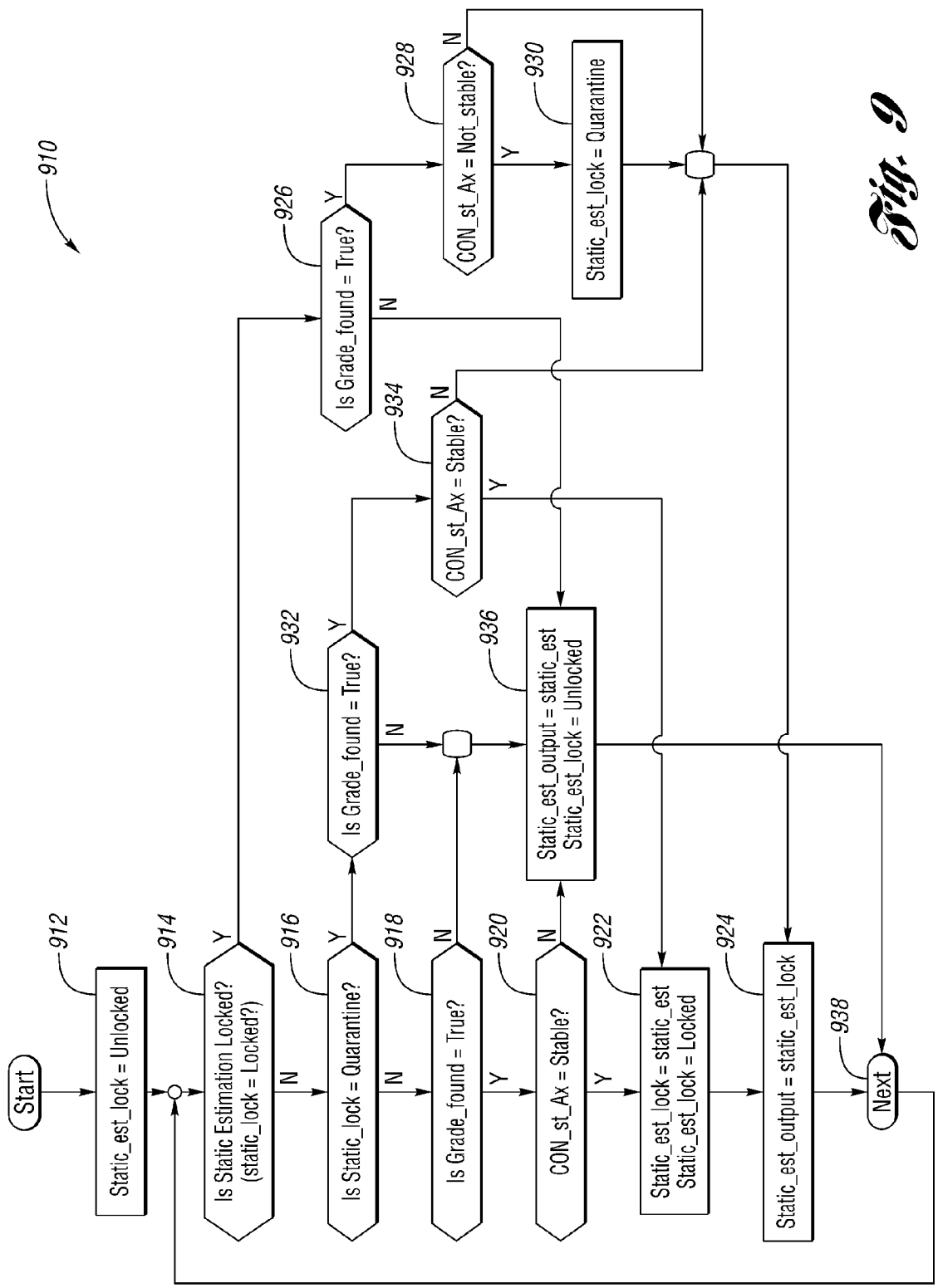
FIG. 9 is a flow chart illustrating a method for locking the static road gradient output according to one or more embodiments.

With reference to FIG. 9, a method for locking the static road gradient output is illustrated in accordance with one or more embodiments and is generally referenced by numeral 910. The method is implemented using software code contained within the VSC, according to one or more embodiments. Generally once the vehicle system determines that the convergence status is very stable (e.g., $CON_{st}=2$), then $RGE_{st}$ is locked to avoid any impact from future vehicle disturbances. The lock will be released when the vehicle system detects that the vehicle is moving. A STATIC$_{lock}$ signal indicates whether $RGE_{st}$ is locked, unlocked or quarantined. A lock status of quarantined, indicates an intermediate state between lock and unlock where the vehicle system is waiting for additional information.

At operation 912 the vehicle system enters an initialization state that sets the STATIC$_{lock}$ signal equal to unlocked. At operation 914, the vehicle system evaluates the STATIC$_{lock}$ signal to determine if the static road gradient ($RGE_{st}$) is locked. If the determination at operation 914 is negative, the vehicle system proceeds to operation 916. At operation 916 the vehicle system determines if the STATIC$_{lock}$ signal is quarantined. If the determination at 916 is negative, the vehicle system proceeds to operation 918. At operation 918 the vehicle system determines if the GRADE$_{found}$ is TRUE. The GRADE$_{found}$ signal is based on the current $RGE_{out}$ signal. If the determination at operation 918 is positive, the vehicle system proceeds to operation 920. At operation 920 the vehicle system evaluates the convergence status signal to determine if $CON_{st}$ is "very" stable, (e.g., if $CON_{st}=2$). If the determination at operation 920 is positive, the vehicle system proceeds to operation 922 and sets STATIC$_{lock}$ to locked. Then in operation 924 the static road gradient estimate ($RGE_{st}$) is locked. If the determination at operation 914 is positive (e.g., STATIC$_{lock}$=locked) then the vehicle system proceeds to operation 926.

At operation 926 the vehicle system evaluates the grade found (GRADE$_{found}$) to determine if GRADE$_{found}$=TRUE. If the determination at operation 926 is positive, the vehicle system proceeds to operation 928 and evaluates the convergence status signal to determine if $CON_{st}$ is not stable, (e.g., if $CON_{st}=0$). If the determination at operation 928 is positive, the vehicle system proceeds to operation 930 and sets STATIC$_{lock}$ to quarantined. After operation 930, and if the determination at operations 928 or 934 are negative, the vehicle system proceeds to operation 924 and locks the static road gradient estimate (RGE$_{st}$). If the determination at operation 916 is positive, the vehicle system proceeds to operation 932.

At operation 932 the vehicle system evaluates the grade found signal to determine if GRADE$_{found}$=TRUE. If the determination at operation 932 is positive, the vehicle system proceeds to operation 934 and evaluates the convergence status signal to determine if CON$_{st}$ is very stable, (e.g., if CON$_{st}$=2). If the determination at operation 934 is positive, the vehicle system proceeds to operation 922 and sets STATIC$_{lock}$ to locked. If the determination at operation 932, 918, 920 or 926 is negative, the vehicle system proceeds to operation 936 sets STATIC$_{lock}$ to locked. After operations 936 and 924, the vehicle system proceeds to operation 938, and then returns to operation 914.

Figure 10A:
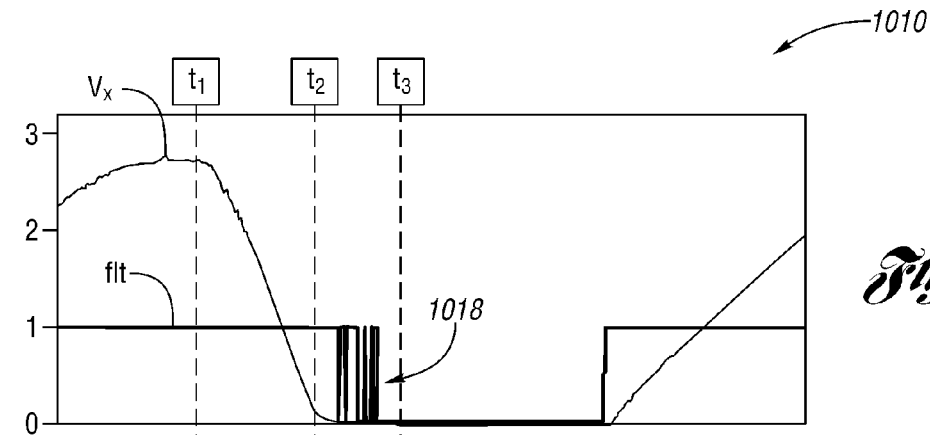
FIGS. 10A-10C are time plots illustrating vehicle speed, acceleration and road gradient estimations as controlled by the method of FIG. 9.
Figure 10B:
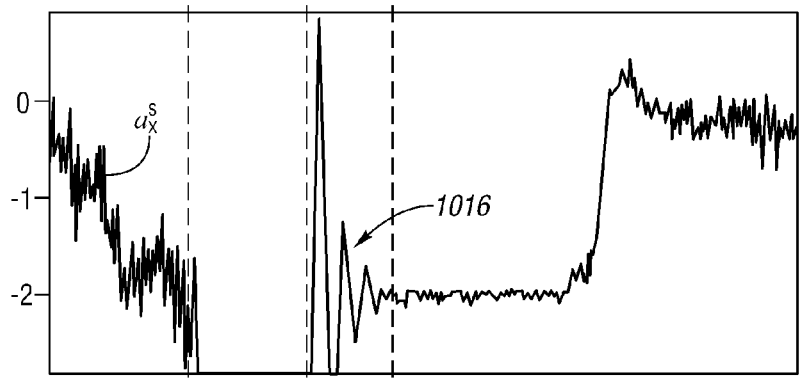
Figure 10C:
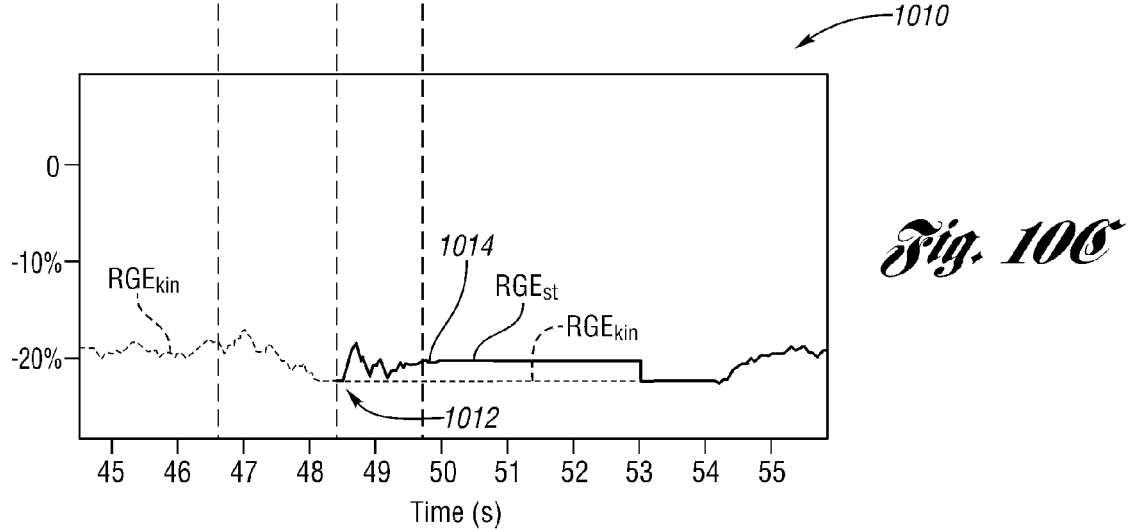

With reference to FIGS. 10A-10C, the vehicle system estimates the static road gradient (RGEst) based on the methods 810 and 910 of FIGS. 8 and 9. FIGS. 10A-10C include 3 graphs of measurement data taken over a common period of time and are generally referenced by numeral 1010. Additionally, the vehicle system estimates an initial value for RGE$_{st}$ based on either the kinematic or dynamic road gradient estimates, and then filters the longitudinal acceleration signal (a$_x^s$) using a low pass filter having a variable bandwidth to determine RGE$_{st}$, according to one or more embodiments.

FIG. 10A illustrates vehicle speed (Vx) and a signal representing the variable bandwidth of the low pass filter (flt) where the filter has a narrow bandwidth when flt is equal to 1, and a wide bandwidth when flt is equal to zero. FIG. 10B illustrate the measured longitudinal acceleration value (a$_x^s$). FIG. 10C illustrates the static road grade estimation (RGE$_{st}$) along with the kinematic road grade estimation (RGE$_{kin}$). In one or more embodiments the bandwidths are distributed along a frequency range between 2.5 Hz and 0.04 Hz; where the wide bandwidth corresponds to the high end of the frequency range and the narrow bandwidth corresponds to the low end of the frequency range. In other embodiments, the wide bandwidth corresponds to approximately 1 Hz and the narrow bandwidth corresponds to approximately 0.05 Hz.

The vehicle system estimates an initial value for RGEst based on either the kinematic or dynamic road gradient estimates. If no estimates are available, the vehicle system will use a default value. Since the static RGE function only starts after the vehicle speed is lower than a predefined speed threshold, (e.g., 1 kph), the initial value of the estimation algorithm is a factor in the convergence time, or the time delay until RGE$_{st}$ converges to the actual road gradient. Fortunately, the vehicle system includes multiple road gradient algorithms. The other kinematic and dynamic estimation algorithms primarily work in the condition while the vehicle is in motion. Thus, before the start of the static RGE algorithm, information about the road gradient several seconds before the current time or several meters after the vehicle (assuming the vehicle is driving forward) shall be available from the other RGE algorithms and they are the valid reference for the static RGE algorithm to start with. After that, the static RGE algorithm takes over the main estimation task to continue monitoring the road gradient variation while the other two algorithms are paused in absence of qualified estimation conditions. More specifically, the static RGE algorithm, when estimation conditions satisfy, will take the output of either the kinematic or the dynamic estimation algorithm as its initial value depending on which one has the highest quality evaluation. When neither of them has satisfied quality, a default value will be used instead. The qualified static estimation condition is that the vehicle speed will be lower than a speed threshold and such speed threshold will be smaller than the speed thresholds that used to determine on-hold of the other two RGE algorithms.

At time t$_1$, the vehicle starts decelerating as indicated by the decreasing slope of Vx. At time t$_2$, the vehicle stops and the RGE becomes active. Rather than starting from 0%, and converging to the actual road gradient, the RGE starts from the last RGE$_{kin}$ value, as shown at point 1012 where RGE$_{st}$ is equal to RGE$_{kin}$, and both of which are approximately equal to −22%. Then as RGE accumulates data, it converges to actual road gradient of approximately −20% at time t$_3$ as referenced by numeral 1014.

After the vehicle stops, there is noise present on the longitudinal acceleration signal (a$_x^s$) due to vehicle body oscillations, as referenced by numeral 1016. The vehicle system filters the longitudinal acceleration signal (a$_x^s$) using a low pass filter having a variable bandwidth, as referenced by the flt waveform at 1018. The vehicle system computes a filtered longitudinal acceleration value by dynamically filtering the a$_x^s$ data using a time constant selected based on first and higher order derivatives of a$_x^s$. In one embodiment, the vehicle system compares a longitudinal jerk (à$_x^s$), or a first order derivative of the longitudinal acceleration, to a threshold jerk. If the jerk (à$_x^s$), is greater than the threshold jerk, then a time constant corresponding to a lower bandwidth is selected for the low pass filter. Conversely, if the jerk is less than the threshold jerk, a time constant corresponding to a higher bandwidth is selected for the low pass filter. For example, the threshold jerk may be either the converging threshold 820 or the stabilizing threshold 828 described above with reference to FIG. 8. In the illustrated embodiment, the flt waveform corresponds to the bandwidth, where flt equals 1 when a low bandwidth is applied and flt equals 0 when a high bandwidth is selected.

In another embodiment, a bandwidth is selected from predetermined data (e.g., a lookup table) based on a second order derivative of the longitudinal acceleration ä$_x^s$. By filtering a$_x^s$, the road gradient estimation (RGE$_{st}$) converges relatively quickly. For example, RGE$_{st}$ converges at time t$_3$, as referenced by numeral 1014, and the time delay between t$_2$ and t$_3$ is approximately 1 s.

Referring back to FIG. 7, existing systems for evaluating road gradient may wait for the longitudinal acceleration signal to converge before making a road gradient estimate. Thus such a system would wait approximately 3 seconds before estimating road gradient for the vehicle conditions illustrated in FIG. 7. However, as shown in FIG. 10A-10C, the vehicle system reduces this time delay by using an initial value for RGEst that is based on other estimations, and by dynamically filtering the longitudinal acceleration.

As such the vehicle system provides advantages over existing systems by estimating static road gradient using kinematic equations and dynamic filtering of the longitudinal acceleration. The vehicle system also sets an initial value of the static road gradient estimation equal to a road gradient provided by a kinematic or dynamic road gradient estimation. By dynamically filtering the longitudinal acceleration, and by using another estimation for the initial value, the vehicle system reduces the time delay before a quality static road gradient estimated value may be provided, which in turn allows for the engine to be shutdown earlier in a start/stop application which results in improved fuel economy.

Figure 11:
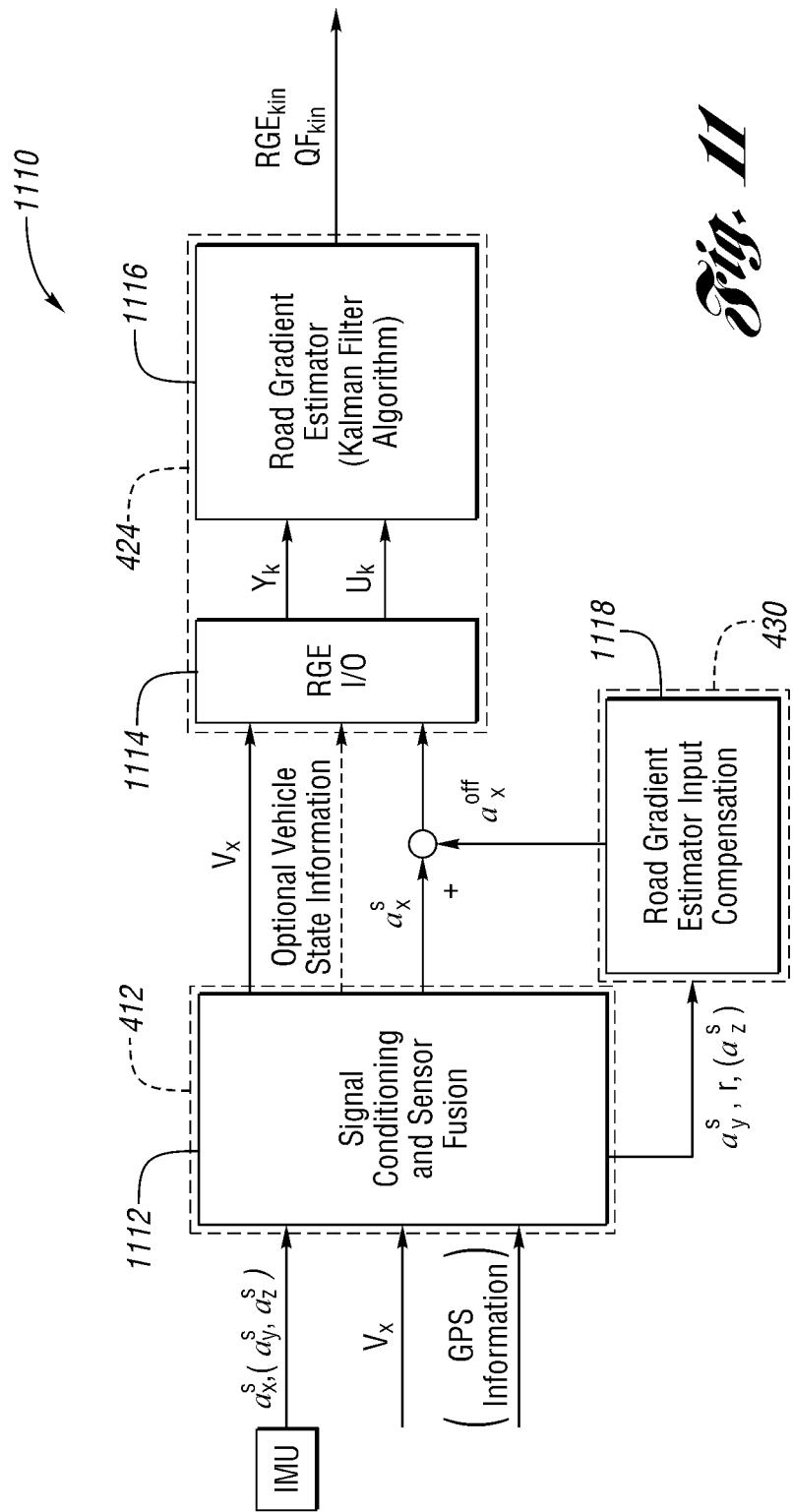
FIG. 11 a schematic block diagram illustrating a method for kinematic road gradient estimation according to one or more embodiments.

With reference to FIG. 11, a schematic block diagram illustrating a method for kinematic road gradient estimation is illustrated in accordance with one or more embodiments and is generally referenced by numeral 1110. The method 1110 corresponds to the kinematic road gradient estimation portion of the overall RGE arbitration method 410 illustrated in FIG. 4. Block 1112 corresponds to block 412 of FIG. 4. At block 1112 the vehicle system receives inputs including acceleration ($a_x^s$, $a_y^s$, $a_z^s$), yaw rate (r), and vehicle speed (Vx). In one embodiment, the vehicle system only receives the longitudinal acceleration ($a_x^s$) and vehicle speed. In other embodiments, the vehicle system also receives GPS information (e.g., vehicle speed, acceleration, and elevation). The input may be received directly from sensors described with respect to FIG. 1, or indirectly over the CAN bus.

Blocks 1114 and 1116 correspond to the $RGE_{kin}$ block 424 of FIG. 4. At block 1114, the vehicle system determines extended Kalman Filter (EKF) parameters $Y_k$ and $u_k$, which represent a system output and input respectively. The input parameters are based on vehicle speed ($V_x$), longitudinal acceleration ($a_x^s$), and an acceleration offset $a_x^{off}$. The parameters may also be based on optional state information for embodiments using GPS information. At block 1116, the vehicle system estimates $RGE_{kin}$ using the EKF and determines the kinematic quality factor ($QF_{kin}$).

The ($a_x^s$, $a_z^s$ and r) inputs are provided to an $RGE_{kin}$ input compensation block 1118, which corresponds to block 430 of FIG. 4. At block 1118, the vehicle system determines the acceleration offset $a_x^{off}$. The acceleration offset is provided as a feed-forward input compensation value for the kinetic road gradient estimation of blocks 114 and 116. The determination of the acceleration offset is described in detail with respect to FIGS. 14-17.

The vehicle system estimates a kinematic road gradient based on the kinematic vehicle frame equations 1-4 and uses an integral type filtering strategy. By ignoring high order angular terms, the vehicle frame kinematic equations may be simplified as shown in equations 7-9 below:

$$a_x^s + l_c \dot{r} - (\dot{V}_x - r*V_y) = -(\dot{V}_x - r*V_y)\frac{\theta^2}{2} + g(\alpha_r + \theta) \quad (7)$$

$$a_y^s + l_d \dot{r} - (\dot{V}_y + r*V_x) = -(\dot{V}_y + r*V_x)\frac{\phi^2}{2} - g(\phi_v + \phi_r) \quad (8)$$

$$a_z^s - g = \dot{V}_x \theta - \frac{g}{2}(\alpha_r + \theta)^2 \quad (9)$$

An equation for longitudinal acceleration ($\dot{V}_x$) may be obtained by applying small angle approximation to equation 8, and is shown below:

$$\dot{V}_x = a_x \quad (10)$$
$$= a_x^s + l_c \dot{r} + r*V_y - g\theta - g\alpha_r$$
$$\approx a_x^s + l_c \dot{r} + r*V_y - g\sin\theta - g\sin\alpha_r$$
$$= a_x^s + a_x^{off} - g\sin\alpha_r$$

where $a_x^{off}$ represents an acceleration offset.

The vehicle system estimates kinematic road gradient using a Kalman filter, according to one or more embodiments. The Kalman filter operates recursively on streams of noisy input data to provide a statistically optimal estimate of the underlying system state. Basically, the Kalman filter is an algorithm which uses a series of measurements that are observed over time and contain random variations (noise), and provides estimates of unknown variables that are more accurate than the measurements alone. A Kalman filter may be thought of as an approach to estimate the state of a "black box", based on measurable inputs and outputs.

The Kalman filter algorithm estimates a state using a two-step process including a time update prediction step, and a measurement update step. In the prediction step, the Kalman filter provides estimates of the current state variables, along with their uncertainties. The measurement update step is a form of feedback control. Once the Kalman filter observes the next measurement, the estimates are updated using a weighted average, where more weight is given to estimates with higher certainty.

The weights are calculated from the covariance, which is a measure of the estimated uncertainty of the prediction of the system's state. The Kalman filter process is repeated every time step, where the new estimate and its covariance informs the prediction used in the following iteration. The Kalman filter is a recursive estimator. This means that only the estimated state from the previous time step and the current measurement are used to compute the estimate for the current state.

The Kalman Filter provides estimates for linear system models with additive independent white noise in both the transition and the measurement systems. However, most systems are nonlinear. An extended Kalman filter (EKF) is used to provide estimates of nonlinear systems. The EKF adapts techniques including multivariate Taylor Series expansions, to linearize calculations about a working point.

The vehicle system defines an extended state ($a_x^g$). Since gravity is a constant value (9.8 m/s$^2$), a first order dynamic of the extended state is equal to zero ($\dot{a}_x^g$=0). The extended state models the vehicle acceleration dynamic that is excited by variation in the road gradient, and the road gradient is relatively high at low frequencies.

The overall system model for estimation is shown below, and is referenced as equation 11:

$$X_k = f(X_{k-1}, u_k) + \omega_k \quad (11)$$

$$\begin{bmatrix} V_x(k) \\ a_x^g(k) \end{bmatrix} =$$

$$\begin{bmatrix} V_x(k-1) - a_x^g(k-1)\tau s \\ a_x^g(k-1) \end{bmatrix} + \begin{bmatrix} 1 \\ 0 \end{bmatrix}(a_x^s(k) + a_x^{off}(k))\tau_s + \begin{bmatrix} \omega_v(k) \\ \omega_a(k) \end{bmatrix}$$

$$X_k = [V_x(k) \quad a_x^g(k)]^T$$

$$u_k = (a_x^s(k) + a_x^{off}(k))\tau_s$$

$$Y_k = [1 \quad 0]$$

$$X_k = V_x$$

$$\omega_k = [\omega_v(k) \quad \omega_a(k)]^T$$

where $x_k$ is the state at time step (k), and $X_{k-1}$ is the state at a previous time step. $u_k$ is a system input and $Y_k$ is a system output. $\omega_k$ is the process noise, $\omega_v(k)$ is the process noise associated with the velocity, and $\omega_a(k)$ is the process noise associated with acceleration. $V_x$ is the longitudinal speed. $a_x^g(k)$ is the extended state acceleration due to gravity $a_x^s(k)$ is the measured longitudinal acceleration, and $a_x^{off}(k)$ is the acceleration offset. $\tau_s$ is the sampling time for the above discrete time implementation model, and T indicates a matrix transform.

Based on the system model shown in equations 11, an observer is designed to estimate the extended state ($a_x^g$), and the kinematic road gradient is estimated according to equation 12 as shown below:

$$\hat{\alpha}_r = \arcsin\left(\frac{a_x^g}{g}\right) = RGE_{kin} \quad (12)$$

The observer is designed using a standard Extended Kalman Filter (EKF) system model as represented by the function shown above in equation 11, and equation 13, both of which are shown below:

$$X_k = f(X_{k-1}, u_k) + \omega_k$$

$$Y_k = CX_k + e_k \quad (13)$$

where C is a matrix, which is a relatively simple matrix in equation 11, and $e_k$ is an unknown noise.

An EKF is used for nonlinear systems. The nonlinear system model is linearized around the current state at every time step, and provides a transition matrix $F_k$. The obtained transition matrix $F_k$ is then used to complete the steps of the standard EKF recursions. These recursions are described by two update steps: a prediction step and a measurement update step. In the prediction step, the system input is used to predict the future state of the system ($\hat{X}_{k|k-1}$) as shown in equations 14 and 15 below:

$$\hat{X}_{k|k-1} = f(\hat{X}_{k-1|k-1}, u_k) \quad (14)$$

$$P_{k|k-1} = F_k P_{k-1|k-1} F_k^T + Q_k \quad (15)$$

where $P_{k|k-1}$ is the estimated error covariance and $Q_k$ is the process noise covariance which is equal to $E[\omega_k^2]$. $F_k$ is the Jacobian and is provided by equation 16 as shown below:

$$F_k = \frac{\partial f}{\partial x}\bigg|_{\hat{x}_{k-1|k-1}} \quad (16)$$

A measurement update step is provided by equations 17-19 as shown below:

$$K_k = P_{k|k-1} C^T (C P_{k|k-1} C^T + R_k)^{-1} \quad (17)$$

$$\hat{X}_{k|k} = \hat{X}_{k|k-1} + K_k(Y_k - C\hat{X}_{k|k-1}) \quad (18)$$

$$P_{k|k} = (I - K_k C) P_{k|k-1} \quad (19)$$

where $K_k$ is the EKF gain, and $R_k$ is the measurement noise covariance which is equal to $E[e_k^2]$.

Generally with an EKF system, the process noise covariance (Q) and the measurement noise covariance (R) are not known a priori, or independent of experience. However, well conditioned signals, such as $K_k$ and $P_{k|k}$ will converge to values that are dependent on Q and R. Therefore, the converged value of $K_k$ may be obtained from predetermined data and it will be used directly for real-time estimation.

In one or more embodiments, the vehicle system includes vertical displacement in its estimation of kinematic road grade. Vertical displacement (Z) may be provided by the navigation system of FIG. 1 based on GPS information. The governing vehicle vertical kinetic equation in the global inertia frame is calculated according to equation 20 as shown below:

$$\dot{Z} = V_x \sin \alpha_r \quad (20)$$

The EKF system model of equation (11) is modified to include vertical displacement Z(k), as shown in equation 21 below:

$$\begin{bmatrix} V_x(k) \\ Z(k) \\ a_x^g(k) \\ a_x^\theta(k) \end{bmatrix} = \begin{bmatrix} V_x(k-1) - a_x^g(k-1)T_s - a_x^\theta(k-1)\tau_s \\ Z(k-1) + V_x(K-1)\frac{1}{g}a_x^g(k-1) \\ a_x^g(k-1) \\ a_x^\theta(k-1) \end{bmatrix} + \begin{bmatrix} 1 \\ 0 \\ 0 \\ 0 \end{bmatrix}(a_x^s(k) + a_x^{cmp}(k)) \quad (21)$$

$$+ \tau_s \begin{bmatrix} \omega_v(k) \\ \omega_z(k) \\ \omega_\alpha(k) \\ \omega_\theta(k) \end{bmatrix}$$

$$X_k = [V_x(k) \quad Z(k) \quad a_x^g(k) \quad a_x^\theta(k)]^T$$

$$u_k = (a_x^s(k) + a_x^{cmp}(k))T_s$$

$$Y_k = CX_k \begin{bmatrix} 1 & 0 & 0 & 0 \\ 0 & 1 & 0 & 0 \end{bmatrix}$$

$$X_k = [V_k(k) \quad Z(k)]^T$$

where $a_x^{cmp}$ represents an GPS based acceleration offset, and $a_x^{cmp}$ is equal to $(l_a\dot{r} + r^*V_y)$. $a_x^{cmp}$ is provided as feedforward input compensation in embodiments using the GPS information. Equation 21 differs from equation 11, in that equation 21 includes two extended states: $a_x^g(k)$ and $a_x^\theta(k)$, where $a_x^\theta(k)$ is the acceleration due to the vehicle pitch angle.

Figure 12:
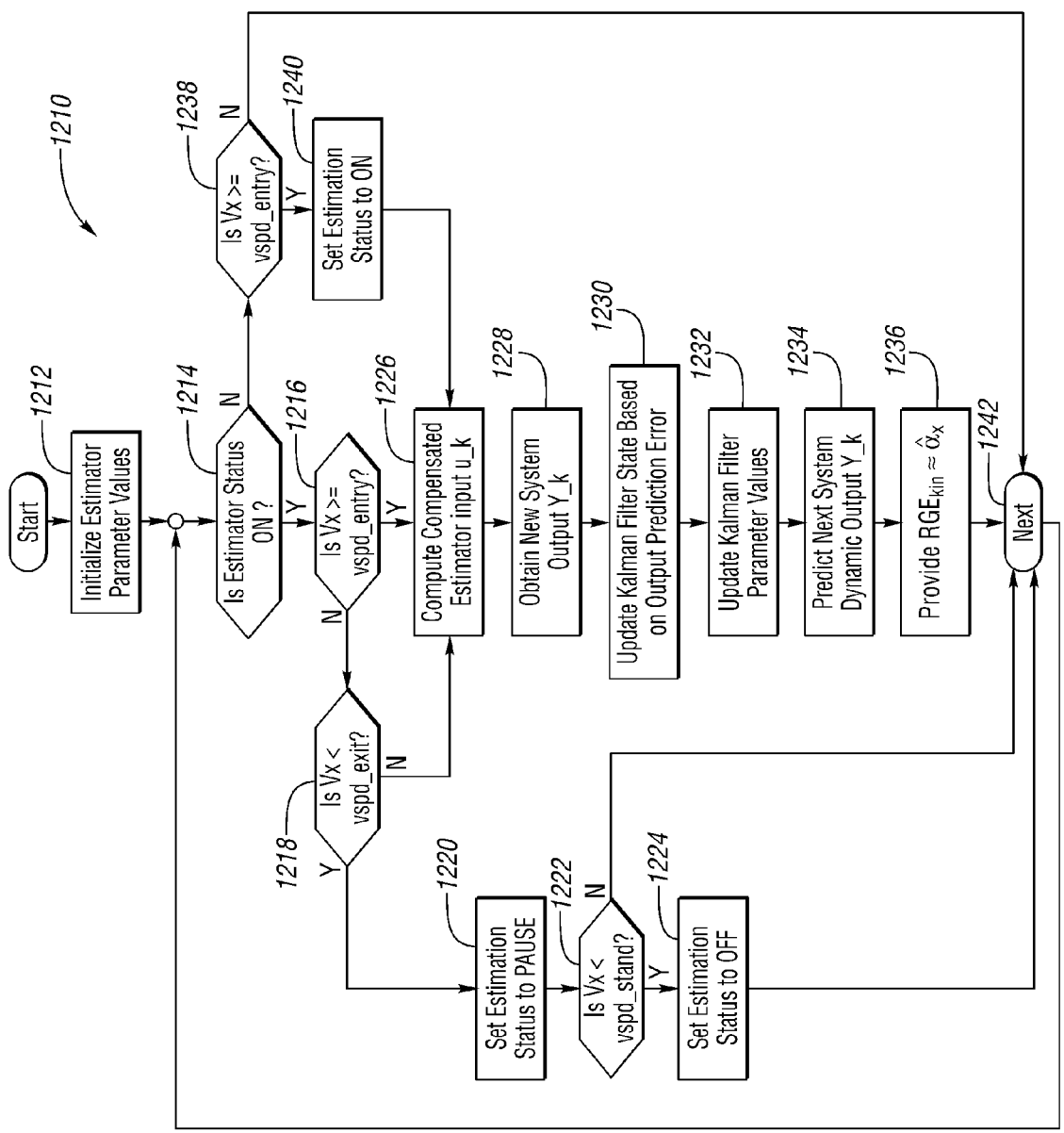
FIG. 12 is a flow chart illustrating a method for estimating kinematic road gradient according to one or more embodiments.

With reference to FIG. 12, a method for estimating kinematic road gradient is illustrated in accordance with one or more embodiments and is generally referenced by numeral 1210. The method is implemented using software code contained within the VSC, according to one or more embodiments. In other embodiments, the method 1210 is implemented in other vehicle controllers, or distributed amongst multiple vehicle controllers.

At operation 1212 the vehicle system initializes estimator parameter values. The estimator parameter values include $X_k$, $u_k$, and $Y_k$. The estimator parameter values are initialized by setting them equal to default values. At operation 1214 the vehicle system determines if the kinematic estimator status ($STATUS_{kin}$) is on. The estimation status factor is defined as a Boolean variable (TRUE/FALSE), where TRUE indicates that the status is on, and FALSE indicates that the status is not on. A status value of TRUE indicates that the estimation method is actively monitoring the vehicle dynamic states (e.g., Vx, $a_x^s$, $a_y^s$, $a_z^s$, and r) and the road gradient information and its estimation channel are updating. If the determination at operation 1214 is positive, the vehicle system proceeds to operation 1216.

At operation 1216 the vehicle system evaluates the present vehicle speed (Vx) to determine if Vx is greater than or equal to a threshold vehicle entry speed ($Vspd_{entry}$). In one embodiment, the threshold vehicle entry speed is approximately 7 kph (4.3 mph). If the determination at operation 1216 is negative, the vehicle system proceeds to operation 1218. At operation 1218 the vehicle system evaluates Vx to determine if it is less than a threshold vehicle exit speed (Vspd$_{exit}$). In one embodiment, the threshold vehicle exit speed is approximately 3 kph (1.9 mph). If the determination at operation 1218 is positive, then the vehicle system proceeds to operation 1220.

At operation 1220, the vehicle system sets the kinematic estimation status (STATUS$_{kin}$) to pause. By setting STATUS$_{kin}$ to pause, the vehicle system stops the estimation and retains the current RGEkin value, rather than resetting the value to a default value. At operation 1222 the vehicle system evaluates the present speed (Vx) to determine if Vx is less than a threshold vehicle standstill speed (Vspd$_{stand}$). The vehicle standstill speed corresponds to the very low vehicle speed referenced in column 6 of Table A. In one embodiment, the threshold vehicle standstill speed is approximately 1 kph (0.6 mph). If the determination at operation 1222 is positive, the vehicle system proceeds to operation 1224 and sets the kinematic estimation status (STATUS$_{kin}$) to off (FALSE). If the determination at operation 1216 is positive, or the determination at operation 1218 is negative, then the vehicle system proceeds to operation 1226.

Operations 1226-1236 relate to the extended Kalman filter operations, which are described above with reference to equations 11-21. First, at operation 1226 the vehicle system computes a compensated estimator input (u$_k$). At operation 1228 the vehicle system obtains a new system output (Y$_k$). At operation 1230 the vehicle system updates the EKF state (X$_k$) based on output prediction error, as described above with reference to equations 14-16. At operation 1232 the vehicle system updates the EKF parameter values (X$_k$, u$_k$, and Y$_k$). At operation 1234, the vehicle system predicts the next system dynamic output Y$_k$. Then at operation 1236 the vehicle system provides the kinematic road gradient estimation.

If the determination at operation 1214 is negative, the vehicle system proceeds to operation 1238. At operation 1238 the vehicle system evaluates the present vehicle speed (Vx) to determine if Vx is greater than or equal to the threshold vehicle entry speed (Vspd$_{entry}$), which is similar to the determination at operation 1216. In one embodiment, the threshold vehicle entry speed is approximately 7 kph (4.3 mph). If the determination at operation 1238 is positive, the vehicle system proceeds to operation 1240 and sets the kinematic estimation status (STATUS$_{kin}$) to on (TRUE). After operation 1240 the vehicle system proceeds to operation 1226 to begin the EKF operations.

After operations 1224 and 1244, and after negative determinations at operations 1222 and 1238, the vehicle system proceeds to operation 1242. After operation 1242 the vehicle system returns to operation 1214 for another iteration.

Figures 13A, 13B, 13C, 13D:
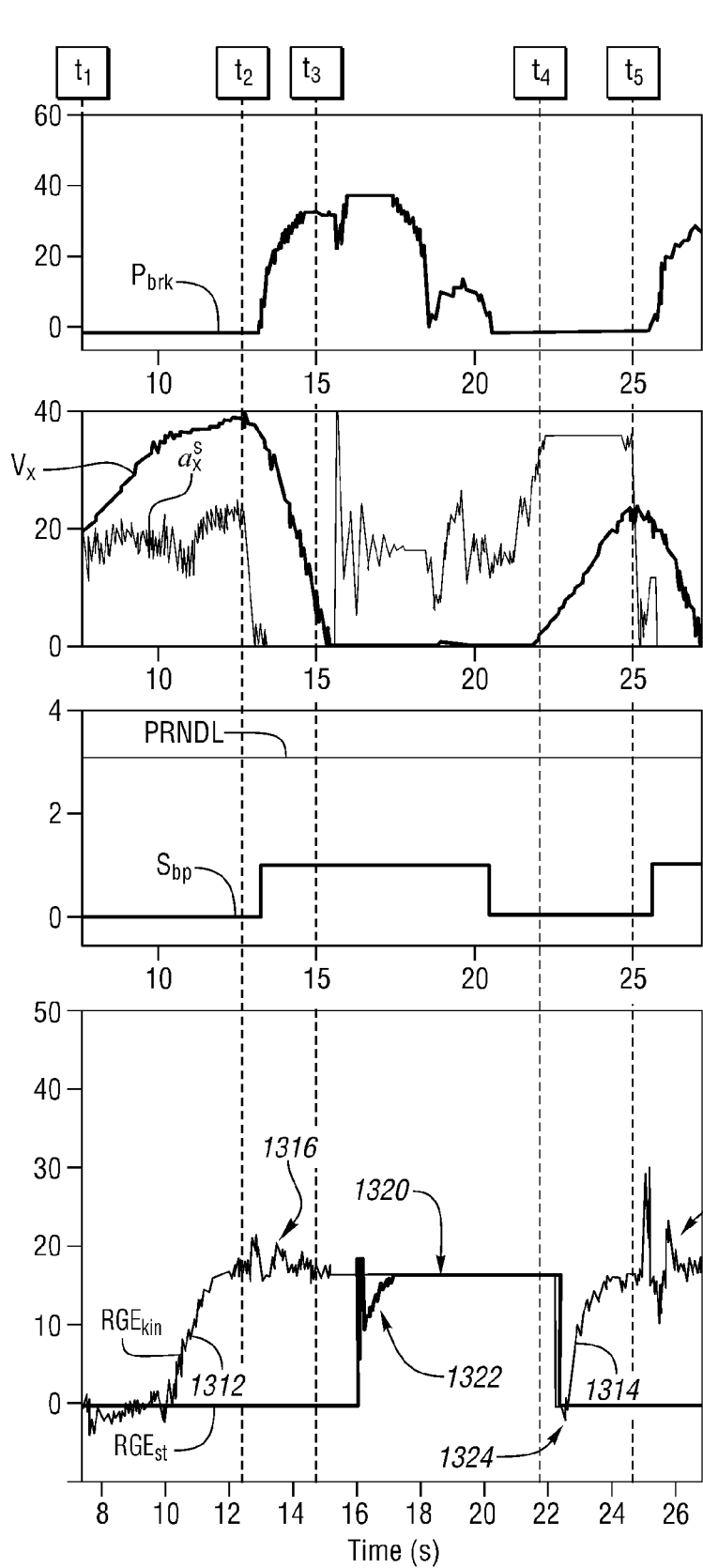
FIG. 13A-13D are time plots illustrating vehicle speed, acceleration and road gradient estimations as controlled by the method of FIG. 12.

FIGS. 13A-13D are graphs illustrating the impact of the method 1210 for estimating kinematic road gradient when a vehicle stops on an incline. FIGS. 13A-13D include 4 graphs of measurement data taken over a common period of time and are generally referenced by numeral 1310. FIG. 13A illustrates brake pressure (P$_{brk}$) which is measured within the master cylinder according to one embodiment. In other embodiments, P$_{brk}$ is measured within the brake lines or at the wheel assemblies. FIG. 13B illustrates vehicle speed (Vx). FIG. 13C illustrates the gear selection (PRNDL), where a value of 3 corresponds to the drive (D) gear selection. FIG. 13C also illustrates the state of the brake pedal (S$_{bp}$), where a positive value indicates that the brake is applied, and a value of zero indicates that the brake is released. FIG. 13D illustrates the measured longitudinal acceleration value (a$_x^s$), along with the static road grade estimation (RGE$_{st}$) and the kinematic road grade estimation (RGE$_{kin}$).

At time t$_1$, the vehicle is accelerating, as indicated by the increasing slope of Vx. At time t$_2$ the vehicle starts decelerating as indicated by the decreasing slope of Vx. At time t$_3$, the vehicle stops. At time t$_4$ the vehicle begins accelerating again, and at time t$_5$ the vehicle begins decelerating again. The kinematic road grade estimation (RGEkin) converges relatively quickly, as referenced by numerals 1312 and 1314.

As described with respect to operations 1222 and 1224, the kinematic estimation status (STATUS$_{kin}$) is set to off, if the vehicle speed decreases below a vehicle standstill threshold speed (e.g., 1 kph). Such conditions are illustrated by RGE$_{kin}$ and referenced by numeral 1320. After t$_3$, the estimation status is set to off as depicted by the lack of any perceptible noise on RGE$_{kin}$ at 1320. Additionally once the vehicle stops, the status of the static road gradient estimation (STATUS$_{st}$) and the RGE$_{st}$ converges as referenced by numeral 1322. As shown at 1320, even though the kinematic status is off, RGE$_{kin}$ is still locked at an accurate road grade estimate and both RGE$_{st}$ and RGE$_{kin}$ are providing generally equal estimates of 17.56% grade.

Existing methods for estimating road gradient using a kinematic approach use a derivative filtering strategy. For example, some existing methods estimate road gradient based on the following vehicle longitudinal kinematic equation:

$$\dot{u} = a_x + rv - g \sin \theta \quad (22)$$

where $\dot{u}$ is the derivative of vehicle longitudinal speed, a$_x$ is the vehicle longitudinal acceleration, r is the yaw rate, v is the vehicle lateral speed. However, such an approach amplifies any noise on the signal due to the derivative calculation of $\dot{u}$.

As such the vehicle system provides advantages over the existing methods by estimating kinematic road gradient using an EKF, which provides an integral type filtering strategy. Such an integrating strategy does not amplify noise on the signals, and therefore provides improved estimation accuracy with relatively fast convergence.

The vehicle system estimates kinematic road gradient using a feedforward input compensation corresponding to an acceleration offset (a$_x^{off}$). The acceleration offset is calculated according to equation 23, as shown below:

$$a_x^{off} = l_c \dot{r} + rV_y g \sin \theta \quad (23)$$

where l$_c$ is the lateral offset, r is the yaw rate, V$_y$ is the lateral velocity and θ is the vehicle pitch angle. In one or more embodiments, the vehicle system does not receive these values (l$_c$, V$_y$, and θ) as inputs. Rather the vehicle system estimates these values from other inputs using a number of compensation strategies. In one or more embodiments, the vehicle system estimates the lateral velocity (V$_y$) term of equation 23 using a Coriolis Effect compensation strategy, the lateral offset (l$_c$) term using a sensor lateral position offset effect compensation strategy, and the vehicle pitch angle (θ) using a vehicle body relative pitch effect compensation strategy.

The vehicle system estimates the rV$_y$ term of equation 23 using a Coriolis Effect compensation strategy which relates to vehicle turning maneuvers. The inertial sensors 52 of FIG. 1, provide the yaw rate, however the lateral velocity (V$_y$) is estimated by the vehicle system. Two computation methods are provided for estimating the lateral velocity (V$_y$): a first method, which is an estimation based method, and a second method, which is a derivation based method. The two methods are provided based on the lateral dynamic equation 8 and a vehicle cornering stiffness parameter, respectively. Furthermore, the two methods are integrated to provide the estimated lateral velocity ($V_y$) under continuous varying vehicle driving conditions.

The first method (the estimation based method) for estimating lateral velocity ($V_y$) is obtained by applying small angle approximation to Equation 8, and is based on the measured lateral acceleration ($a_y^s$). Lateral velocity ($V_y$) is calculated according to equation 24 as shown below:

$$\dot{V}_y = a_y^s - l_d \dot{r} - r^* V_x + g\phi_v + g\phi_r \tag{24}$$

The road bank angle ($\phi_r$) is unknown. Therefore it is treated as a disturbance and removed from the calculation. The vehicle body roll angle $\phi_v$ may be approximated by the measured lateral acceleration as shown in equation 25:

$$\phi_v \approx K_\phi (a_y^s - l_d \dot{r}) \tag{25}$$

where $K_\phi$ represents the vehicle body roll stiffness.

Equation 24 may be simplified as shown in equation 26 below:

$$\dot{V}_y = (1+K_\phi g)(a_y^s - l_d \dot{r}) - r^* V_x = K_{ay}(a_y^s - l_d \dot{r}) - r^* V_x \tag{26}$$

By integrating both sides of equation 26, an equation is obtained for calculating the estimated lateral velocity ($\hat{V}_y(k)$), as shown by equation 27:

$$\hat{V}_y(k) = \hat{V}_y(k-1) + [K_{ay}(a_y^s - l_d \dot{r}) - r^* V_x]^* \tau_s \tag{27}$$

The measured lateral acceleration ($a_y^s$) is generally subjected to acceleration disturbances and bank angle impact. Therefore the $V_y$ estimation method described in equations 24-27 is suited for short time intervals of vehicle dynamic maneuvers in which large magnitudes of lateral acceleration ($a_y^s$) and yaw rate (r) are present, due to the low frequency biased acceleration components.

Unlike the first method, the second method (the derivation based method) for estimating the lateral velocity ($V_y$) does not depend on integration. A steady state gain ($G_{r2\beta}$) from the vehicle yaw rate (r) to a vehicle side slip angle ($\beta$) may be obtained from a linear vehicle model as shown in equation 28:

$$G_{r2\beta} = \frac{l_r}{V_x} - \frac{M_r}{C_{ar}} V_x \tag{28}$$

where $M_r$ is the vehicle mass distributed to the rear axle and $C_{ar}$ is a lumped rear axle cornering stiffness.

As the lateral velocity ($V_y$) becomes approximately equal to the product of the longitudinal velocity ($V_x$) and the vehicle side slip angle ($\beta$), an equation for calculating the lateral velocity may be obtained as shown below:

$$V_y = V_x G_{r2\beta} r = (l_r - k_U V_x^2)^* r = K_r(V_x)^* r \tag{29}$$

where $k_U$ is the cornering stiffness and is equal to $M_r$ divided by $C_{ar}$.

Therefore the lateral velocity may be estimated by equation 30 as shown below:

$$\hat{V}_y = r^*(l_r - k_U V_x^2) = K_r(V_x)^* r \tag{30}$$

A Coriolis effect compensation equation is provided below:

$$r * \hat{V}_y = r^2 * \left(l_r - \frac{M_r}{C_{ar}} V_x^2\right) = r^2 * (l_r - k_U V_x^2) \tag{31}$$

The second method as described with reference to equations 28-31 is suited for steady state vehicle turning maneuvers where the side slip angle ($\beta$) is small.

The vehicle system implements a comprehensive $RGE_{kin}$ structure that incorporates both the first method (estimation based) and the second method (derivation based). Then, the vehicle system selects which of the two methods to apply, based on vehicle dynamic conditions reflected by the yaw rate (r). The general design concept is to use the derivation based $V_y$ from equation 30, in primarily forward driving and steady state turning situations but to switch to the estimation based $V_y$ from equation 27, in the presence of large vehicle lateral dynamics (speed and acceleration). Since the estimation method is not expected to be carried out for a long period of time, the estimated $V_y$ must be reset to the derived state whenever a steady state condition may be observed during a continuous vehicle handling maneuver. The estimated $V_y$ may be further bounded by predetermined upper and lower limits. The output $V_y$ is provided by a low pass filter.

Figure 14:
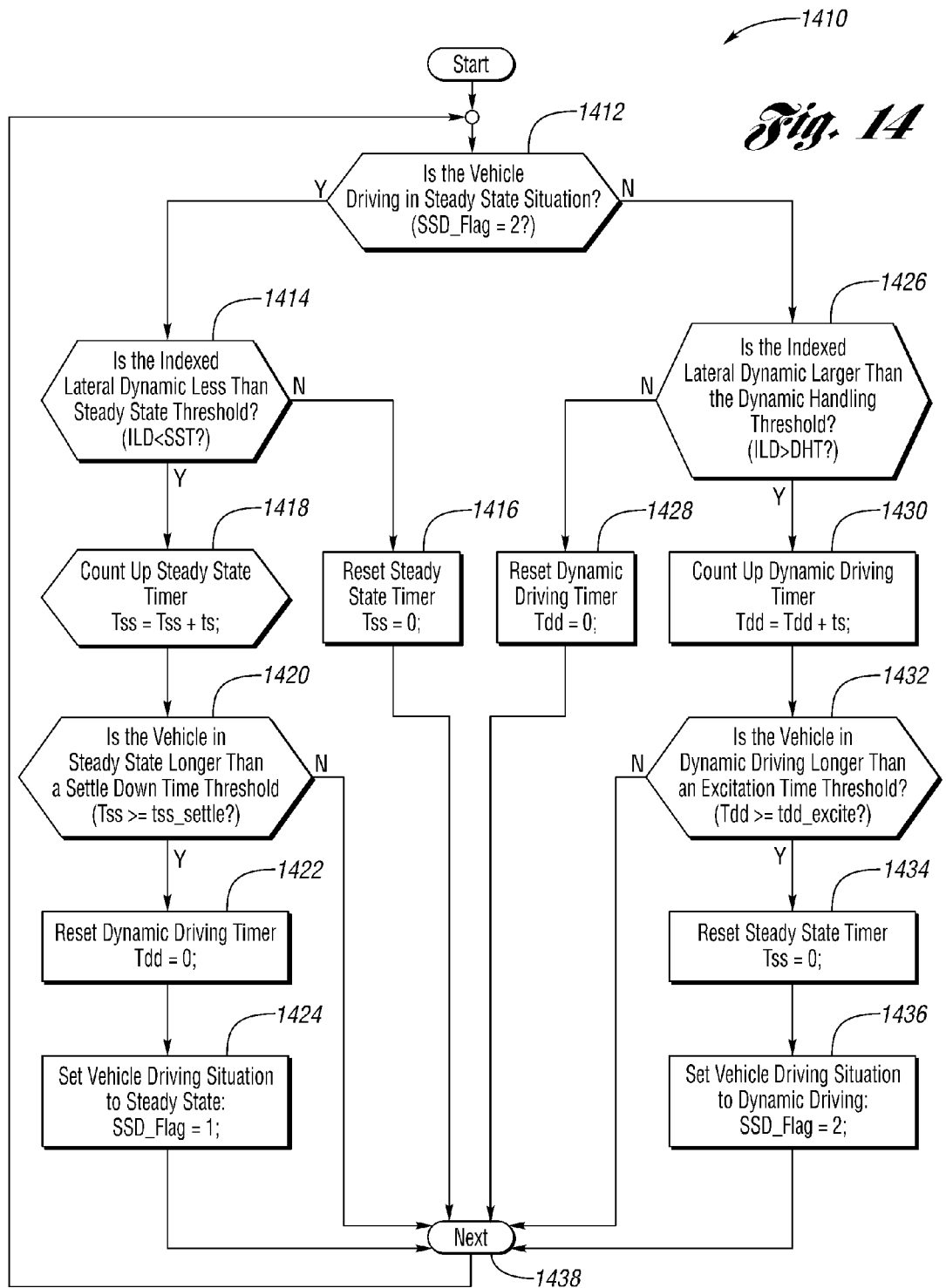
FIG. 14 is a flow chart illustrating a method for determining a vehicle driving situation according to one or more embodiments.

With reference to FIG. 14, a method for determining a vehicle driving situation is illustrated in accordance with one or more embodiments and is generally referenced by numeral 1410. The method is implemented using software code contained within the VSC, according to one or more embodiments. In other embodiments, the method 1410 is implemented in other vehicle controllers, or distributed amongst multiple vehicle controllers.

The method 1410 includes evaluating an indexed lateral dynamic (ILD), which correspond to a present vehicle driving situation. The ILD is defined as:

$$ILD = |r| + a^* |\dot{r}| \tag{32}$$

where the variable ($\alpha$) is a scaling parameter. The vehicle system compares the ILD to two thresholds values: a steady state threshold (SST) corresponding to the derivation method, and a dynamic handling threshold (DHT) corresponding to the estimation method, where (SST<DHT). The determination is further made together with two timers, a steady state timer ($T_{ss}$) and a dynamic driving timer ($T_{dd}$) that count the duration a vehicle has stayed in each situation. Function LPF(x) indicates a general low pass filter function. A moving average filter is an example of a low pass filter that may be used to smooth out discontinuous output transition effects.

In operation 1412 the vehicle system determines if the vehicle is in the steady state driving situation. The vehicle system receives a flag ($SSD_{flag}$) that is associated with the driving situation. A $SSD_{flag}$ that is equal to one (1) indicates a present steady state driving situation, and $SSD_{flag}$ that is equal to two (2) indicates a present dynamic handling situation. Thus, at operation 1412, the system evaluates the $SSD_{flag}$ to determine if $SSD_{flag}$=2. If the determination at operation 1412 is positive, the vehicle system proceeds to operation 1414.

At operation 1414, the vehicle system evaluates the indexed lateral dynamic (ILD) to determine if the ILD is less than a steady state threshold (SST). The SST corresponds to the derivation method for determining the lateral velocity ($V_y$) as described above with reference to equations 28-31.

If the determination at operation 1414 is negative, the vehicle system proceeds to operation 1416 and resets a steady state timer ($T_{ss}$) by setting T equal to zero (0). If the determination at operation 1414 is positive, the vehicle system proceeds to operation 1418.

At operation 1418 the vehicle system increments the steady state timer ($T_{ss}$) by counting up by one execution cycle time ($t_s$). At operation 1420 the vehicle system evaluates the steady state timer ($T_{ss}$) to determine if $T_{ss}$ is greater than or equal to a settling time threshold ($tss_{settle}$). If the determination at operation 1420 is positive, the vehicle system proceeds to operation 1422 and resets the dynamic driving timer ($T_{dd}$). Then, at operation 1424 the vehicle system sets the vehicle driving situation to steady state by setting the $SSD_{flag}$ equal to one (1).

If the determination at operation 1412 is negative (the vehicle is not driving in steady state conditions), the vehicle system proceeds to operation 1426. At operation 1426 the vehicle system evaluates the indexed lateral dynamic (ILD) to determine if the ILD is greater than the dynamic handling threshold (DHT). The DHT corresponds to the estimation method for determining the lateral velocity ($V_y$) as described above with reference to equations 24-27. If the determination at operation 1426 is negative, the vehicle system proceeds to operation 1428 and resets a dynamic driving timer ($T_{dd}$) by setting $T_{dd}$ equal to zero (0). If the determination at operation 1426 is positive, the vehicle system proceeds to operation 1430.

At operation 1430 the vehicle system increments the dynamic driving timer ($T_{dd}$) by counting up by one execution cycle time ($t_s$). At operation 1432 the vehicle system evaluates the dynamic driving timer ($T_{dd}$) to determine if $T_{dd}$ is greater than or equal to an excitation time threshold ($tdd_{excite}$). If the determination at operation 1432 is positive, the vehicle system proceeds to operation 1434 and resets the steady state timer ($T_{ss}$). Then, at operation 1436 the vehicle system sets the vehicle driving situation to dynamic driving by setting the $SSD_{flag}$ equal to two (2). After operations 1416, 1424, 1428 and 1436, and after a negative determination at operations 1420 or 1432, the vehicle system proceeds to operation 1438 and then returns to operation 1412 for another iteration.

Figure 15:
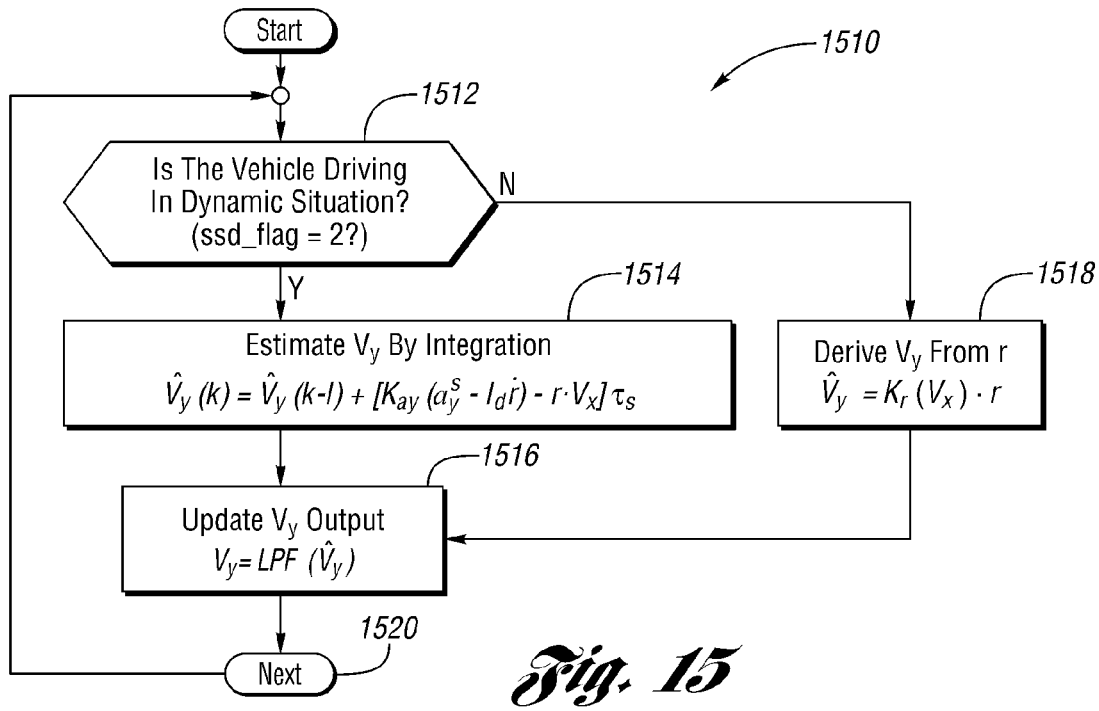
FIG. 15 is a flow chart illustrating a method for estimating a vehicle lateral velocity according to one or more embodiments.

With reference to FIG. 15, a method for estimating a vehicle lateral velocity ($V_y$) based on a present vehicle driving situation is illustrated in accordance with one or more embodiments and is generally referenced by numeral 1510. The method is implemented using software code contained within the VSC, according to one or more embodiments. In other embodiments, the method 1510 is implemented in other vehicle controllers, or distributed amongst multiple vehicle controllers. The method 1510 arbitrates, by selecting a method for estimating lateral velocity ($V_y$), from one of the two methods described above with reference to equations 24-31; either the integration estimation based method or the derivation estimation based method.

In operation 1512 the vehicle system determines if the vehicle is in the dynamic driving situation. The vehicle system evaluates the $SSD_{flag}$ to determine if $SSD_{flag}=2$. If the determination at operation 1512 is positive, the vehicle system proceeds to operation 1514, and estimates the lateral velocity ($\hat{V}_y$) using the integration estimation provided in equation 27. After operation 1514 the vehicle system proceeds to operation 1516. At operation 1516 the vehicle system filters the estimated lateral velocity ($\hat{V}_y$) using a low pass filter (LPF), and updates a lateral velocity output ($V_y$).

If the determination at operation 1512 is negative, the vehicle system proceeds to operation 1518. At operation 1518 the vehicle system estimates the lateral velocity ($\hat{V}_y$) using the derivation estimation provided in equation 30. After operation 1518, the vehicle system proceeds to operation 1516, filters the estimated lateral velocity ($\hat{V}_y$) using a low pass filter (LPF), and updates the lateral velocity output ($V_y$) based on the derivation estimation. After operation 1516, the vehicle system proceeds to operation 1520 and provides the updated lateral velocity ($V_y$) output, and then returns to operation 1512.

In one or more embodiments, the vehicle system estimates the lateral offset ($l_a$) term using a sensor lateral position offset effect compensation strategy. The lateral offset ($l_c$) is defined by the following equation:

$$l_c = l_c^{st} + h^t \phi_v \quad (33)$$

where $l_c^{st}$ is a static sensor installation offset. The variable $h^t \phi_v$ is a dynamic vehicle body roll component, where $h^t$ is the distance from the sprung mass C.G. to the roll center. The vehicle roll angle $\phi_v$ may be obtained from a roll dynamic model or from suspension deflections (in embodiments having suspension deflection sensors). In one or more embodiments, $\phi_v$ at steady state is derived from the yaw rate (r) at steady state as shown below:

$$\phi_v = G_{r2\phi} r \quad (34)$$

Combining equations 33 and 34 and multiplying each side by the derivative of yaw rate ($\dot{r}$) provides the following equation:

$$l_c \dot{r} = l_c^{st} \dot{r} + h^t G_{r2\phi} * \dot{r} \quad (35)$$

In a dynamic driving situation, the body roll angle ($\phi_v$) is approximated from the lateral acceleration ($a_y^s$) according to equation 36 as shown below:

$$\phi_v = G_{ay2\phi}(a_y^s - l_d \dot{r}) \quad (36)$$

Combining equations 35 and 36 provides the following equation:

$$l_c \dot{r} = (l_c^{st} - h^t G_{ay2\phi} l_d) \dot{r} + h^t G_{ay2\phi} a_y^s \quad (37)$$

where $G_{ay2\phi}$ is equal to $K_{phi}$.

Figure 16:
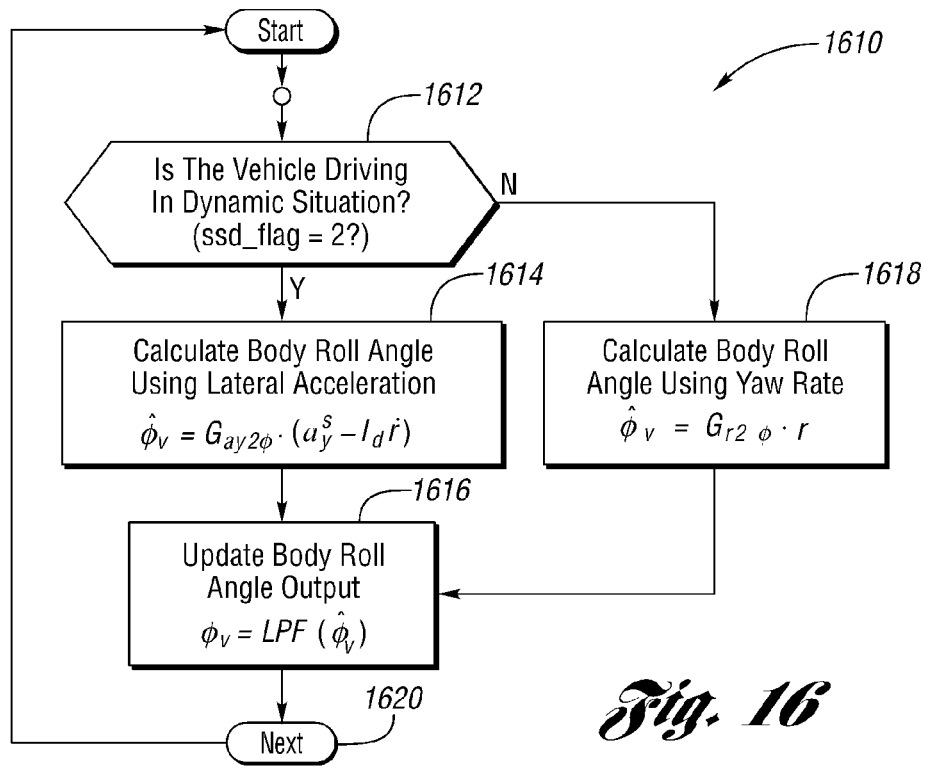
FIG. 16 is a flow chart illustrating a method for estimating a body roll angle according to one or more embodiments.

With reference to FIG. 16, a method for estimating the body roll angle ($\phi_v$) based on a present vehicle driving situation is illustrated in accordance with one or more embodiments and is generally referenced by numeral 1610. The method is implemented using software code contained within the VSC, according to one or more embodiments. In other embodiments, the method 1610 is implemented in other vehicle controllers, or distributed amongst multiple vehicle controllers. The method 1610 arbitrates, by selecting a method for estimating the body roll angle ($\phi_v$), from one of the two methods described above with reference to equations 33-37; either using lateral acceleration or yaw rate.

In operation 1612 the vehicle system determines if the vehicle is in the dynamic driving situation. The vehicle system evaluates the $SSD_{flag}$ to determine if $SSD_{flag}=2$. If the determination at operation 1612 is positive, the vehicle system proceeds to operation 1614, and estimates the body roll angle ($\hat{\phi}_v$) based on lateral acceleration as shown by equation 36. After operation 1614 the vehicle system proceeds to operation 1616. At operation 1616 the vehicle system filters the estimated body roll angle ($\hat{\phi}_v$) using a low pass filter (LPF), and updates a body roll angle output ($\phi_v$). If the determination at operation 1612 is negative, the vehicle system proceeds to operation 1618. At operation 1618 the vehicle system estimates the body roll angle ($\hat{\phi}_v$)

based on the yaw rate as provided in equation 34. After operation 1618, the vehicle system proceeds to operation 1616, filters the estimated body roll angle ($\hat{\phi}_v$) using a low pass filter (LPF), and updates the body roll angle output ($\phi_v$). After operation 1616, the vehicle system proceeds to operation 1620 and provides the updated body roll angle output ($\phi_v$), and then returns to operation 1612.

In one or more embodiments, the vehicle system estimates the vehicle body pitch angle ($\theta$) using one of three compensation strategies. The different strategies correspond to the availability of sensors and accuracy. For example, a first strategy estimates the pitch angle ($\theta$) based on the vehicle longitudinal speed ($V_x$) and the vehicle longitudinal acceleration ($a_x^s$). A second strategy, estimates the pitch angle ($\theta$) based on $V_x$, $a_x^s$, and a vertical acceleration 4. A third strategy estimates the pitch angle ($\theta$) based on $V_x$, $a_x^s$, $a_z^s$ and an estimated acceleration due to gravity component $a_x^g$ provided by the extended Kalman filter. Generally, the more input signals used and the more accurate the source information is, the better the compensation strategy is at cancelling the coupling effect of the $a_x^g$ estimation, and the better the overall road gradient estimation.

The first compensation strategy for estimating the vehicle body pitch angle ($\theta$), is referenced as dynamic pitch compensation. For this strategy, the vehicle system estimates the pitch angle ($\theta$) based on the vehicle longitudinal speed ($V_x$) and the vehicle longitudinal acceleration ($a_x^s$). A low frequency component of $\theta$ may be approximated by a first or second order linear dynamic system. The thrust to pitch vehicle dynamic is generally caused by the longitudinal forces exerted on the vehicle body according to the following equation:

$$\theta \propto K_p a_x^r = \frac{M_s(K_f + K_r)h_{cg}}{K_f K_r L^2} a_x^r \tag{38}$$

where $\theta$ is proportional to $K_p a_x^r$, and $M_s$ is a vehicle sprung mass, which is the vehicle mass and payload above the suspension, and $k_{cg}$ is the height of the vehicle CG above ground in the vertical direction. $K_f$ and $K_r$ are predetermined suspension stiffness at the front axle and the rear axle, respectively. $a_x^r$ is an equivalent reactive acceleration and $a_x^r$ is equal to $a_x + g \sin \alpha_r$. An initial thrust to the pitch dynamic model is based on $a_x^r$ and shown below:

$$\theta_{raw} = K_p(\dot{V}_x + a_x^g) \tag{39}$$

A first order relative pitch dynamic is provided by equation 40 as shown below:

$$\theta + \frac{D_{pitch}}{K_{pitch}} \dot{\theta} = \theta_{raw} \tag{40}$$

which has a transfer function of:

$$T(S) = \frac{K_{pitch}}{K_{pitch} + D_{pitch} S} \tag{41}$$

where $D_{pitch}$ represents the general damping effect of the suspension and $K_{pitch}$ represents the suspension stiffness to the pitch thrust from the longitudinal force.

Figure 17:
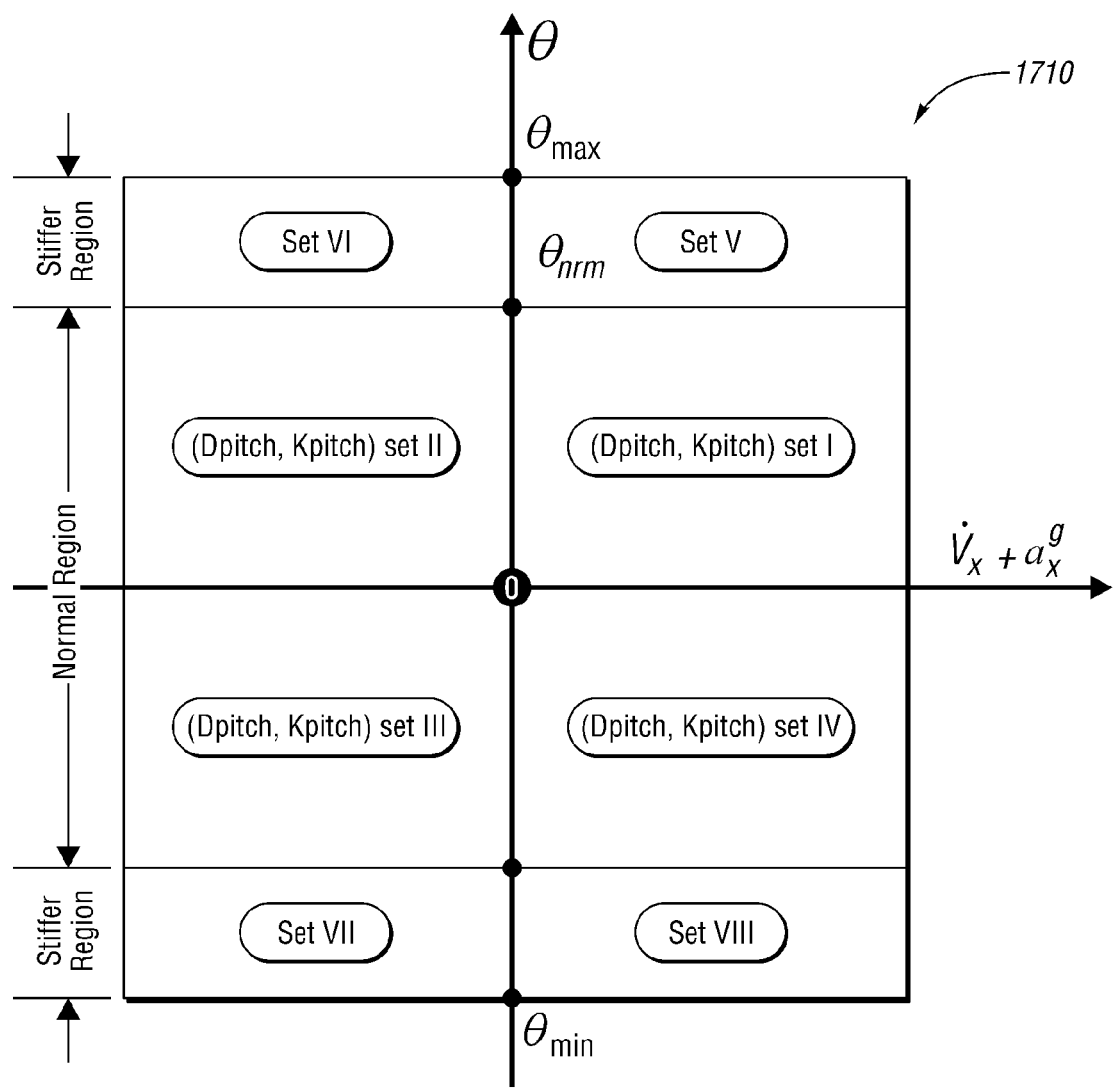
FIG. 17 is a diagram illustrating a method for selecting suspension parameters, according to one or more embodiments.

FIG. 17 depicts a diagram for selecting $D_{pitch}$ and $K_{pitch}$ using a phase plane gain scheduling rule, which is generally represented by numeral 1710. The diagram 1710 illustrates eight regions, which are centered about an origin of a Cartesian coordinate system. The x-axis corresponds to $\dot{V}_x + a_x^g$ and the y-axis corresponds to the pitch angle ($\theta$). The pitch angle $\theta$ is bounded by $\theta_{max}$ and $\theta_{min}$ as shown. Generally, in the normal region, there is a linear relationship, however in stiffer region there is a non linear relationship. The values are slightly different between pitching forward and rearward.

The vehicle system uses the second compensation strategy to estimate the pitch angle ($\theta$) based on $V_x$, $a_x^s$, and a vertical acceleration ($a_z^s$). The inertial sensors 52 of FIG. 1, provide the vertical acceleration ($a_z^s$) according to one or more embodiments.

For convenience variable ($\Psi$) may be defined as shown below:

$$\Psi = a_z^s + lc\dot{r} - (\dot{V}_x - r*V_y) \tag{42}$$

The following equation can be obtained by combining equations 7, 9, and 42 and substituting ($\alpha_r + \theta$):

$$a_z^s - g = \dot{V}_x \theta - \frac{1}{2g}\left[\Psi^2 + 2\Psi(\dot{V}_x - r*V_y)\frac{\theta^2}{2} + (\dot{V}_x - r*V_y)^2 \frac{\theta^4}{4}\right] \tag{43}$$

Equation 43 may be simplified by ignoring the high order term with $\theta^4$, as shown below:

$$\Psi(\dot{V}_x - r*V_y)\theta^2 - 2g\dot{V}_x\theta + \Psi^2 + 2g(a_z^s - g) = 0 \tag{44}$$

An equation for calculating the relative pitch angle ($\theta$) according to the second strategy is obtained by solving for the root of equation 44, as shown in equation 45:

$$\theta = \frac{g\dot{V}_x - \sqrt{g\dot{V}_x^2 - \Psi(\dot{V}_x - r*V_y)[\Psi^2 + 2g(a_z^2 - g)]}}{\Psi(V_x - r*V_y)} \tag{45}$$

The vehicle system uses the third compensation strategy to estimate the pitch angle ($\theta$) based on $V_x$, $a_x^s$, and gravity component $a_x^g$ provided by the extended Kalman filter. An approximation equation is provided below:

$$\sin\theta \approx \frac{a_z^s - g\cos\alpha_r}{a_x^2} = \frac{a_z^s - \sqrt{g^2 - (a_x^g)^2}}{a_x^2} \tag{46}$$

The pitch angle ($\theta$) may be iteratively identified together with an estimated road gradient ($\alpha_r$) through regression based on the following equation:

$$\begin{cases} \bar{a}_x^{off}(k+1) = l_c \dot{r} + r*V_y - g\frac{a_z^s - \sqrt{g^2 - (\hat{a}_x^g(k))^2}}{a_x^2} \\ \hat{a}_x^g(k+1) = \bar{a}_x^{off}(k+1) - \bar{a}_x^{off}(k) + \hat{a}_x^g(k) \end{cases} \tag{47}$$

where $\hat{a}_x^g(k=0) = a_x^g(t)$ from the Kalman filter output based on an initial compensation value of $a_x^{off}(t)$. This value may be zero (0), any other admissible value or the regression result from the previous cycle. $\bar{a}_x^{off}(k+=0) = a_x^{off}(t)$.

Equations for estimating the road gradient ($\alpha_r$) and the relative pitch angle ($\hat{\theta}$) according to the third compensation strategy are provided by equations 48 and 49, as shown below:

$$\hat{a}_r = \arcsin\left(\frac{\hat{a}_x^g(\infty)}{g}\right) \quad (48)$$

$$\hat{\theta} = \arcsin\left(\frac{l_c \dot{r} + r * V_y - \overline{a}_x^{off}(\infty)}{g}\right) \quad (49)$$

where $\hat{a}_x^g(\infty)$ and $\overline{a}_x^{off}(\infty)$ indicate the converged value of $\hat{a}_g(k)$ and $\overline{a}_x^{off}(k)$ through the regression process as $k \to \infty$. The convergence generally occurs within 5-10 iterations.

As such the vehicle system provides advantages over the existing methods by estimating kinematic road gradient using input compensated acceleration offset to improve accuracy to remove uncertainties and offsets caused by lateral vehicle dynamics and their coupling effects.

The vehicle system estimates a dynamic road gradient ($RGE_{dyn}$) based on input corresponding to estimated vehicle mass, vehicle speed, wheel torques (brake torque and powertrain output torque), and other drag forces acting on the vehicle (e.g., aerodynamic drag, rolling resistance and the road gradient load). Generally the dynamic RGE has lower quality conditions as compared to static and kinematic RGE because it involves more signals in its estimation, and the noise and error in each signal will be propagated in the final RGE output. However, the dynamic RGE does not rely on the longitudinal acceleration signal ($a_x^s$), and therefore it has different signal coverage from that of the static and the kinematic estimations. Although dynamic road gradient estimation is secondary, the vehicle mass estimation portion is a useful parameter to many vehicle systems.

The vehicle system estimates vehicle mass independent of the road gradient estimate using a recursive least square (RLS) algorithm under certain vehicle conditions. Generally, the vehicle mass only changes when an object (e.g., a passenger) is added to or removed from the vehicle. Such a change usually only occurs when the vehicle is stopped. The vehicle system estimates vehicle mass while the vehicle is moving using vehicle dynamic equations, and independent of the road gradient estimation. By estimating vehicle mass and road gradient independently, or in parallel, the vehicle system improves the accuracy of each estimate over existing methods. The vehicle system estimates vehicle mass using an event-seeking strategy, whereby the mass is estimated at vehicle conditions where the signal to noise ratio of certain inputs is high. The vehicle system then estimates vehicle mass using a recursive least square (RLS) algorithm when the sought event occurs. The vehicle system re-initializes certain parameters in the mass estimation algorithm at vehicle conditions corresponding to potential mass changes (e.g., when the vehicle stops) in order to increase the sensitivity of the algorithm.

The vehicle system estimates a vehicle mass using dynamic vehicle frame equations that are based on Newton's Second Law ($\Sigma F = ma$) as provided below:

$$M_e \dot{V}_x = F_{pwt} - F_{brk} - F_{drag} - F_g \quad (50)$$

where $M_e$ is the estimated vehicle mass without payload (passengers or cargo), $\dot{V}_x$ is the derivative of vehicle speed, $F_{pwt}$ is the propulsion force at the output of the powertrain, $F_{brk}$ is the brake force, $F_{drag}$ is the drag force and $F_g$ is the force due to gravity.

Equation 50 may be rewritten to solve for $M_e$ and further separated into equations based on whether or not the vehicle is in gear, as shown below:

$$M_e = \begin{cases} M_v + \frac{J_w}{R_w^2} + \frac{r_p^2 \eta_p^2 J_p}{R_w^2} & \text{In gear} \\ M_v + \frac{J_w}{R_w^2} & \text{Not in gear} \end{cases} \quad (51)$$

where $M_v$ is estimated vehicle mass, which includes the vehicle mass without payload ($M_e$) and the vehicle payloads. The term "in gear" generally references whether or not the powertrain is connected to the wheels. $J_w$ and $J_p$ are the moment of inertia at the wheels and the powertrain, respectively. $R_w$ is the wheel radius. $r_p$ is the lumped powertrain torque transfer ratio, and $\eta_p$ is the lumped torque transfer efficiency. $J_p$, $r_p$, and $\eta_p$ vary depending on transmission gear ratio. These values also vary for hybrid electric vehicles having multiple propulsion devices (e.g., a motor and an engine).

An inertia dependent vehicle mass ($M_i$) is calculated according to equation 52, as shown below:

$$M_i = \begin{cases} \frac{J_w + r_p^2 \eta_p^2 J_p}{R_w^2} & \text{In gear} \\ \frac{J_w}{R_w^2} & \text{Not in gear} \end{cases} \quad (52)$$

An equivalent longitudinal tire force ($F_{pwt}$) acting on the wheels may be calculated based on the total powertrain propulsion torque ($T_{pwt\_whl}$) or the total regenerative braking torque ($T_{brk\_whl}$) according to equation 53 as shown below:

$$F_{pwt} = \frac{T_{pwt\_whl}}{R_w} = \frac{1}{R_w}(T_{eng\_whl} + T_{mot\_whl}) = \frac{r_{pe}\eta_{pe}}{R_w}T_{eng} + \frac{r_{pm}\eta_{pm}}{R_w}T_{mot} \quad (53)$$

where $T_{eng}$ and $T_{mot}$ are the engine and electric motor output torque, and $T_{eng\_whl}$ and $T_{mot\_whl}$ are their corresponding torques at the wheels. $r_{pe}$, $r_{pm}$, $\eta_{pe}$, and $\eta_{pm}$ are lumped torque transfer ratio and efficiency parameters of the engine, and the motor respectively.

An equivalent longitudinal brake force ($F_{brk}$) acting on the wheels may be calculated based on the total frictional braking torque according to equation 54 as shown below:

$$F_{brk} = \frac{1}{R_w} K_{brk} P_{brk} \quad (54)$$

where $P_{brk}$ is the effective brake line pressure in the wheel brake chambers at the wheel assemblies. This is an equivalent term evaluated on all wheels, because individual wheel brake chambers may have different applied brake line pressure. $K_{brk}$ is the frictional brake effectiveness factor that determines how much frictional brake torque can be realized over the braking pads given a certain brake pressure. The value of $K_{brk}$ varies with respect to brake system conditions such as temperature, humidity, etc. In one embodiment, $K_{brk}$ corresponds to a predetermined constant.

A drag force ($F_{drag}$) may be calculated according to equation 55 as shown below:

$$F_{drag} = \frac{1}{2} K \rho_a A_d C_d V_x^2 + M_v g f_r \cos \alpha_r \qquad (55)$$

where $\rho_a$ and $C_d$ are constant aerodynamic parameters, $A_d$ is a vehicle cross sectional area, and $f_r$ is the rolling resistance coefficient.

A load on the vehicle due to gravity ($F_g$) may be calculated according to equation 56 as shown below:

$$F_g = M_v g \sin \alpha_r \qquad (56)$$

where $\alpha_r$ is the road gradient.

Equation 56 may be converted to the torque domain as shown in equation 57 below:

$$T_g = M_v g R_w \sin \alpha_r \qquad (57)$$

where $R_w$ is the wheel radius.

A first method is provided for estimating vehicle mass concurrently with road gradient using kinematic equations using a least-square type of estimator based on the following parameterized model:

$$\begin{aligned} y &= \dot{V}_x \\ &= \frac{F_{pwt} - F_{brk} - F_{drag}}{M_e} - \frac{M_v}{M_e} g \sin \alpha_r \\ &= (F_{pwt} - F_{brk} - F_{drag}) \frac{1}{M_v + M_i} - g \frac{M_v \sin \alpha_r}{M_v + M_i} \\ &= \phi^T \gamma \end{aligned} \qquad (58)$$

The estimation results for vehicle mass (Mv) and road gradient ($\alpha_r$) based on the model of equation 58 are obtained as follows:

$$M_v = \frac{1}{\gamma_1} - M_i \qquad (59)$$

$$\alpha_r = \arcsin\left(\frac{\gamma_2}{1 - \gamma_1 M_i}\right) \qquad (60)$$

However solving for two unknowns ($\alpha_r$ and $M_v$) simultaneously adds additional error to the estimates.

A second approach for estimating the vehicle mass using kinematic equations is to separate the vehicle mass estimate from the road gradient estimate based on the following mathematical model:

$$a_x + g \sin \alpha_r = \frac{1}{M_e}(F_{pwt} - F_{brk} - F_{drag}) + \frac{M_e - M_v}{M_e} g \sin \alpha_r \qquad (61)$$

Equation may be simplified as follows, as described above with reference to equation 10, and reproduced below:

$$\dot{V}_x = a_x = a_x^s + a_x^{\mathit{off}} - g \sin \alpha_r \qquad (10)$$

where $a_x^{\mathit{off}}$ represents an acceleration offset and is equal to ($l_c \dot{r} + r^* V_y - g \sin \theta$). $l_c$ is the lateral offset, r is the yaw rate, $V_y$ is the lateral velocity and $\theta$ is the vehicle pitch angle. In one or more embodiments, the vehicle system does not receive these values ($l_c$, $V_y$, and $\theta$) as inputs. Rather the vehicle system estimates these values from other inputs using a number of compensation strategies.

The following equation is obtained by combining equations 61 and 10:

$$a_x^s + a_x^{\mathit{off}} = \frac{1}{M_e}(F_{pwt} - F_{brk} - F_{drag}) + a_{\delta g} \qquad (62)$$

The variable ($a_{\delta g}$) represents the acceleration disturbance excited from road gradient variation, and may be calculated according to equation 63 as shown below:

$$a_{\delta g} = \frac{M_e - M_v}{M_e} g \sin \alpha_r \qquad (63)$$

where $M_v$ is the sum of the vehicle mass $M_e$ and vehicle payloads.

The acceleration disturbance ($a_{\delta g}$) contributes to the estimation error. When the vehicle payload is small, the $a_{\delta g}$ may be ignored. $a_{\delta g}$ may also be regressively compensated after an estimated vehicle mass is in steady state and converged. The acceleration offset ($a_x^{\mathit{off}}$) may be determined and used as feedforward input compensation as described above with reference to FIGS. 14-17.

Equation 62 may be rearranged to solve for $M_e$ and $M_v$ as shown below:

$$M_e = \frac{F_{pwt} - F_{brk} - F_{drag}}{a_x^s + a_x^{\mathit{off}} - a_{\delta g}} = \frac{\frac{T_{pwt\_whl} - K_{brk} P_{brk}}{R_w} - F_{drag}}{a_x^s + a_x^{\mathit{off}} - a_{\delta g}} \qquad (64)$$

$$M_v = \frac{\frac{T_{pwt\_whl} - K_{brk} P_{brk}}{R_w} - F_{drag}}{a_x^s + a_x^{\mathit{off}} - a_{\delta g}} - M_i \qquad (65)$$

The drag force (Fdrag) and the road gradient ($\alpha_r$) are compensated in order to obtain vehicle mass estimates. However, it is difficult to accurately compensate these terms due to signal noise. These terms exhibit slow dynamic variations as compared to the variations exhibited by the vehicle longitudinal dynamic. Therefore these terms may be treated as unknown constants in a short period estimation event. A difference based estimation equation may be derived as follows:

$$a_x^i(t) M_e = F_{whl}(t) - F_{drag}(t) + M_e a_{\delta g}(t) \qquad (66)$$

$$a_x^i(t+\Delta t) M_e = F_{whl}(t+\Delta t) - F_{drag}(t+\Delta t) + M_e a_{\delta g}(t+\Delta t) \qquad (67)$$

where the longitudinal acceleration ($a_x^i$) at time index (i) is equal to ($a_x^s + a_x^{\mathit{off}}$) and the force at the wheels ($F_{whl}$) is equal to ($T_{pwt\_whl} - K_{brk} P_{brk}$)/$R_w$. The variable (t) is a time instance within a qualified estimation event. At is a predefined time interval parameter.

As $F_{drag}(t) \approx F_{drag}(t+\Delta t)$ and $a_{\delta g}(t) \approx a_{\delta g}(t+\Delta t)$, an incremental vehicle longitudinal dynamic model may be obtained by taking the difference between equations 66 and 67 as shown below:

$$M_v = \frac{\Delta F_{whl}}{\Delta a_x^i}\bigg|_{\Delta t} - M_i = \frac{F_{whl}(t+\Delta t) - F_{whl}(t)}{a_x^i(t+\Delta t) - a_x^i(t)} - M_i \qquad (68)$$

where $\Delta F_{whl}$ and $\Delta a_x^i$ are the difference between the values of $F_{whl}$ and $a_x^i$ evaluated in the time interval $\Delta t$ within a qualified estimation event.

Estimating vehicle mass ($M_v$) using such an approach isolates the vehicle mass estimate from noise factors such as: aerodynamic noise, rolling resistance and road gradient. As $\Delta t \to 0$, the equation 68 may be simplified to a derivative format, according to equation 69 as shown below:

$$M_v = \frac{\dot{F}_{whl}}{\dot{a}_x^i} - M_i = \frac{1}{R_w} \frac{(T_{pwt\_whl} - K_{brk}P_{brk})'}{(a_x^s + a_x^{off})'} - M_i \qquad (69)$$

Figure 18:
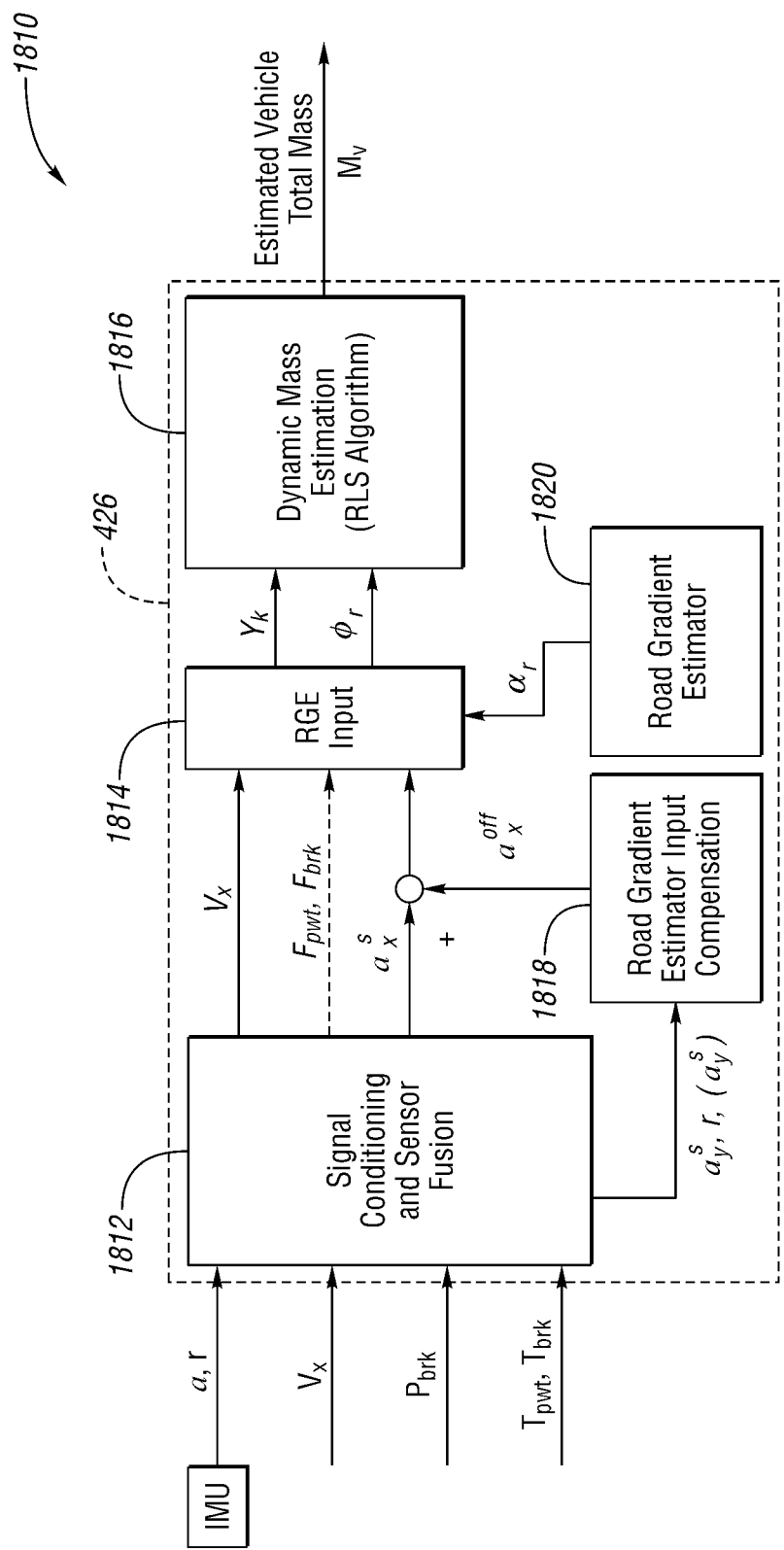
FIG. 18 is a schematic block diagram illustrating a method for vehicle mass estimation according to one or more embodiments.

With reference to FIG. 18, a schematic block diagram illustrating a method for vehicle mass estimation is illustrated in accordance with one or more embodiments and is generally referenced by numeral 1810. The method 1110 is included within the dynamic road gradient estimation ($RGE_{dyn}$) block 426 of FIG. 4, according to one or more embodiments. At block 1812 the vehicle system receives inputs including acceleration ($\alpha$) yaw rate (r), vehicle speed ($V_x$), brake pressure ($P_{brk}$) powertrain torque ($T_{pwt}$) and braking torque ($T_{brk}$). The input may be received directly from sensors described with respect to FIG. 1, or indirectly over the CAN bus.

At block 1814, the vehicle system determines dynamic mass input parameters $Y_k$ and $\phi_k$ which represent a system output, and a system input respectively. The input parameters are based on the calculated vehicle speed ($V_x$) the longitudinal acceleration ($a_x^s$), a powertrain force ($F_{pwt}$), a braking force ($F_{brk}$), and an acceleration offset ($a_x^{off}$). $F_{pwt}$ and $F_{brk}$ are calculated based on $T_{pwt}$ and $T_{brk}$. At block 1816, the vehicle system estimates the dynamic mass ($M_v$). At block 1818, the vehicle system determines the acceleration offset $a_x^{off}$. The acceleration offset is provided as feedforward RGE input compensation. At block 1820 the vehicle system estimates road gradient $\alpha_r$.

The vehicle system estimates the dynamic vehicle mass ($M_v$) at block 1816 using a recursive least square (RLS) estimation according to equation 65, 68 or 69, according to one or more embodiments. The RLS estimation is based on the following parameterized estimation model:

$$y = \phi * \theta \qquad (70)$$

A recursive least square estimation (RLS) estimation algorithm is developed as shown below:

$$L(k) = \frac{P(k-1)\phi(k)}{1 + \phi^2(k)P(k-1)} \qquad (71)$$

$$\hat{\theta}(k) = \hat{\theta}(k-1) + L(k)[y(k) - \phi(k) * \hat{\theta}(k)] \qquad (72)$$

$$P(k) = [1 - L(k)\phi(k)]P(k-1) \qquad (73)$$

where $\hat{\theta}(k)$ is the estimated version of parameter $\theta$ at k-th execution cycle. The RLS estimator is a filtering strategy that averages the estimated data updated based on the error between the measurement and the predicted model output. Such an estimation strategy may be used when the parameter to be estimated is constant in nature. To initiate the estimation, P(0) is set equal to 1.

The parameters of the RLS equations 71-73 vary depending on which vehicle mass estimation equation is used, (e.g., equation 65, 68, or 69).

The following parameters are used when the RLS equations (71-73) are calculated based on the vehicle mass estimation of equation 65:

$$\theta = M_e \qquad (74)$$

$$\phi = a_x^s + a_x^{off}$$

$$y = \frac{T_{pwt\_whl} - K_{brk}P_{brk}}{R_w - F_{drag}}$$

The following parameters are used when the RLS equations (71-73) are calculated based the difference based vehicle mass estimation of equation 68:

$$\theta = M_e$$

$$\phi = \Delta a_x^i|_{\Delta t}$$

$$y = \Delta F_{whl}|_{\Delta t} \qquad (75)$$

Alternatively, the following parameters are used when the RLS equations (71-73) are calculated based the differential based algorithm of equation 69:

$$\phi = \dot{a}_x^i = (a_x^s + a_x^{off})'  \qquad (76)$$

$$y = \dot{F}_{whl} = \frac{(T_{pwt_{whl}} - K_{brk}P_{brk})'}{R_w}$$

The vehicle system uses the RLS to estimate vehicle mass at certain qualified vehicle events. The mass estimator is developed based on the condition when vehicle dynamic is predominantly longitudinal. Thus the vehicle system searches for conditions under which the vehicle longitudinal inertia effect is significantly dominating the related noise factors, or the signal to noise ratio is high. These qualified events generally occur during vehicle braking/deceleration or during vehicle acceleration.

In one or more embodiments, the vehicle system detects a qualified vehicle braking/deceleration event when each of the following conditions are satisfied:
 1. $V_x \geq$ C_DynMassBrkEntry;
 2. $a_x^i \leq$ C_aRGEAxNeg;
 3. |r| ≤ C_small_yaw; and
 4. (Fwhl<C_FBrk and $\dot{F}_{whl}$<C_DFBrk and $\ddot{F}_{whl}$<C_D2FBrk) or (Fwhl<C_FBrk2 and $\dot{F}_{whl}$<C_DFBrk2).

In one or more embodiments, the vehicle system detects a qualified vehicle acceleration event when each of the following conditions are satisfied:
 1. $V_x \geq$ C_DynMassPropEntry;
 2. $a_x^i \geq$ C_aRGEAxPos;
 3. |r| ≤ C_small_yaw; and
 4. (Fwhl>C_FProp and $\dot{F}_{whl}$<C_DFPropUp and $\dot{F}_{whl}$>C_DFPropDn and $\ddot{F}_{whl}$<C_D2FPropUp and $\ddot{F}_{whl}$<C_D2FPropDn) or (Fwhl>C_FProp2 and $\dot{F}_{whl}$>C_DFProp2 and $\ddot{F}_{whl}$>C_D2FProp2)

In the above conditions, a variable that begins with "C" indicates a calibration parameter. The calibration parameters are predetermined values designed to target a specific estimation event. The conditions provide a tunable construction of qualified predominantly longitudinal vehicle motion. The more strict the parameters are tuned towards dynamic significance, the higher the estimation accuracy that may be achieved. However, such strict parameters will reduce the available estimation time interval, since a qualified event will be less frequent. Thus a qualified estimation event depends on a certain level of driving aggressiveness. The more forceful or rapid the vehicle acceleration or braking is, the more dominant the inertia effect will be excited in the vehicle dynamic. The tuning of the qualified estimation parameters is a tradeoff between estimation accuracy and event occurrence, since aggressive driving behavior is less common during a normal driving process.

Figure 19:
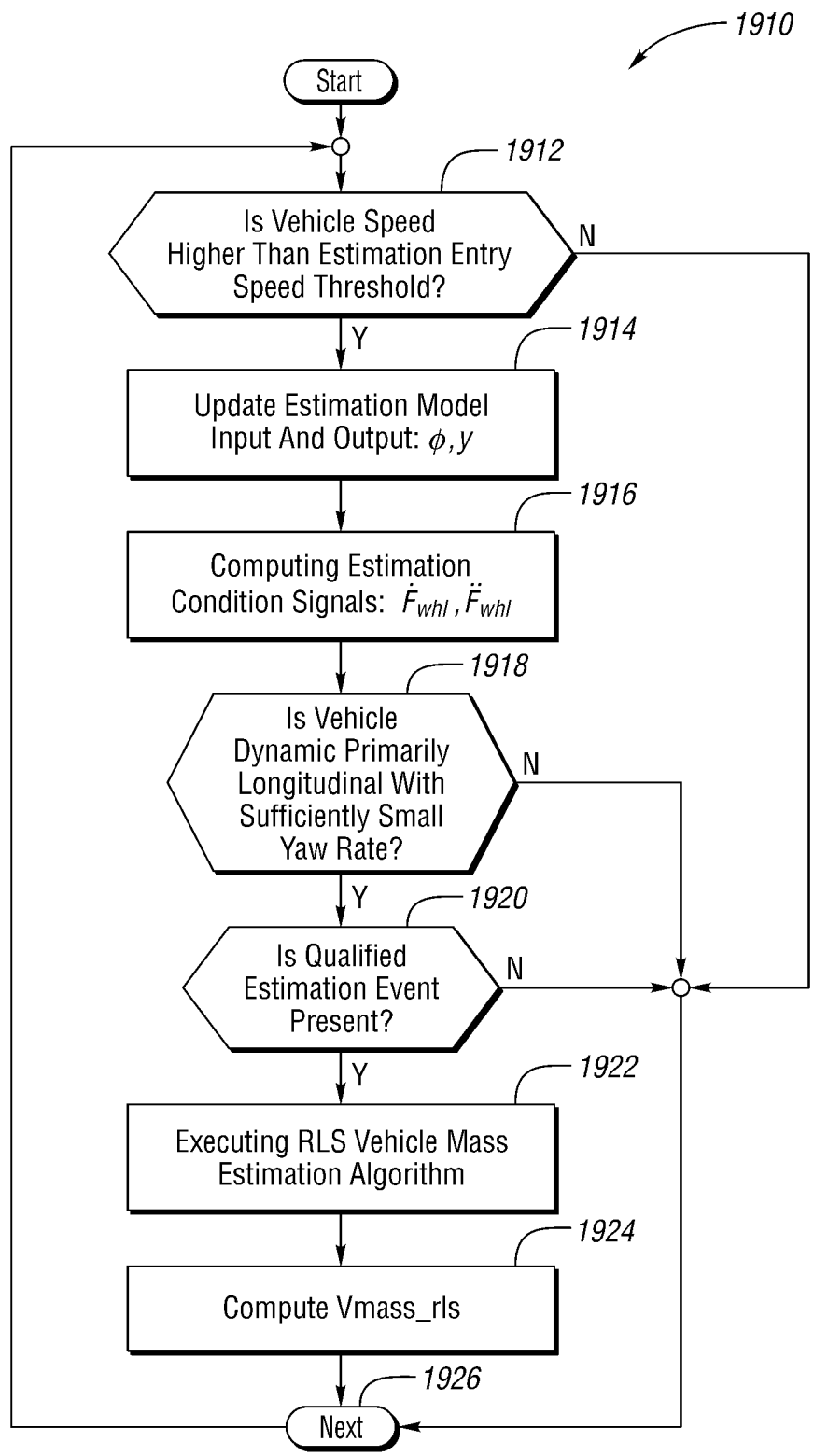
FIG. 19 is a flow chart illustrating a method for estimating the vehicle mass according to one or more embodiments.

With reference to FIG. 19, a method for estimating the vehicle mass is illustrated in accordance with one or more embodiments and is generally referenced by numeral 1910. The method is implemented using software code contained within the VSC, according to one or more embodiments. In other embodiments, the method 1910 is implemented in other vehicle controllers, or distributed amongst multiple vehicle controllers. The method 1910 is applicable to both acceleration and braking/deceleration events and corresponds to the event conditions listed above.

In operation 1912 the vehicle system evaluates the vehicle speed (Vx) to determine if Vx is greater than an estimation entry speed threshold. Operation 1912 corresponds to the first event condition. The estimated entry speed threshold corresponds to a calibrated brake entry speed threshold (C_DynMassBrkEntry) for the braking event; and to a calibrated propulsion entry speed threshold (C_DynMassPropEntry) for the acceleration event. If the determination at operation 1912 is positive, the vehicle system proceeds to operation 1914.

At operation 1914 the vehicle system updates the estimation model input ($\phi$) and output (Y) based on the vehicle mass estimation algorithm selected, as described with reference to equations 74-76. At operation 1916 the vehicle system computes the estimation condition signals ($\dot{F}_{whl}$ and $\ddot{F}_{whl}$), as described with reference to equations 75 and 76.

At operation 1918 the vehicle system evaluates the longitudinal acceleration ($a_x^i$) and the yaw rate (r) to determine if the vehicle dynamic is primarily longitudinal with a sufficiently small yaw rate. Operation 1918 corresponds to the second and third event conditions. For a braking event, the vehicle dynamic is primarily longitudinal if the longitudinal acceleration ($a_x^i$) is less than or equal to a calibrated negative acceleration threshold (C_aRGEAxNeg). For an acceleration event, the vehicle dynamic is primarily longitudinal if the longitudinal acceleration ($a_x^i$) is greater than or equal to a calibrated positive acceleration threshold (C_aRGEAxPos). For both a braking event and an acceleration event, the yaw rate (r) is sufficiently small if the magnitude of the yaw rate (|r|) is less than or equal to a calibrated small yaw rate threshold (C_small_yaw). If the determination at operation 1918 is positive, the vehicle system proceeds to operation 1920.

At operation 1920 the vehicle system evaluates the force at the wheels (Fwhl) along with higher order derivatives of the force at the wheels ($\dot{F}_{whl}$ and $\ddot{F}_{whl}$) to determine if a qualified estimation event is present. Operation 1920 corresponds to the fourth event condition.

For a braking event, the fourth condition is satisfied if: the wheel force (Fwhl) is less than a calibrated brake force (C_Fbrk); and the derivative of the wheel force ($\dot{F}_{whl}$) is less than a derivative of the calibrated brake force (C_DFBrk); and a second derivative of the wheel force ($\ddot{F}_{whl}$) is less than a second derivative of the calibrated brake force (C_D2FBrk). Alternatively, the fourth braking condition may also be satisfied if the wheel force (Fwhl) is less than a second calibrated brake force (C_Fbrk2); and the derivative of the wheel force ($\dot{F}_{whl}$) is less than a derivative of the second calibrated brake force (C_DFBrk2).

For an acceleration event, the fourth condition is satisfied if: the wheel force (Fwhl) is greater than a calibrated propulsion force (C_FProp); and the derivative of the wheel force ($\dot{F}_{whl}$) is less than a derivative of the calibrated uphill propulsion force (C_DFPropUp); and the derivative of the wheel force ($\dot{F}_{whl}$) is greater than a derivative of the calibrated downhill propulsion force (C_DFPropDn); and a second derivative of the wheel force ($\ddot{F}_{whl}$) is less than a second derivative of the calibrated uphill propulsion force (C_D2FPropUp); and the second derivative of the wheel force ($\ddot{F}_{whl}$) is less than a second derivative of the calibrated downhill propulsion force (C_D2FPropDn). Alternatively, the fourth acceleration condition may also be satisfied if the wheel force (Fwhl) is greater than a second calibrated propulsion force (C_FProp2); and the derivative of the wheel force ($\dot{F}_{whl}$) is greater than a derivative of the second calibrated propulsion force (C_DFProp2); and the second derivative of the wheel force ($\ddot{F}_{whl}$) is greater than a second derivative of the second calibrated propulsion force (C_D2FProp2). If the determination at operation 1920 is positive, the vehicle system proceeds to operation 1922.

At operation 1922 the vehicle system executes an RLS vehicle mass estimation algorithm (e.g., using equations 71-73). At operation 1924 the vehicle system estimates vehicle mass (e.g., using equation 65, 68 or 69). After operation 1924, or in response to negative determinations at operation 1912, 1918 or 1920, the vehicle system proceeds to operation 1926, and then returns to operation 1912.

Vehicle mass is unlikely to change when the vehicle is moving. The vehicle system continues to monitor the vehicle state and carries out estimation updates in the presence of a qualified estimation event. The estimated vehicle mass is averaged throughout all the estimation instances with the assumption that the vehicle mass is constant and the estimation noise is zero mean Gaussian. However, vehicle mass may change when the vehicle is moving slowly and when it is stopped for a certain period of time. Under such vehicle conditions, the vehicle system adjusts the sensitivity of the RLS estimator to a more sensitive state, such that a change in vehicle mass is readily detected.

Figure 20:
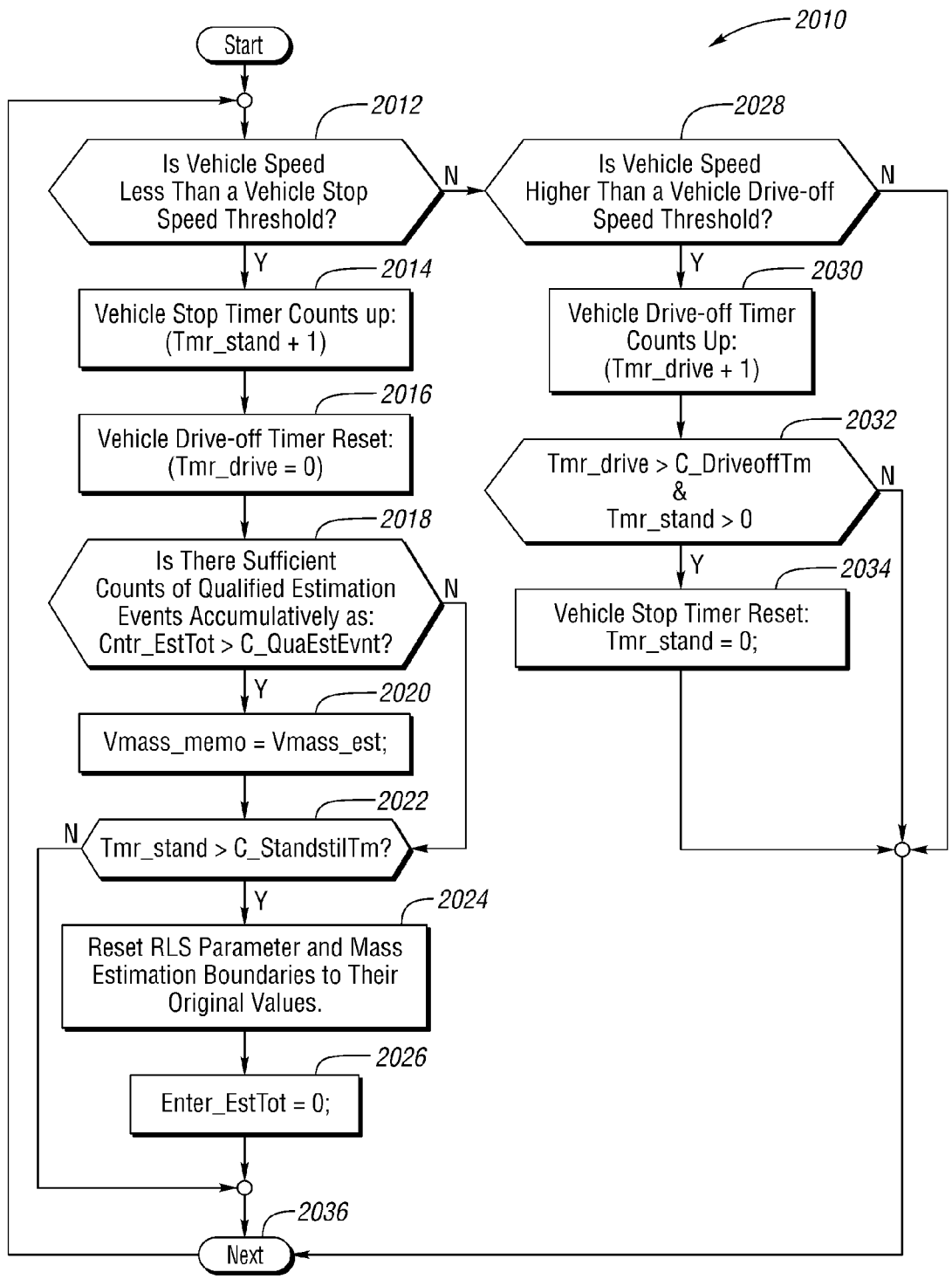
FIG. 20 is a flow chart illustrating a method for resetting vehicle mass estimation parameters according to one or more embodiments.

With reference to FIG. 20, a method for resetting vehicle mass estimation parameters is illustrated in accordance with one or more embodiments and is generally referenced by numeral 2010. The method is implemented using software code contained within the VSC, according to one or more embodiments. In other embodiments, the method 2010 is implemented in other vehicle controllers, or distributed amongst multiple vehicle controllers. The method 2010 resets vehicle mass estimation parameters under certain vehicle conditions for adjusting the sensitivity of the RLS estimator.

At operation 2012 the vehicle system evaluates the vehicle speed (Vx) to determine if the vehicle speed is less than a vehicle stop speed threshold. If the determination at operation 2012 is positive, the vehicle system proceeds to operation 2014 and increments, or counts up the vehicle stop/standstill timer (Tmr_stand) by one cycle time and the stop/standstill timer will start recording the vehicle stopped duration. At operation 2016 the vehicle system resets a drive-off timer (Tmr_drive), by setting Tmr_drive equal to zero.

At operation 2018 the vehicle system evaluates a total count of qualified estimation events (Cntr_EstTot), to determine if Cntr_EstTot is greater than a calibrated estimated event threshold (C_QuaEstEvnt). If the determination at operation 2018 is positive, the vehicle system proceeds to operation 2020 and updates a RLS estimation memory (Vmass_memo) by setting Vmass_memo equal to a present vehicle mass estimate (Vmass_est). Vmass_est corresponds to the vehicle mass (Vmass_rls) estimated at operation 1924 of FIG. 19, and the estimated vehicle mass (Mv) of equations 65, 68 and 69, according to one or more embodiments. After operation 2020, or in response to a negative determination at operation 2018, the vehicle system proceeds to operation 2022.

At operation 2022 the vehicle system evaluates the stop/standstill timer (Tmr_stand) to determine if Tmr_stand is greater than a calibrated standstill timer (C_StandstilTm). If the determination at operation 2022 is positive, the vehicle system proceeds to operation 2024 and resets the RLS parameter and mass estimation boundaries to their original values. For example, the vehicle system may set the RLS estimation parameter P(k) (from equation 73) to its initial value P(0). At operation 2026 the vehicle system resets the total qualified estimation instance counter (Enter_EstTot) by setting Enter_EstTot equal to zero. If the determination at operation 2012 is negative, the vehicle system proceeds to operation 2028.

At operation 2028, the vehicle system evaluates the vehicle speed (Vx) to determine if Vx is greater than a drive-off speed threshold. If the determination at operation 2028 is positive, the vehicle system proceeds to operation 2030 and increments, or counts up the vehicle drive-off Timer (Tmr_drive) by one cycle time, and the drive-off timer will start recording the vehicle moving duration. At operation 2032 the vehicle system evaluates the drive-off timer (Tmr_drive) and the stop/standstill timer (Tmr_stand) to determine if both Tmr_drive is greater than a calibrated drive-off timer (C_StandstilTm); and if Tmr_stand is greater than zero. If the determination at operation 2032 is positive, the vehicle system proceeds to operation 2034. At operation 2034 the vehicle system resets a stop/standstill timer (Tmr_stand), by setting Tmr_stand equal to zero. After operations 2026, and 2034, or in response to a negative determination at operations 2022, 2028 or 2032, the vehicle system proceeds to operation 2336, and then returns to operation 2012.

A brief or transient qualified estimation event, is insufficient for vehicle mass estimation. Generally, a transient event does not satisfy the second condition related to longitudinal inertia. However, even if such a transient event does satisfy the second condition, the vehicle system still removes a transient event from the estimation results because it will take a certain period of estimation presence before the estimated vehicle mass starts to converge. The estimated vehicle mass is updated when a sufficient number of estimation instances have be observed.

Figure 21:
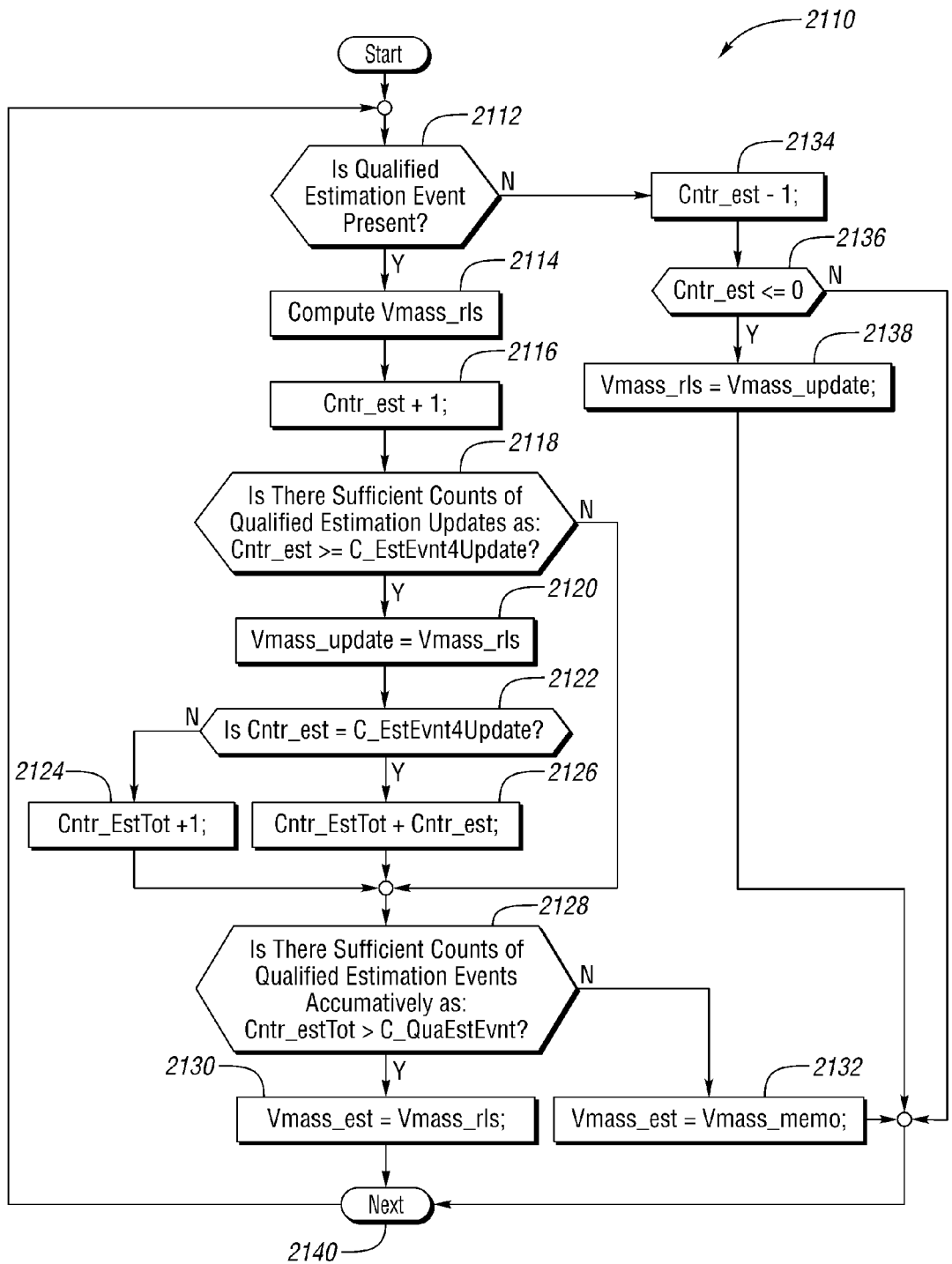
FIG. 21 is a flow chart illustrating a method for updating vehicle mass estimation parameters according to one or more embodiments.

With reference to FIG. 21, a method for updating vehicle mass estimation parameters is illustrated in accordance with one or more embodiments and is generally referenced by numeral 2110. The method is implemented using software code contained within the VSC, according to one or more embodiments. In other embodiments, the method 2110 is implemented in other vehicle controllers, or distributed amongst multiple vehicle controllers. The method 2110 updates vehicle mass estimation state when the qualified estimation event exceeds a predetermined time interval.

At operation 2112 the vehicle system determines if a qualified estimation event is present. Operation 2112 corresponds to operations 1912-1920 of FIG. 19. If the determination at operation 2112 is positive the vehicle system proceeds to operation 2114, and computes Vmass_rls as described in operation 1924. At operation 2116 the vehicle system increments an estimation instance counter (Cntr_est) by one cycle time. At operation 2118 the vehicle system evaluates the estimation instance counter (Cntr_est) to determine if Cntr_est is greater than or equal to a calibrated time interval threshold (C_EstEvnt4Update), which corresponds to a sufficient instance of estimation for an estimation event. If the determination at operation 2118 is positive, the vehicle system proceeds to operation 2120 and updates an estimation update state (Vmass_update) by setting Vmass_update equal to the present vehicle mass estimation state (Vmass_rls).

At operation 2122 the vehicle system evaluates the estimation instance counter (Cntr_est) to determine if Cntr_est is equal to the calibrated time interval threshold (C EstEvnt4Update). If the determination at operation 2122 is negative, the vehicle system proceeds to operation 2124 and increments the estimation instance counter (Cntr_est) by one cycle time. If the determination at operation 2122 is positive, the vehicle system increments the accumulative counter (Cntr_EstTot) by Cntr_est, which counts up at each instance in qualified estimation events.

At operation 2128 the vehicle system evaluates the accumulated count of qualified estimation events (Cntr_EstTot) to determine if Cntr_EstTot is greater than a calibrated qualified estimation event threshold (C_QuaEstEvnt). If the determination at operation 2128 is positive, the vehicle system proceeds to operation 2130 and sets the dynamic mass estimation output (Vmass_est) equal to the RLS estimator state (Vmass_rls). If the determination at operation 2128 is negative, the vehicle system proceeds to operation 2132 and sets the dynamic mass estimation output (Vmass_est) equal to the stored estimation memory value (Vmass_memo).

If the determination at operation 2112 is negative, a qualified estimation event is not present, then the vehicle system proceeds to operation 2134. At operation 2134 the vehicle system decreases the estimation instance counter (Cntr_est) by one cycle time. At operation 2136 the vehicle system evaluates the estimation instance counter (Cntr_est) to determine if Cntr_est is less than or equal to zero. If the determination at operation 2136 is positive, the vehicle system proceeds to operation 2138 and sets the present vehicle mass estimation state (Vmass_rls) equal to the estimation update state (Vmass_update). After operations 2130, 2132, 2138, and in response to a negative determination at operation 2136, the vehicle system proceeds to operation 2140, and then returns to operation 2112.

Figure 22:
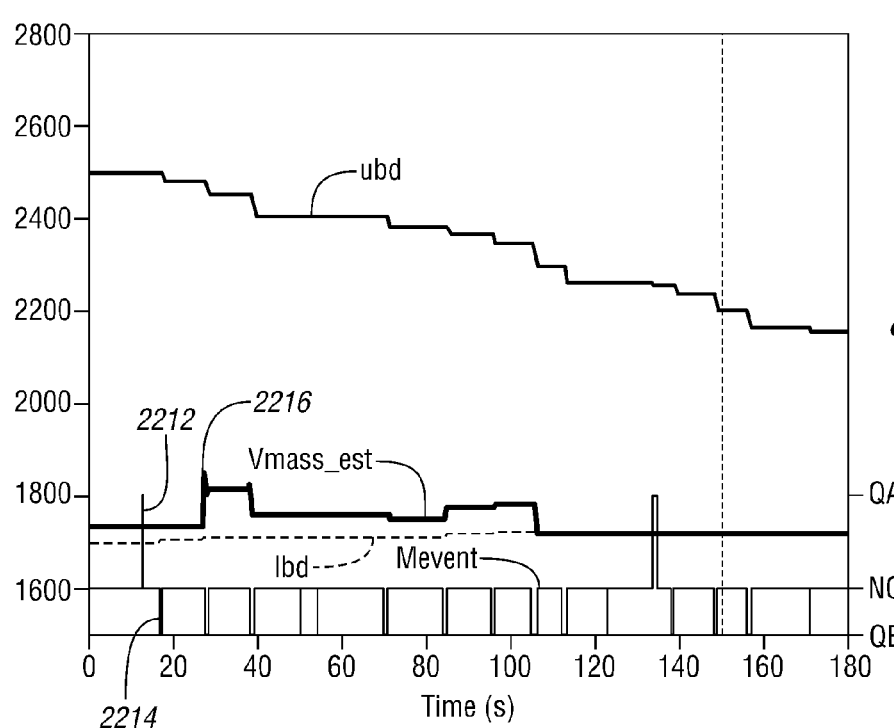
FIG. 22 is a time plot illustrating vehicle mass estimations.

With reference to FIG. 22, the vehicle system limits the vehicle mass estimate using dynamic boundaries according to one or more embodiments. The presence of a single inaccurate vehicle mass estimation instance may distort the estimation state. Therefore the vehicle system establishes boundaries to avoid biased and unreasonable estimation results caused by certain noise factors in the estimation process. As shown in the illustrated embodiment, the vehicle system sets an upper boundary (Ubd) and a lower boundary (Lbd). According to one or more embodiments, the upper boundary (Ubd) corresponds to a maximum gross vehicle weight (GVW), which includes the vehicle, passengers and cargo; and the lower boundary (Lbd) corresponds to a value that is less than the vehicle "curb" weight, which only includes the vehicle. As shown in FIG. 22, the Ubd corresponds to a GVW of approximately 2,500 Kg, and the Lbd corresponds to a Curb weight of approximately 1,700 Kg at initial conditions, with a difference of approximately 800 Kg at (time=0 s).

The boundaries are dynamic in that they converge towards the estimated vehicle mass. Since vehicle mass generally does not change while the vehicle is moving, the boundaries narrow or converge toward a moving average of the estimated vehicle mass such that the difference between the two boundaries decreases as more estimation information becomes available to filter out unreasonable vehicle mass estimates. For example, as shown in the illustrated embodiment, at time 150 s, the Ubd has decreased to approximately 2,200 Kg, and the Lbd has increased to approximately 1,750 Kg, with a difference of approximately 450 Kg.

The estimation boundaries will be reset to the original upper and lower limits when the reset condition is satisfied as described above with reference to FIG. 20. Additionally, the boundaries will converge while the vehicle is accumulating qualified estimation updates. As described above with reference to FIG. 21, the vehicle system includes a counter (Cntr_est) that increments every time a qualified acceleration or deceleration event occurs. A mass estimation event flag (Mevent) is illustrated on FIG. 22, and scaled with the other signals such that Mevent is equal to "NQ" when no qualified event is detected, Mevent is equal to "QA" when a qualified acceleration event is detected (e.g., at point 2212); and Mevent is equal to "QB" when a qualified braking event is detected (e.g., at point 2214). Once a qualified event is detected, the counter starts counting up, once per execution cycle. Once the total number of counts exceeds a predetermined value the vehicle system sets the initial estimated vehicle mass equal to the RLS estimated mass as referenced by numeral 2216.

Figure 23:
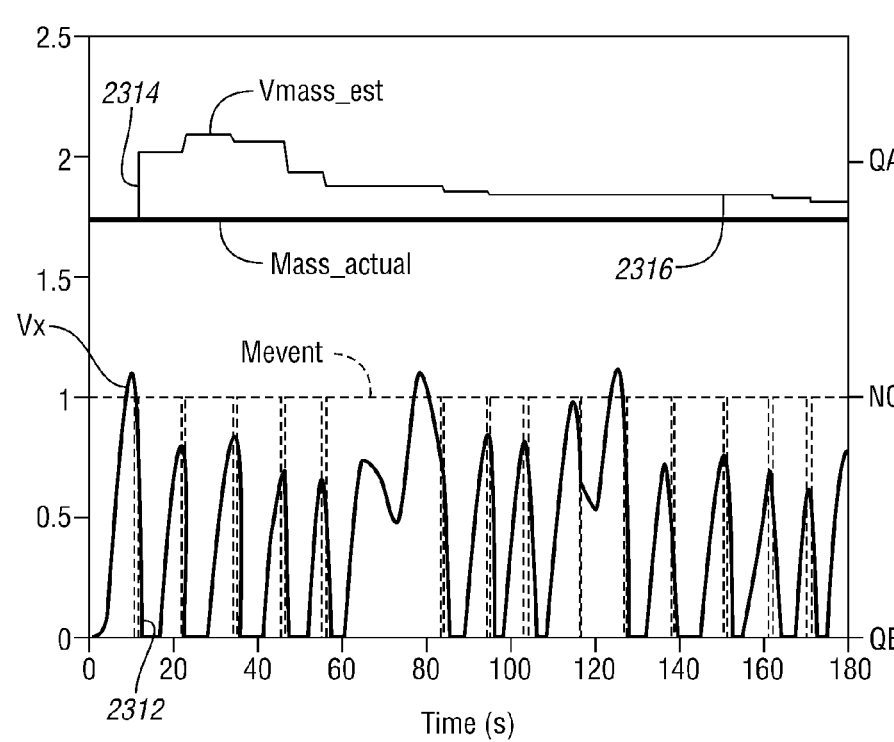
FIG. 23 is another time plot illustrating vehicle mass estimations.

With reference to FIG. 23, as the vehicle system accumulates more vehicle mass information, the estimated mass converges upon an actual vehicle mass. FIG. 23 depicts test results taken for a vehicle having a known mass, which is represented by the actual mass waveform (Mass_actual). FIG. 23 also includes the vehicle speed (Vx), and the qualified event flag (Mevent) waveform. Mevent is equal to "NQ" when no qualified event is detected, Mevent is equal to "QA" when a qualified acceleration event is detected; and Mevent is equal to "QB" when a qualified braking event is detected. The qualified braking events correspond to vehicle deceleration as referenced by numeral 2312. The initial estimated vehicle mass (Vmass_est) is referenced by numeral 2314. The estimated vehicle mass (Vmass_est) converges towards the actual mass (Mass_actual) as additional information is accumulated, as referenced by numeral 2316.

Figure 24:
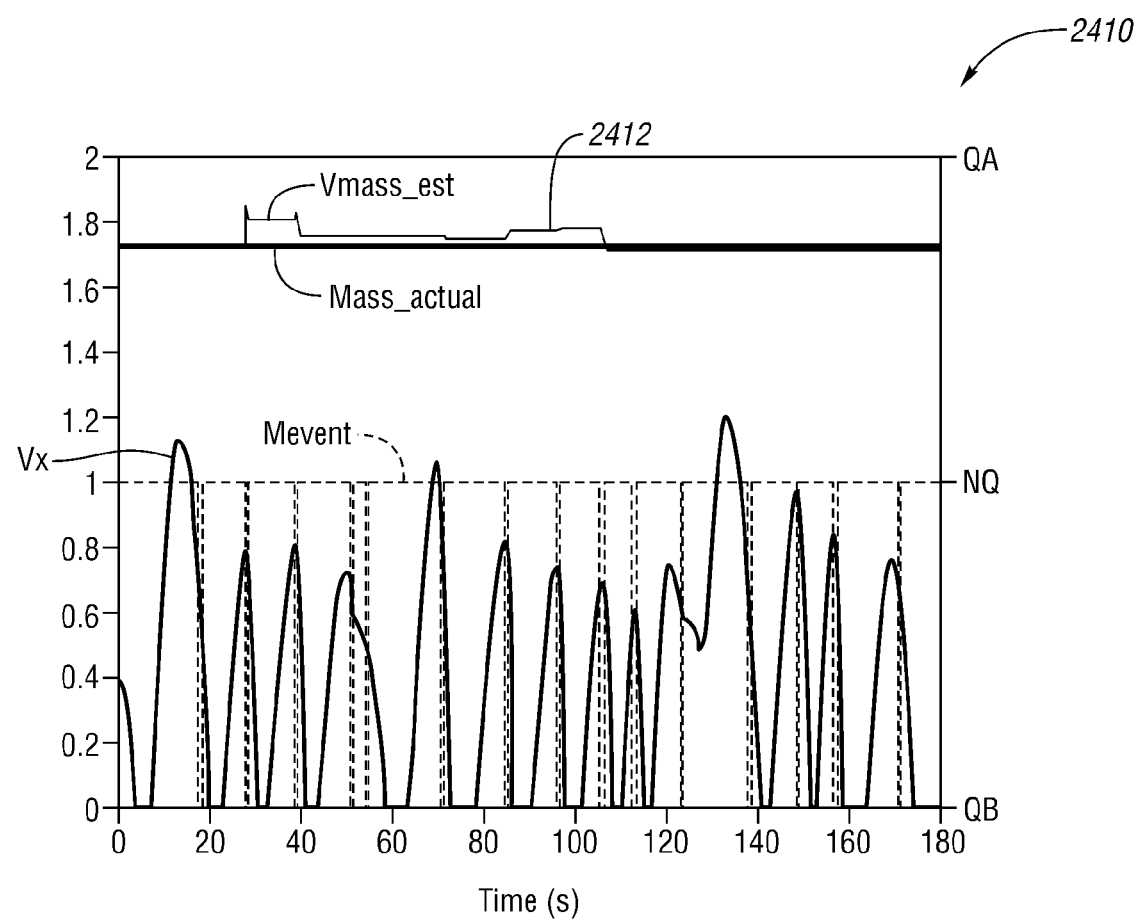
FIG. 24 is yet another a time plot illustrating vehicle mass estimations.

FIG. 24 is another graph illustrating vehicle mass estimation. Although the vehicle mass estimate (Vmass_est) converges toward the actual mass (Mass_actual) over time as additional information is detected, the vehicle mass estimate may adjust away from the actual mass when there is noise present on the input signals, as referenced by numeral 2412. For example, in one or more embodiments, vehicle mass is estimated based on a drag force (Fdrag) as described above with reference to equation 65. The accuracy of the drag force estimate decreases under certain vehicle conditions (e.g., high wind). The boundaries described with reference to FIG. 22 reduce the impact of such noisy conditions, by limiting the estimated vehicle mass.

The vehicle system may estimate a dynamic road gradient based on the estimated vehicle mass, for example by using equation 60. Additionally the estimated vehicle mass may be used for other vehicle systems, such as brake apply and release detection (BARD) for micro-HEVs having start/stop functionality.

As such, the vehicle system provides advantages by estimating the vehicle mass independent of the road gradient estimation using an event-seeking strategy. The mass is estimated at vehicle conditions, or qualified events, where the signal to noise ratio of certain inputs is high. The vehicle system then estimates vehicle mass using a recursive least square (RLS) algorithm when the sought event occurs. The vehicle system re-initializes certain parameters in the mass estimation algorithm at vehicle conditions corresponding to potential mass changes (e.g., when the vehicle stops) in order to increase the sensitivity of the algorithm. The vehicle system estimates a dynamic road gradient ($RGE_{dyn}$) based on the estimated vehicle mass. Generally the dynamic RGE has lower quality conditions as compared to static and kinematic RGE because it involves more signals in its estimation, and the noise and error in each signal will be propagated in the final RGE output. However, the dynamic RGE does not rely on the longitudinal acceleration signal and therefore it has different signal coverage from that of the static and the kinematic estimations. Additionally, the vehicle system estimates the vehicle mass independent of the road gradient estimation, thereby isolating noise in $RGE_{dyn}$ from the vehicle mass estimate.

As described above, with reference to FIG. 4, the vehicle system determines a quality factor for each of the static, kinematic and dynamic RGE algorithms, which are referenced by the variables: $QF_{st}$, $QF_{kin}$, $QF_{dyn}$ respectively. The vehicle system also determines an overall RGE quality factor ($QF_{RGE}$). Since each RGE algorithm relies on different input signals, they each have different ranges and availability.

The estimation quality factor for the RGE output as well as that for each RGE algorithm (static, kinematic, and dynamic) corresponds to a value between 0-3, and is represented by variables ($QF_{RGE}$, $QF_{st}$, $QF_{kin}$, and $QF_{dyn}$). The quality factor evaluates both the availability and the accuracy of the estimated information. The quality factor (QF) factor is selected from a range of 0-3, where a quality factor of three (3) indicates full quality where the estimation condition is satisfied. A quality factor of two (2) indicates degraded quality when the estimation condition is not fully satisfied but the estimation state does not deviate too far from its setpoint. A quality factor of one (1) indicates that no qualified estimation has been achieved near the instantaneous spot and that the estimation state has not achieved sufficient convergence, a quality factor of zero indicates estimation not available.

The vehicle system evaluates the RGE input signal quality and processing, which are referenced by numerals 414 and 412 in FIG. 4. The vehicle longitudinal acceleration is an input signal 414 and is measured from an inertia sensor 52 (shown in FIG. 1). The signal is regarded as a good signal if its quality factor (QF) is equal to three (3) and the signal is within a specified operating range, e.g. +/−2 g. The input signal is locked to its latest high quality value when its quality degrades and it will be reset to a default value when the degraded quality persists for longer than a time threshold. Other input signals like, brake torque, powertrain torque, vehicle speed, yaw rate, etc. are all processed in the same manner.

The static RGE algorithm estimates road gradient based on the longitudinal acceleration input ($a_x^s$). Static RGE is suited for vehicle standstill conditions, such as engine start/stop functionality when a micro-hybrid is stopped on an incline. The vehicle system evaluates the static RGE quality, based on the acceleration sensor measurement signal's stability. The sensor stability is indicated by the signals oscillation and variation level as compared to thresholds on its filtered first order derivative. The highest quality is achieved when the vehicle is in standstill and the vehicle body is stabilized such that the accelerometer output is near a converged steady state. A higher oscillation level will degrade the estimation quality and become unavailable when the preceding kinematic estimation fails to set the static estimation's initial value in the current vehicle stop event.

The kinematic RGE algorithm estimates RGE based on input corresponding to the vehicle's kinematic properties including the relationship between vehicle speed, accelerations and yaw rate. The algorithm processes the input using a Kalman Filter. The kinematic RGE algorithm is suited for normal vehicle motion conditions (e.g., Vx>5 kph) because some of the underlying calculations have low accuracy at low vehicle speeds. Additionally, a Kalman filter is a dynamic filter, a good estimation is usually not available until the estimation state has converged. The transient time depends on the difference between the initial state and the true road grade state as well as the estimation conditions like: signal frequency component richness and signal to noise ratio. The vehicle system evaluates the quality of the kinematic RGE based on assessing the quality of its input signals, its estimation state, vehicle state as well as the estimation settle down time period.

The dynamic RGE algorithm 426 estimates RGE based on input corresponding to vehicle speed, wheel torques (brake torque and powertrain output torque), and other drag forces acting on the vehicle (e.g., aerodynamic drag, rolling resistance and the road gradient load). Generally the dynamic RGE has lower quality conditions as compared to static and kinematic RGE because it involves more signals in its estimation, and the noise and error in each signal will be propagated in the final RGE output. Similar to the kinematic algorithm, the quality the dynamic RGE estimation is also evaluated over its input signal, estimation state, vehicle states, estimation qualification conditions, and estimation convergence/settle-down time period.

The signals that are provided to the Kalman filter based estimator (e.g., $RGE_{kin}$) are grouped into two sets: the primary signals and the supportive signals. The primary signals are used to compute the inputs and outputs of the estimator system equation. The supportive signals are used to adjust the estimator mode or parameters to be adaptive to different driving situations.

When any of the primary signals are not ok, (e.g., QF<3), the estimation result will start deviating from the true value. The vehicle system evaluates the impact of the degraded signal to the estimation state by counting the time period during which degraded primary signals are present, which is referenced by variable $T_{dgd}$. The vehicle system also interpolates a degradation impact factor $C_{dgi}$ with respect to $T_{dgd}$. Such an interpolation may be based on predetermined data stored in a look up table. In general, the principle of determining $c_{dgi}$ is that the longer the presence of the degraded primary signals, the worse the impact on the estimation results. An estimation quality index variable ($c_{est}^c$) is calculated according to equation 77 as shown below:

$$q_{est}^c = T_{dgd} * C_{dgi} \quad (77)$$

Alternatively, a pre-calibrated value of $q_{est}$ may be used and the estimation process will be halted in the presence of degraded primary signals to the estimator.

After the primary signals all resume good quality, the estimation does not converge back to the true estimation target state immediately. The estimation results can be used confidently after a converging phase occurs. In order to represent the converging phase, a fading factor, $f_{dgi}$, is designed that takes a value between 0 and 1 to decrease the value of $q_{est}$ that has been accumulated from a previous degraded signal event such that:

$$q_{est}^0 = q_{est}^0 * f_{dgi} \quad (78)$$

This computation is repeated in each control implementation cycle to gradually decrease the value of $q_{est}$ down to zero.

At each moment, the occurrence of a present impact increasing can occur simultaneously with the decreasing of the impact from a previous event. Thus, the final estimation quality index is determined by the maximum value among $q_{est}^0$ and $q_{est}^c$, i.e. $q_{est} = \max(q_{est}^0, q_{est}^c)$.

Figure 25:
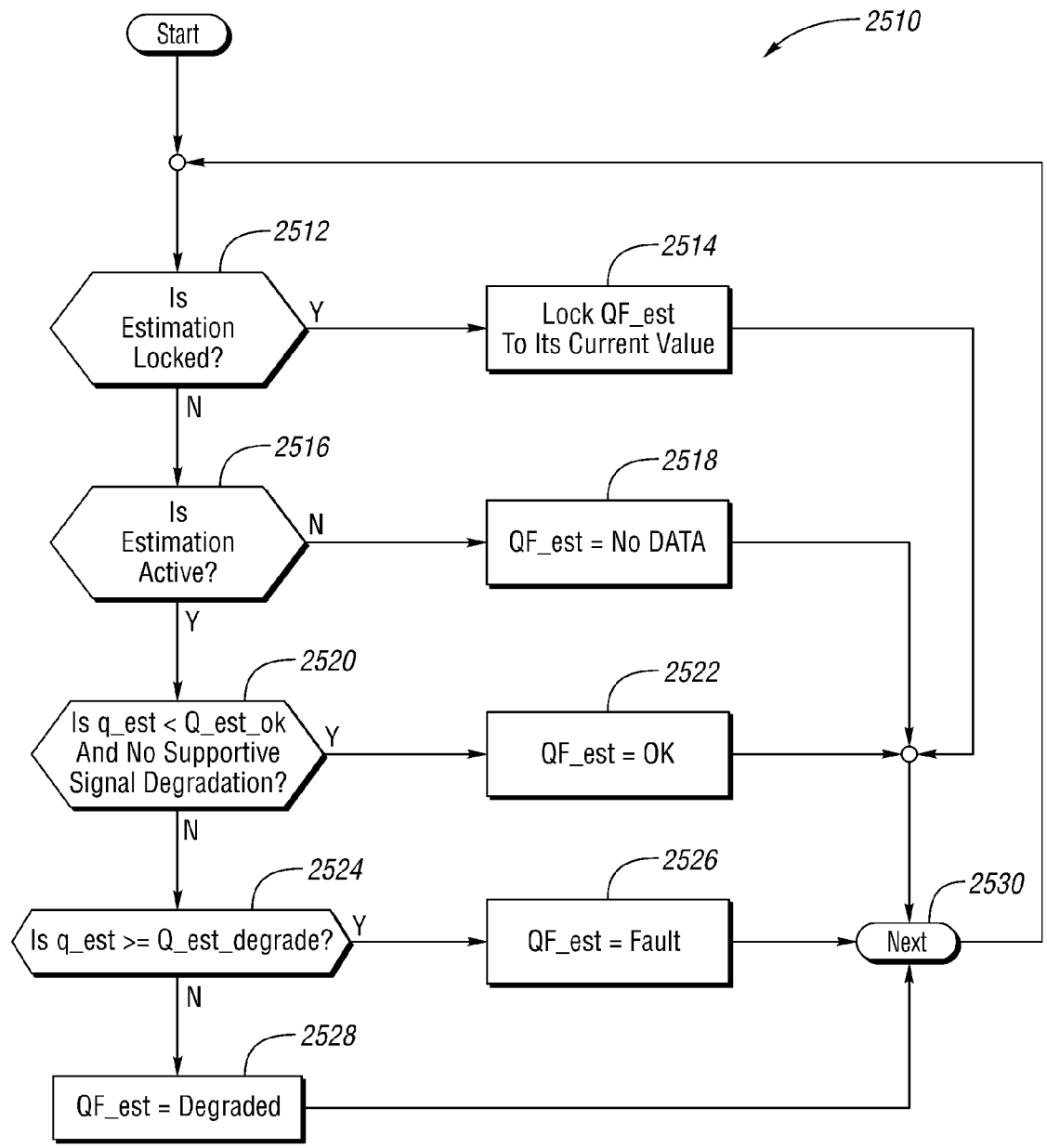
FIG. 25 is a flow chart illustrating a method for estimating the quality of an estimator according to one or more embodiments.

With reference to FIG. 25, a method for estimating the quality of a Kalman estimator, or an RLS dynamic mass estimator, is illustrated in accordance with one or more embodiments and is generally referenced by numeral 2510.

In operation 2512 the vehicle system evaluates a road gradient estimation (RGE) signal to determine if the estimation is locked. An RGE is locked when it is not updating. The RGE may be locked to its latest high quality value when its quality degrades. If the determination at operation 2512 is positive the vehicle system proceeds to operation 2514 and locks the quality factor of the evaluated estimation (QF_est) to its current value. The variable QF_est is a generic value corresponding to the quality factor for kinematic or dynamic road gradient estimations. When the estimation algorithm does not satisfy a qualified estimation condition and the estimation is locked, its associated quality evaluation is locked as well until a next estimation event will happen. If the determination at operation 2512 is negative, the vehicle system proceeds to operation 2516.

At operation 2516 the vehicle system evaluates the road gradient estimation (RGE) signal to determine if the estimation is active. RGE is active, if it is updating. If the determination at operation 2516 is negative, the vehicle system proceeds to operation 2518 and sets the quality factor to a value corresponding to "no data", (e.g., QF=0). If the determination at operation 2516 is positive, the vehicle system proceeds to operation 2520.

At operation 2520, the vehicle system compares the evaluated quality index ($q_{est}$), as described above with reference to equations 77 and 78, to an OK threshold parameter (Q_est_ok), to determine if q_est is less than Q_est_ok; and there is no supportive signal degradation. If the determination at operation 2520 is positive, the vehicle system proceeds to operation 2522 and sets the quality factor to a value corresponding to "OK", (e.g., QF=3). If the determination at operation 2520 is negative the vehicle system proceeds to operation 2524.

At operation 2524, the vehicle system compares the evaluated quality index ($q_{est}$) to a FAULT threshold parameter (Q_est_degrade), to determine if q_est is greater than or equal to Q_est_degrade. If the determination at operation 2524 is positive, the vehicle system proceeds to operation 2524 and sets the quality factor to a value corresponding to "FAULT". If the determination at operation 2524 is negative the vehicle system proceeds to operation 2528 and sets the quality factor to a value corresponding to "DEGRADED", (e.g., QF=2). After operations 2514, 2518, 2522, 2526 and 2528, the vehicle system proceeds to operation 2530, and then returns to operation 2512.

Figure 26A:
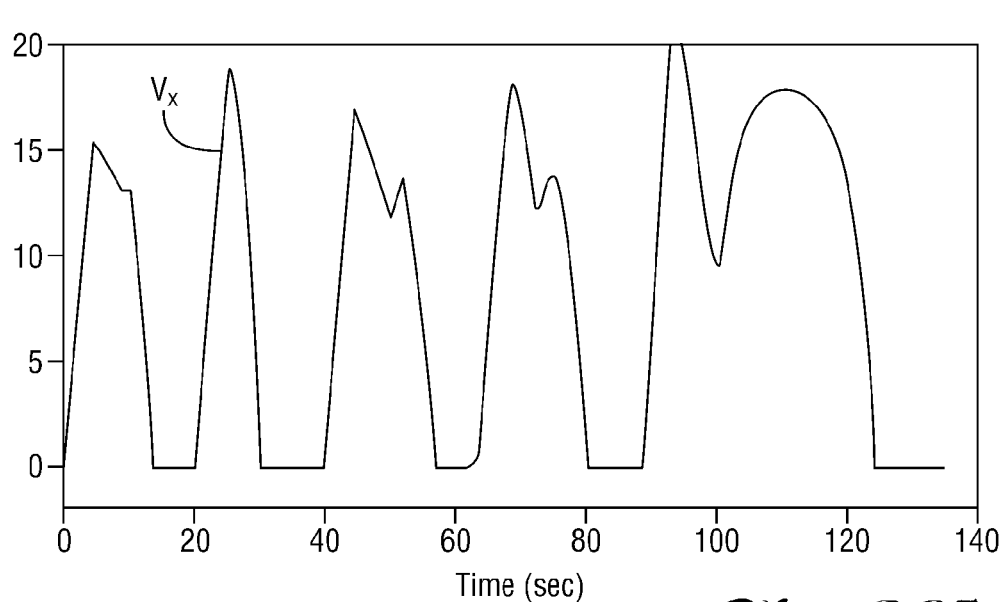
FIGS. 26A-26C are time plots illustrating vehicle speed, acceleration and road gradient estimations as controlled by the method of FIG. 25.
Figure 26B:
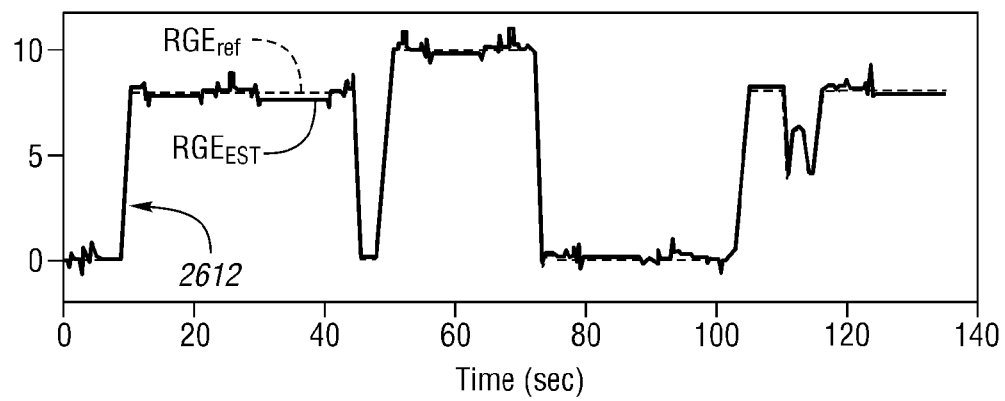
Figure 26C:
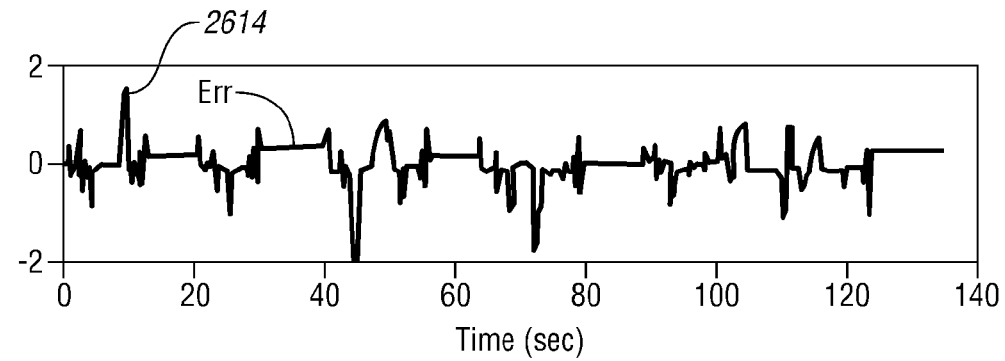

With reference to FIGS. 26A-26C, the vehicle system monitors variation in the kinematic road gradient estimation ($RGE_{kin}$). FIGS. 26A-26C include 3 graphs of measurement data taken over a common period of time and are generally referenced by numeral 2610. FIG. 26A illustrates vehicle speed (Vx), FIG. 26B illustrates an actual road gradient ($RGE_{ref}$) along with an estimated road gradient ($RGE_{EST}$). The $RGE_{EST}$ corresponds to an arbitrated output ($RGE_{out}$) of $RGE_{st}$, $RGE_{kin}$, and $RGE_{dyn}$ according to one or more embodiments. FIG. 26C illustrates a calculated percent error between $RGE_{EST}$ and $RGE_{ref}$.

The Kalman filter based estimation, such as that used for $RGE_{kin}$, assumes that the road gradient state is stable and is close to a constant state in a short period of time or distance. This assumption is generally true, because most roads do not have rapid changes in road gradient. However, as shown in FIGS. 26B and 26C, large estimation error may occur at transitions between different road gradients. For example, the road gradient changes from approximately 0% to approximately 7%, as referenced by numeral 2612. A generally large estimation error is present at this transition, as referenced by numeral 2614.

The vehicle system includes a method, (not shown) for monitoring an estimation variation to determine the estimation quality (accuracy) based on the magnitude of the road gradient variation. In this method, a derivative of the estimated road gradient is calculated ($\dot{RGE}_{EST}$). A transition period is identified, when the derivative ($\dot{RGE}_{EST}$) is greater than a threshold estimation and such condition is true for longer than a predetermined period of time, the transition period is identified. Subsequently, the estimation quality (QF) will be reduced to a degraded level (QF=2) if no other degradation factor is also present simultaneously. Such degradation will be cancelled when the derivative signal settles down to a low value for another settling time period. In general, this method informs other vehicle systems that are using the RGE output, that the estimation is not fully accurate in the transition period of time when road gradient changes significantly in a short period of time.

The road gradient estimations are not available at very low vehicle speeds, as shown in column 6, of Table A. Although none of the estimates are available at very low vehicle speeds, (e.g., less than 5 mph), the vehicle system still provides an accurate road gradient estimate during such conditions. At low vehicle speeds the vehicle speed provided by or derived from a sensor signal, (e.g., wheel speed sensors or GPS), is not accurate. The vehicle system stops the estimation at such speeds, to avoid propagating this inaccuracy in the road gradient estimation, (e.g., RGEkin and RGEdyn), and locks the estimator state to its latest qualified estimation result.

A vehicle may travel an extended distance at such very low vehicle speeds. Therefore the actual road gradient may change after the RGE is stopped. In such conditions, the accuracy of the locked RGE output will decrease. Therefore the vehicle system downgrades the associated estimation quality accordingly. The vehicle system defines two vehicle speed thresholds, ($V_{stp}$ and $V_{exit}$), which represent a vehicle stop speed threshold, and a vehicle exit speed threshold, respectively. Where $V_{stp}$ is greater than $V_{exit}$. When the vehicle speed (Vx) is less than $V_{stp}$. The vehicle system (using a Kalman filter (or a least square type of filter) based estimation algorithm) halts or stops the estimation by locking all of the estimation states. However, after recording the data at the estimation stop moment, the estimation algorithm continues, before the vehicle speed (Vx) further decreases down to $V_{exit}$, or before Vx increases above $V_{stp}$. When operating in the speed range between $V_{exit} < V_x < V_{stp}$, the new estimation output ($RGE_{out}$) will continue to compare the locked estimation output. If the difference between current RGE state and the locked RGE is greater than a first difference threshold, the estimation quality will be downgraded to a lower level indicating that the estimation output may not be accurate enough in this new situation. However, if the difference between them is greater than a second difference threshold, the estimation quality will be downgraded to a "No Data" level (e.g., QF=0) indicating that the estimation result cannot be used. After the vehicle speed (Vx) decreases further below $V_{exit}$, the estimation will be fully stopped and no more estimation activity will be carried out. Once the vehicle speed (Vs) increases above the $V_{stp}$ threshold, the locked and recorded estimation states will be reloaded back to the estimation algorithm to resume normal estimation function.

The vehicle system stops the road gradient estimator once the vehicle speed (Vx) is less than $V_{exit}$, in one or more embodiments, because an estimation at such conditions would not be accurate. $V_{exit}$ may be referenced as a "crawling" speed. However, the vehicle may continue to travel at such a crawling speed.

With reference to FIGS. 27A-27G, the kinematic or dynamic road gradient estimator will be available after the vehicle speed increases above a higher speed level and the static RGE estimator can take the responsibility after the vehicle is fully stopped. FIGS. 27A-27G include 7 graphs of measurement data taken over a common period of time and are generally referenced by numeral 2710. FIG. 27B illustrates vehicle speed (Vx); FIG. 27E illustrates the static quality factor ($QF_{st}$); FIG. 27F illustrates the kinematic quality factor ($QF_{kin}$); and FIG. 27G illustrates the quality factor of the arbitrated road gradient estimation ($QF_{RGE}$). The static RGE is available when the vehicle is stopped. A vehicle speed of zero is referenced by numeral 2712 and a corresponding high quality $RGE_{st}$ is referenced by numeral 2714. Additionally the kinematic RGE is available when the vehicle is moving in normal motion as referenced by numeral 2716 and a corresponding high quality $RGE_{kin}$ is referenced by numeral 2718. The arbitrated RGE combines RGEst and RGEkin to provide a high quality output over most vehicle conditions, as referenced by numeral 2720. However, at certain very low vehicle speeds, as referenced by numeral 2722, there may be no high quality RGE available, as generally referenced by numeral 2724.

However, there may be no RGE algorithm available in the low speed range between 0 and $V_{exit}$. Thus, the road gradient variation while the vehicle is moving at such low speed cannot be detected and estimated. In order to assure RGE's robustness in reporting road gradient information, the vehicle system includes a conservative countermeasure to avoid a road gradient estimation being used without providing information regarding the quality of the RGE.

The vehicle system includes a method, (not shown) for monitoring vehicle speed (Vx) in a crawling event, according to one or more embodiments. A crawling event occurs when Vx is less than v_exit (e.g., less than 5 kph) and the current estimator quality evaluation is OK (e.g., QF=3). The vehicle system calculates a crawling distance (Dc), by integrating the vehicle speed. The vehicle system downgrades the quality factor to degraded (QF=2) when Dc is greater than a first distance threshold. The vehicle system downgrades the quality factor to no data (QF=0) when Dc is greater than a second distance threshold. The vehicle system resets the crawling distance (Dc) to zero, when any RGE estimator starts providing a qualified output. Meanwhile, the quality of RGE will be arbitrated to the current active estimator's quality evaluation result to replace the quality evaluated in the crawling event. The vehicle system will restart the crawling distance computation, when the quality evaluation (QF) downgrades in the speed range (v_exit<Vx<v_stp). Additionally, the vehicle system restarts the Dc computation when the continued estimation result deviates from the locked estimation result more than a certain threshold, even if the vehicle speed is greater than $V_{exit}$.

As such the vehicle system provides advantages over existing system by evaluating the quality of input signals, road gradient estimations and mass estimations and providing quality factors associated with each input and estimation. The vehicle system arbitrates or selects an estimation based in part on the quality factors. The vehicle system then provides a road gradient estimation and a vehicle mass estimation with a corresponding quality factor based on the selected estimation. Other vehicle systems may use the road gradient and vehicle mass estimations differently, depending on the associated quality factors.

As demonstrated by the embodiments described above, the vehicle, vehicle system, and method provide advantages over the prior art by arbitrating or selecting a road gradient estimation from a number of different estimations (static, kinematic, and dynamic). By arbitrating between these different estimations, the vehicle system provides a road gradient estimation over a wide range of vehicle conditions. The vehicle system also provides advantages over existing systems by estimating static road gradient using dynamically filtering of the longitudinal acceleration, and by using another estimation for the initial value; which reduces the time delay before a quality static road gradient estimated value may be provided. The vehicle system also provides advantages over the existing methods by estimating kinematic road gradient using an EKF, which provides an integral type filtering strategy. Such an integrating strategy does not amplify noise on the signals, and therefore provides improved estimation accuracy with relatively fast convergence. The vehicle system also provides advantages over the existing methods by estimating kinematic road gradient using input compensated acceleration offset to improve accuracy to remove uncertainties and offsets caused by lateral vehicle dynamics and their coupling effects. The vehicle system provides advantages by estimating vehicle mass independent of the road gradient estimation using an event-seeking strategy. The vehicle system re-initializes certain parameters in the mass estimation algorithm at vehicle conditions corresponding to potential mass changes (e.g., when the vehicle stops) in order to increase the sensitivity of the algorithm. The vehicle system estimates a dynamic road gradient ($RGE_{dyn}$) based on the estimated vehicle mass. The vehicle system also provides advantages over existing system by evaluating the quality of input signals, road gradient estimations and mass estimations and providing quality factors associated with each input and estimation. The vehicle system arbitrates or selects an estimation based in part on the quality factors. The vehicle system then provides a road gradient estimation and a vehicle mass estimation with a corresponding quality factor based on the selected estimation. Other vehicle systems may use the road gradient and vehicle mass estimations differently, depending on the associated quality factors.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A vehicle comprising:
an engine configured for automatic shutdown and restart;
a controller configured to
filter a longitudinal acceleration using a low pass filter having a bandwidth selected from a plurality of bandwidths based on a derivative of the longitudinal acceleration,
generate output indicative of a static road gradient estimation based on the filtered longitudinal acceleration,
wherein the controller is further configured to shutdown and restart the engine based on the static road gradient estimation;
wherein an initial value of the static road gradient estimation corresponds to at least one of a kinematic road gradient estimation and a dynamic road gradient estimation.

2. The vehicle of claim 1 further comprising:
an inertial sensor for providing a signal indicative of the longitudinal acceleration;
wherein the derivative comprises a first order derivative of the longitudinal acceleration corresponding to a longitudinal jerk, and wherein the controller is further configured to filter the longitudinal acceleration using a low pass filter having a narrow bandwidth when the longitudinal jerk is greater than a jerk threshold.

3. The vehicle of claim 2 wherein the controller is further configured to:
filter the longitudinal acceleration using a low pass filter having a wide bandwidth when the longitudinal jerk is less than the jerk threshold.

4. The vehicle of claim 1 wherein the derivative comprises a second order derivative of the longitudinal acceleration.

5. The vehicle of claim 1 wherein each road gradient estimation corresponds to an estimation quality factor;
wherein the initial value of the static road gradient estimation corresponds to the kinematic road gradient estimation when a kinematic quality factor is greater than a dynamic quality factor;
wherein the initial value of the static road gradient estimation corresponds to the dynamic road gradient estimation when the dynamic quality factor is greater than the kinematic quality factor.

6. The vehicle of claim 5 wherein the initial value of the static road gradient estimation corresponds to a default value when the kinematic quality factor and the dynamic quality factor are each less than a threshold quality value.

7. The vehicle of claim 1 wherein the controller is further configured to:
generate output indicative of a static quality factor based on the derivative of the longitudinal acceleration.

8. The vehicle of claim 1 wherein the controller is further configured to:
generate output indicative of a static quality factor based on a comparison of the derivative of the longitudinal acceleration to a first threshold and a second threshold, wherein the second threshold is greater than the first threshold.

9. The vehicle of claim 8 wherein the controller is further configured to:
generate output indicative of a static quality factor corresponding to high quality, when the derivative of the longitudinal acceleration is less than the first threshold for longer than a time threshold; and
generate output indicative of a static quality factor corresponding to intermediate quality, when the derivative of the longitudinal acceleration is greater than the first threshold and less than the second threshold.

10. The vehicle of claim 8 wherein the controller is further configured to:
generate output indicative of a static quality factor corresponding to low quality, when the derivative of the longitudinal acceleration is greater than the second threshold.

11. The vehicle of claim 1 wherein the static road gradient is independent of a vehicle pitch angle.

12. The vehicle of claim 1 further comprising:
a brake system for providing wheel torque;
wherein the controller is further configured to adjust the wheel torque based on the static road gradient estimation.

13. A vehicle system comprising:
a controller configured to:
filter a longitudinal acceleration using a low pass filter having a bandwidth selected from a plurality of bandwidths based on a derivative of the longitudinal acceleration corresponding to a longitudinal jerk,
generate output indicative of a static road gradient estimation based on the filtered longitudinal acceleration, and
generate output indicative of a static quality factor based on the longitudinal jerk.

14. The vehicle system of claim 13 wherein the controller is further configured to:
generate output indicative of a static quality factor corresponding to full quality, when the longitudinal jerk is less than a stabilizing threshold for longer than a stabilizing time threshold.

15. The vehicle of claim 13 wherein the controller is further configured to:
generate output indicative of a static quality factor corresponding to degraded quality, when the longitudinal jerk is less than a converging threshold and greater than a stabilizing threshold; wherein the converging threshold is greater than the stabilizing threshold; and
generate output indicative of a static quality factor corresponding to non-qualified, when the longitudinal jerk is greater than the converging threshold.

16. The vehicle system of claim 13 wherein an initial value of the static road gradient estimation corresponds to at least one of a kinematic road gradient estimation and a dynamic road gradient estimation.

17. A method for estimating a static road gradient comprising:
filtering input indicative of a longitudinal acceleration using a low pass filter having a bandwidth selected from a plurality of bandwidths based on a derivative of the longitudinal acceleration;
generating output indicative of a static road gradient estimation based on the filtered longitudinal acceleration; and
generating output indicative of a static quality factor based on the derivative.

18. The method of claim 17 further comprising:
providing an initial static road gradient estimation corresponding to at least one of a kinematic road gradient estimation and a dynamic road gradient estimation.

19. The method of claim 17 further comprising:
controlling shutdown of an engine based on the static road gradient estimation.

* * * * *